United States Patent
Werner et al.

(10) Patent No.: US 10,648,699 B2
(45) Date of Patent: May 12, 2020

(54) SOLAR MIRROR ARRAY SYSTEM, METHODS AND APPARATUSES THERETO

(71) Applicants: Craig Roy Werner, Lake Forest, IL (US); John Funai, Lake in the Hills, IL (US); Nicholas Palladino, Chicago, IL (US)

(72) Inventors: Craig Roy Werner, Lake Forest, IL (US); John Funai, Lake in the Hills, IL (US); Nicholas Palladino, Chicago, IL (US)

(73) Assignee: n Werner Extrusion Solutions LLC, Libertyville, IL (US)

( * ) Notice: Subject to any disclaimer, the term of this patent is extended or adjusted under 35 U.S.C. 154(b) by 0 days.

(21) Appl. No.: 15/957,486

(22) Filed: Apr. 19, 2018

(65) Prior Publication Data

US 2018/0245820 A1    Aug. 30, 2018

Related U.S. Application Data

(60) Division of application No. 13/598,963, filed on Aug. 30, 2012, now Pat. No. 9,951,971, which is a
(Continued)

(51) Int. Cl.
| | |
|---|---|
| *F24S 30/40* | (2018.01) |
| *F24S 25/65* | (2018.01) |
| *F24S 30/425* | (2018.01) |
| *F24S 23/74* | (2018.01) |
| *F24S 25/13* | (2018.01) |
| *F24S 40/20* | (2018.01) |
| *F24S 30/42* | (2018.01) |

(Continued)

(52) U.S. Cl.
CPC ............... *F24S 30/40* (2018.05); *F24S 23/70* (2018.05); *F24S 23/74* (2018.05); *F24S 25/13* (2018.05); *F24S 25/65* (2018.05); *F24S 30/42* (2018.05); *F24S 30/425* (2018.05); *F24S 40/20* (2018.05); *F24S 2023/874* (2018.05); *F24S 2025/014* (2018.05); *F24S 2030/11* (2018.05); *F24S 2030/13* (2018.05); *F24S 2030/134* (2018.05); *F24S 2030/14* (2018.05); *Y02E 10/45* (2013.01); *Y02E 10/47* (2013.01)

(58) Field of Classification Search
CPC ...... F24J 2/14; F24J 2/461; F24J 2/541; F24J 2/5233; F24J 2/526; F24J 2002/5475; F24J 2002/1085; F24J 2002/5281; F24J 2002/5462; Y02E 10/47; Y02E 10/45
USPC ........................... 52/81.3, 633, 648.1, 653.2
See application file for complete search history.

(56) References Cited

U.S. PATENT DOCUMENTS 4,069,832 A * 1/1978 Bingham ................ E04H 15/48
135/139
4,078,549 A * 3/1978 McKeen ................ G01S 3/7861
126/606
(Continued)

*Primary Examiner* — Joshua K Ihezie
(74) *Attorney, Agent, or Firm* — Ansel M. Schwartz

(57) ABSTRACT

An apparatus for transferring force to a frame of a solar mirror array. The frame has at least one structural element. The apparatus includes a torque plate. The apparatus includes at least one node attached to and in contact with the plate which connects with the structural element. An apparatus for attaching a primary solar mirror frame array with a secondary mirror frame array. A solar trough frame for holding solar mirrors.

6 Claims, 109 Drawing Sheets

Related U.S. Application Data continuation-in-part of application No. 13/135,137, filed on Jun. 27, 2011, now Pat. No. 8,627,632, and a continuation-in-part of application No. 12/927,812, filed on Nov. 24, 2010, now Pat. No. 8,863,448, and a continuation-in-part of application No. 12/798,757, filed on Apr. 10, 2010, now Pat. No. 8,887,471, and a continuation-in-part of application No. 12/587,043, filed on Oct. 1, 2009, now Pat. No. 8,806,834, and a continuation-in-part of application No. 12/583,787, filed on Aug. 26, 2009, now Pat. No. 8,887,470.

(60) Provisional application No. 61/573,275, filed on Sep. 2, 2011.

(51) Int. Cl.
*F24S 23/70* (2018.01)
*F24S 25/00* (2018.01)
*F24S 30/00* (2018.01)

(56) References Cited

U.S. PATENT DOCUMENTS

| | | | | |
|---|---|---|---|---|
| 4,502,200 A * | 3/1985 | Anderson | ............... | F24S 23/70 29/525.04 |
| 7,530,201 B2 * | 5/2009 | Reynolds | ............... | E04B 1/19 52/638 |
| 8,132,391 B2 * | 3/2012 | Reynolds | ............... | F24S 23/74 52/783.1 |
| 8,615,960 B2 * | 12/2013 | Marcotte | ............... | E21B 15/00 52/655.1 |
| 9,057,543 B2 * | 6/2015 | Marcotte | ............... | E21B 15/00 |
| 2007/0011983 A1 * | 1/2007 | Reynolds | ............... | E04B 1/19 52/633 |
| 2009/0095283 A1 * | 4/2009 | Curtis | ............... | F24S 30/425 126/704 |
| 2009/0101195 A1 * | 4/2009 | Reynolds | ............... | B32B 38/1866 136/246 |
| 2010/0005752 A1 * | 1/2010 | Hawkins | ............... | E04B 1/1903 52/655.1 |
| 2010/0043776 A1 * | 2/2010 | Gee | ............... | F24S 50/20 126/571 |
| 2010/0199972 A1 * | 8/2010 | Brost | ............... | F24S 30/455 126/601 |
| 2010/0229851 A1 * | 9/2010 | Reynolds | ............... | F24S 30/425 126/605 |
| 2010/0252030 A1 * | 10/2010 | Marcotte | ............... | F24S 23/70 126/694 |
| 2011/0056540 A1 * | 3/2011 | Edgar | ............... | H02S 20/00 136/251 |
| 2011/0073104 A1 * | 3/2011 | Dopp | ............... | F24S 25/00 126/651 |
| 2012/0217209 A1 * | 8/2012 | Marcotte | ............... | E21B 15/00 211/41.1 |
| 2014/0144428 A1 * | 5/2014 | Eisinger | ............... | B21D 53/02 126/694 |
| 2015/0000725 A1 * | 1/2015 | Reilly | ............... | H02S 20/00 136/251 |

* cited by examiner

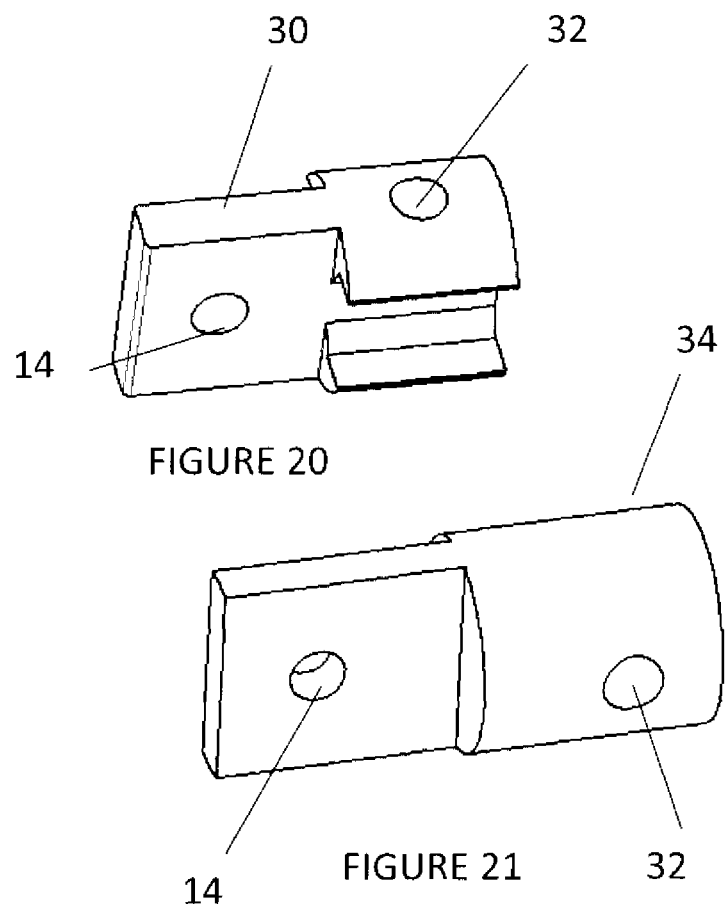

DISPLACEMENT (INCHES)

A=.002

B=.0018

C=.0016

D=.0013

E=.001

F=.0007

G=.0005

H=.0002

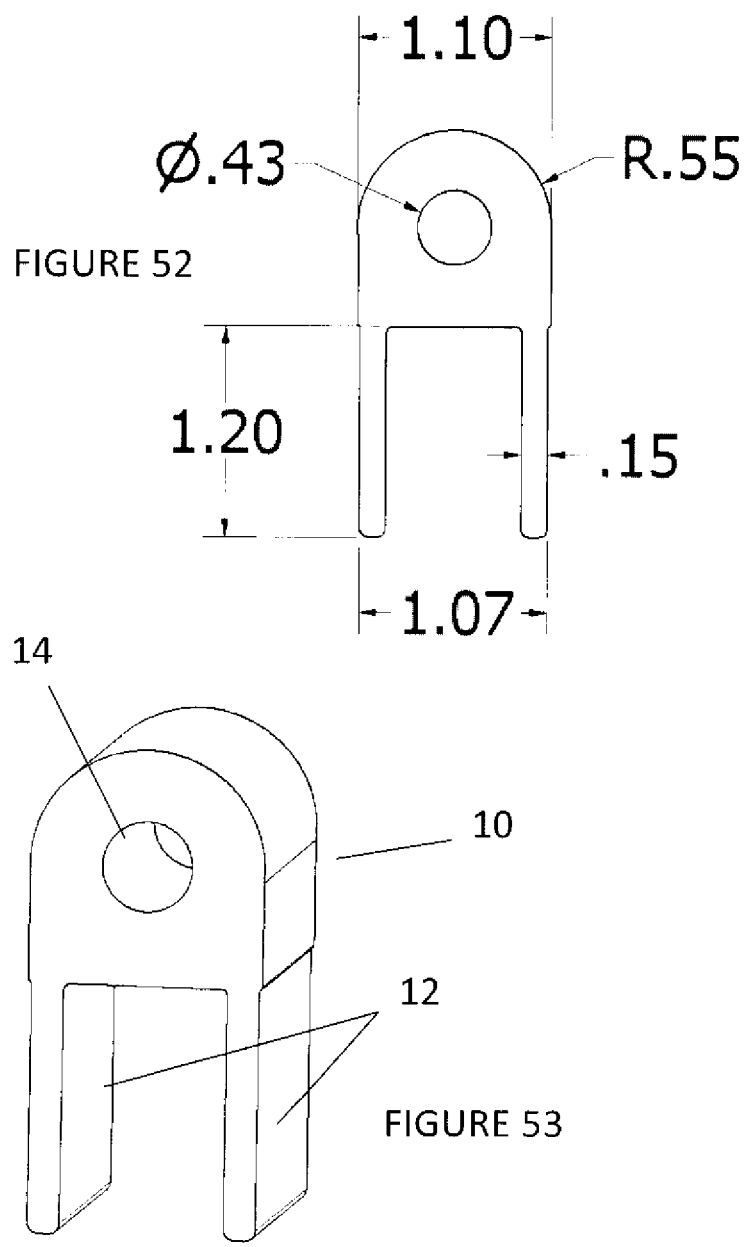

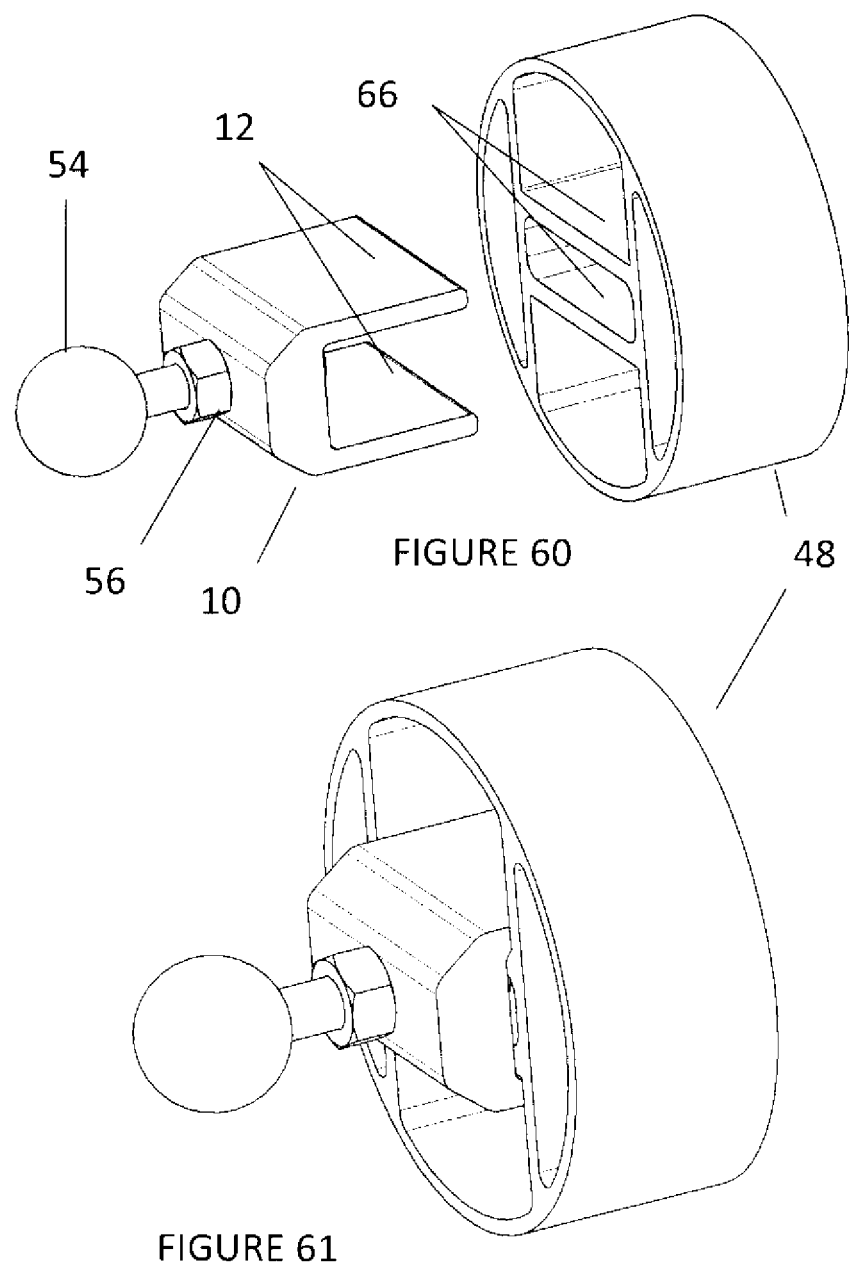

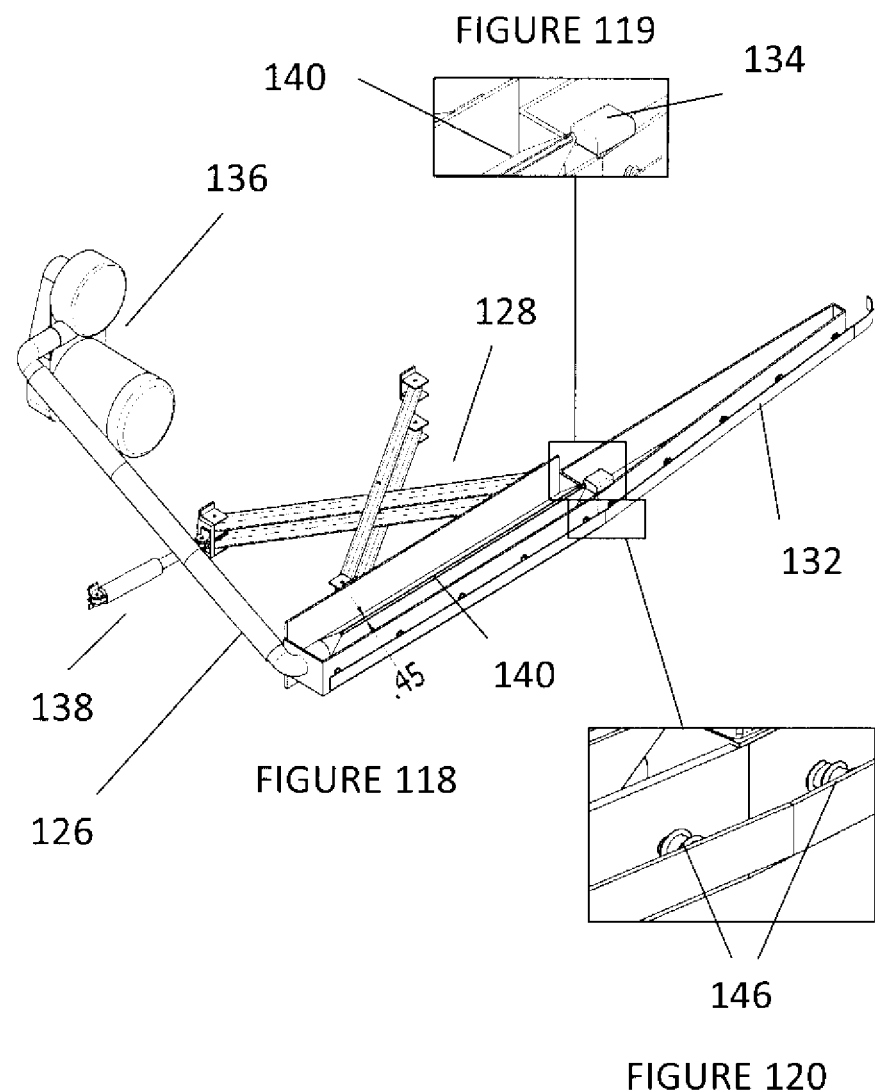

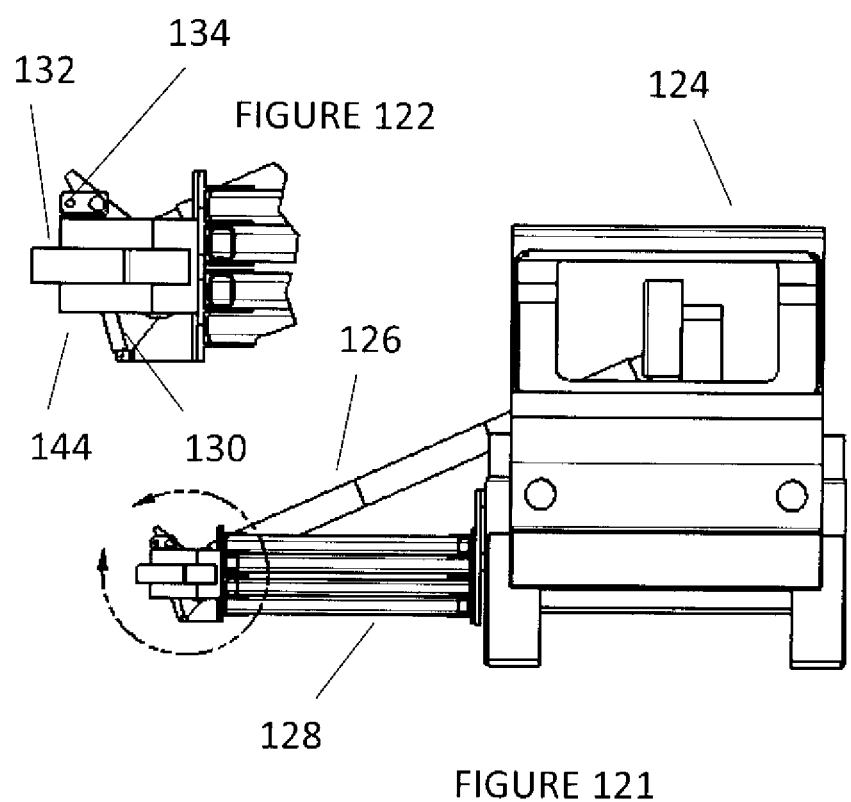

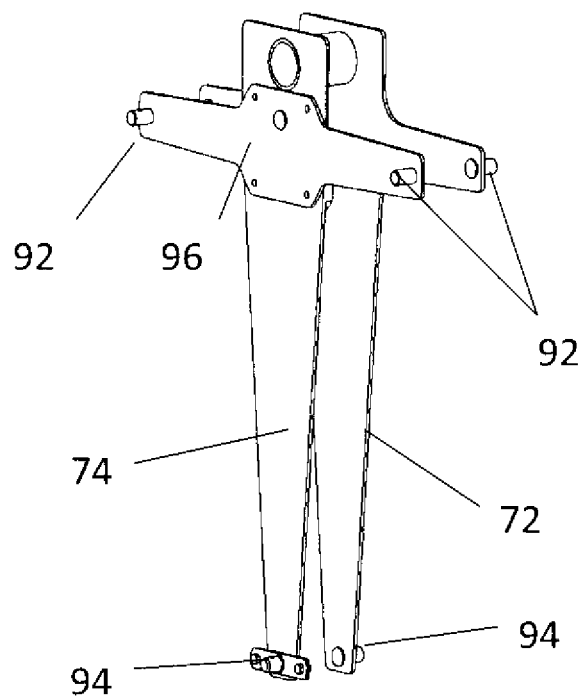
FIGURE 132
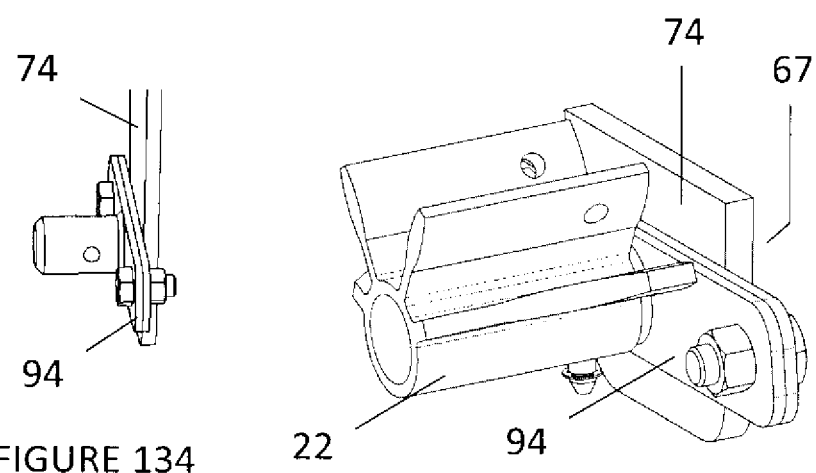
FIGURE 134
FIGURE 133

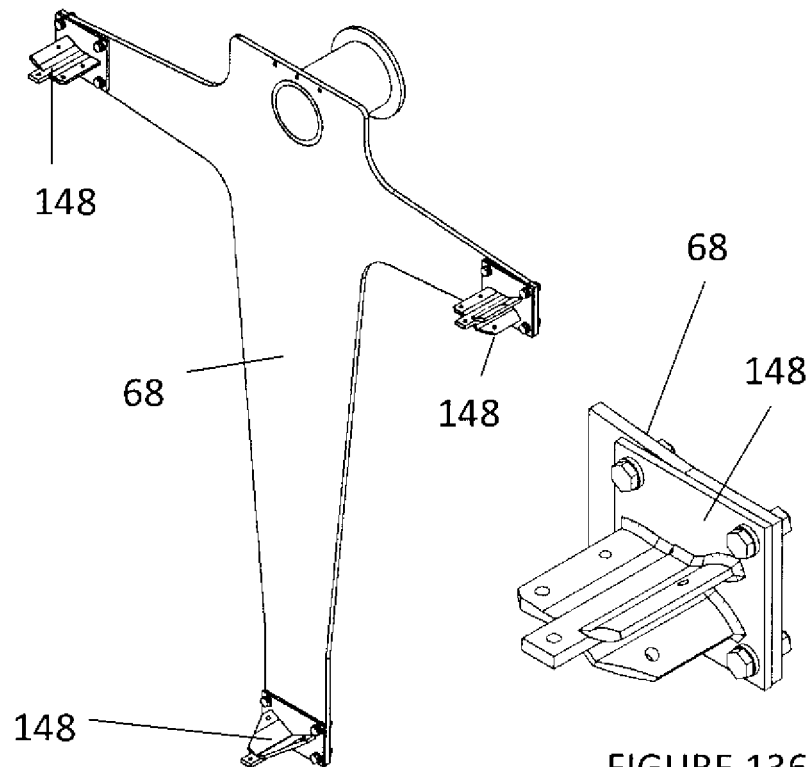
FIGURE 135
FIGURE 136
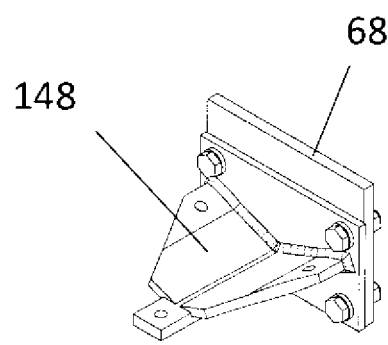
FIGURE 137

DISPLACEMENT
INCHES

A= .012 - .013

B= .011

C= .009 – .010

D= .008

SOLAR MIRROR ARRAY SYSTEM, METHODS AND APPARATUSES THERETO

CROSS-REFERENCE TO RELATED APPLICATIONS

This application is a divisional of U.S. patent application Ser. No. 13/598,963 filed Aug. 30, 2012, now U.S. Pat. No. 9,951,971, which is a non-provisional of U.S. provisional application Ser. No. 61/573,275 filed Sep. 2, 2011, and claims priority therefrom, and is a continuation-in-part of U.S. patent application Ser. No. 13/135,137 filed Jun. 27, 2011, and is a continuation-in-part of U.S. patent application Ser. No. 12/927,812 filed Nov. 24, 2010, and is a continuation-in-part of U.S. patent application Ser. No. 12/798,757 filed Apr. 10, 2010, and is a continuation-in-part of U.S. patent application Ser. No. 12/587,043 filed Sep. 1, 2009, all of which are continuations-in-part of, and which this application is a continuation-in-part of, U.S. patent application Ser. No. 12/583,787 filed Aug. 26, 2009, which claims the benefit from U.S. provisional application Ser. No. 61/190,573 filed Aug. 29, 2008, all of which are incorporated by reference.

These concepts build upon the following WES patent applications all of which are incorporated by reference herein:

1. U.S. Ser. No. 12/583,787
2. U.S. Ser. No. 12/587,043
3. U.S. Ser. No. 12/798,757
4. U.S. Ser. No. 12/927,812
5. U.S. Ser. No. 13/135,137

FIELD OF THE INVENTION

The present invention is related to components of CSP (Concentrated Solar Power) frames including node, strut end piece, chord and beam designs and alternative methods of attaching these to their associated struts, chords, beams and nodes; it also covers elements of torque plate/node/attachment designs, solar frame alignment tools and a design to clean dust or sand from mirrors without the use of water (limited resource in arid regions). (As used herein, references to the "present invention" or "invention" relate to exemplary embodiments and not necessarily to every embodiment encompassed by the appended claims.) Some of inventions, such as the use of cast or impact extruded strut/chord/beam end pieces fastened and/or bonded to longer structural members, have applicability to fields beyond CSP (in fact, to any potential structural application).

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art. CSP (Concentrated Solar Power), particularly the parabolic trough utility scale facilities, are a proven source of renewable energy. Florida Power and Light operates a facility in the Mojave Desert which has operated for decades, which is based on a steel framework supporting the parabolic mirrors. Parabolic mirrors focus sunlight on an oil filled tube, and the hot oil is transferred to a conventional steam electrical power plant (the hot oil boils the water to steam, which drives the turbines).

Nevada Solar One (NSO) came on line a few years ago—the first new parabolic trough CSP plant in the US since the Mojave Desert installation. NSO used aluminum extrusions, fabricated and assembled into mirror support frames instead of structural steel. Continued installation of these types of CSP utility scale operations requires continual development in the technologies to improve performance and reduce costs.

The WES solar frame designs (see prior WES patent applications noted above (Cross-Reference to related applications), incorporated by reference herein) incorporate improvements in the extruded and other profiles and components and in the way that they are combined into a framework to support the mirrors. These improvements yield a more efficient system—from profiles that are more easily extrudable at a wider variety of available extrusion operations through parts that are easily fabricated and assembled, utilizing the unique design opportunities provided by the aluminum extrusion process and by other processing and joining techniques discussed in this patent application which work to both enhance performance and reduce the overall cost of the final installation.

BRIEF SUMMARY OF THE INVENTION

The present invention pertains to an apparatus for transferring force to a frame of a solar mirror array. The frame has at least one structural element. The apparatus comprises a torque plate. The apparatus comprises at least one node attached to and in contact with the plate which connects with the structural element.

The present invention pertains to a method for transferring force to a frame of a solar mirror array. The frame has at least one structural element. The method comprises the steps of attaching a node to a torque plate. There is the step of attaching the structural element to the node of the frame which supports solar mirrors.

The present invention pertains to an apparatus for attaching a primary solar mirror frame array with a secondary mirror frame array. The apparatus comprises a primary torque plate having an upper portion and a bottom. The apparatus comprises a secondary torque plate having an upper portion and a bottom. The apparatus comprises a torque plate bearing attached to the primary and secondary torque plate through an attachment flange of the primary and secondary torque plate. The primary and secondary torque plates attach to an end of the primary and secondary frame, respectively, via nodes of the frames that fasten to the upper portions and the bottom of the respective plates. The flange between the primary and secondary torque plates allows for rotational alignment between the primary and secondary torque plates.

The present invention pertains to a solar trough frame for holding solar mirrors. The frame comprises a plurality of chords which include a top layer of only 4 chords essentially in parallel with each other. The frame comprises a plurality of struts. The frame comprises a plurality of nodes that connect to the struts and chords. The frame comprises a platform supported by the chords and struts on which the solar mirrors are disposed.

The present invention pertains to a method of forming a solar trough frame for holding solar mirrors of a solar frame array. The method comprises the steps of attaching a first strut to a top layer having at least 4 chords essentially in parallel with each other. There is the step of attaching a second strut to the top layer upon which a platform is supported and on which the mirrors are disposed.

The present invention pertains to a structural element for a support frame for solar mirrors of a solar array. The structural element comprises a strut end piece. The structural element comprises a strut. The structural element comprises adhesive disposed between the strut and the strut end piece which fixedly attaches the strut and the strut end piece together.

The present invention pertains to a structural element for a support frame for solar mirrors of a solar array. The structural element comprises a strut end piece. The structural element comprises a strut fixedly attached with solid phase bonds to the strut end piece formed from strut and strut end piece without any additional solder or weld material.

The present invention pertains to a method for attaching a strut and a strut end piece together. The method comprises the steps of placing the strut end piece in contact with the strut. There is the step of rotational welding the strut end piece to the strut.

The present invention pertains to a method for attaching a strut and a strut end piece together. The method comprises the steps of placing the strut end piece in contact with the strut. There is the step of friction stir welding the strut end piece to the strut.

The present invention pertains to an apparatus for cleaning mirrors of a solar mirror array on a support frame having pylons from a vehicle. The apparatus comprises a blower assembly mounted on the vehicle. The apparatus comprises a blower mounted on the assembly that blows air at a mirror of the array when the vehicle is positioned alongside the mirror, the assembly moving the blower up and down.

The present invention pertains to an apparatus for aligning a longitudinal member. The apparatus comprises a holder having an adjustment mechanism that fits with a first end of the first longitudinal member which holds a laser. The apparatus comprises a receiver that fits with a second end of the longitudinal member. The receiver has a grid upon which light from the laser shines. The adjustment mechanism adjusted so the light from the laser is centered about an axis of the longitudinal member.

The present invention pertains to a method for aligning longitudinal members between two solar frames so the two solar frames are aligned. The method comprises the steps of fitting a holder having an adjustment mechanism which holds a laser with a first end of a first longitudinal member of a first frame. There is the step of fitting a receiver with a second end of the first longitudinal member, the receiver having a grid upon which light from the laser shines, the adjustment mechanism adjusted so the light from the laser is centered about an axis of the first longitudinal member. There is the step of removing the receiver from the first longitudinal member. There is the step of placing the receiver into a first end of a second frame's longitudinal member so that the second frame can be aligned to the first frame.

The present invention pertains to a node for connecting struts and chords of a support frame for solar mirrors of a solar mirror array. The node comprises a solid central portion having a first end to which the chord is attached and which chord has an axis along its length substantially in alignment with a longitudinal axis of the central portion. The central portion has fins which extend from the central portion. The fins define at least two pairs of parallel spaced opposing substantially flat surfaces. The surface of each pair is spaced equidistantly from a center plane between them to which a strut is attached to each pair.

BRIEF DESCRIPTION OF THE SEVERAL VIEWS OF THE DRAWING

In the accompanying drawings, the preferred embodiment of the invention and preferred methods of practicing the invention are illustrated in which:

FIG. 20 shows an extruded & drilled hollow node fin adaptor
FIG. 21 shows an extruded & drilled hollow node fin adaptor variant
FIG. 52 shows a two piece SEP 3 for pins or adhesive—End view
FIG. 53 shows a two piece SEP 3 for pins or adhesive—ISO view
FIG. 60 shows a two piece SEP 4 & adaptor sub-assembly—Apart
FIG. 61 shows a two piece SEP 4 & adaptor sub-assembly—Joined
FIG. 118 shows a Mirror blower assembly print—ISO View Top View
FIG. 119 shows a Mirror blower assembly print—Detailed camera and proximity senor view
FIG. 120 shows a Mirror blower assembly print—Detailed guide rail view
FIG. 121 shows a Mirror dust blower—mounted to side of truck—Front View
FIG. 122 shows a Mirror dust blower—mounted to side of truck—Detailed head View—Front

FIG. 132 shows a Hollow node torque plate

FIG. 133 shows a Hollow node torque plate connection with node

FIG. 134 shows a Hollow node torque plate connection without node

FIG. 135 shows an Up-dated Solid node torque plate connection (welded)

FIG. 136 shows an Up-dated Solid node torque plate connection (welded)—Top IS node detail FIG. 137 shows an Up-dated Solid node torque plate connection (welded)—Bottom center node detail

DETAILED DESCRIPTION OF THE INVENTION

Figure 1:
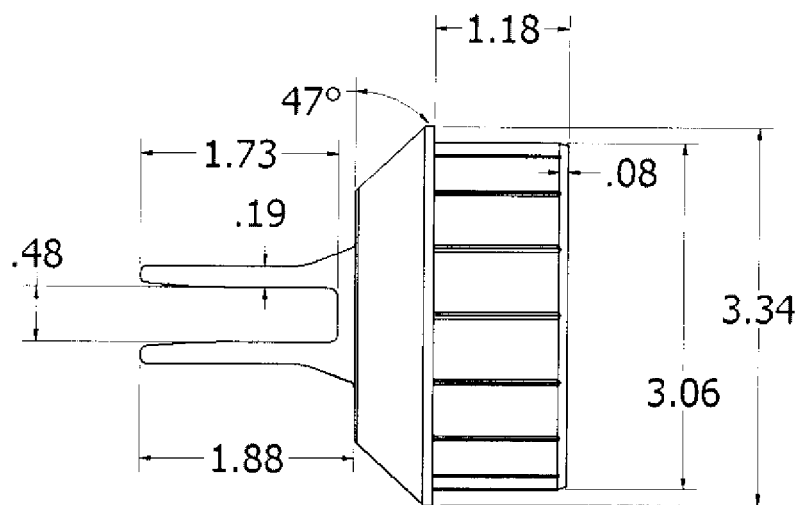
FIG. 1 shows an impact extrusion SEP (strut end piece) for I.D. strut adhesion—Side View
Figure 2:
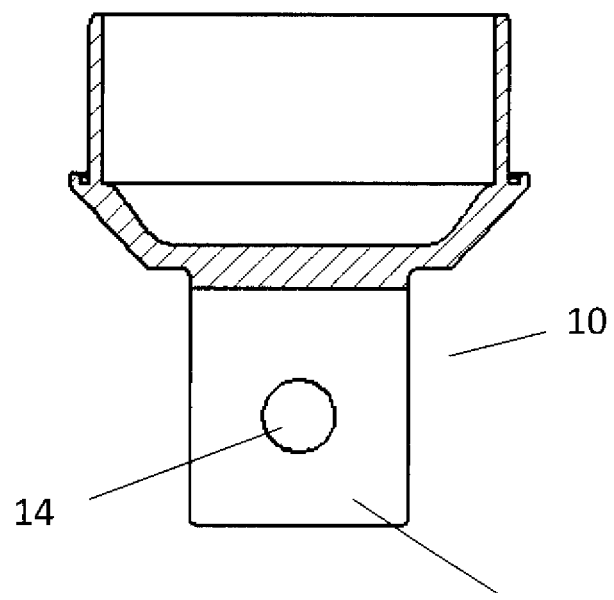
FIG. 2 shows an impact extrusion SEP (strut end piece) for I.D. strut adhesion—Cross-section view
Figure 3:
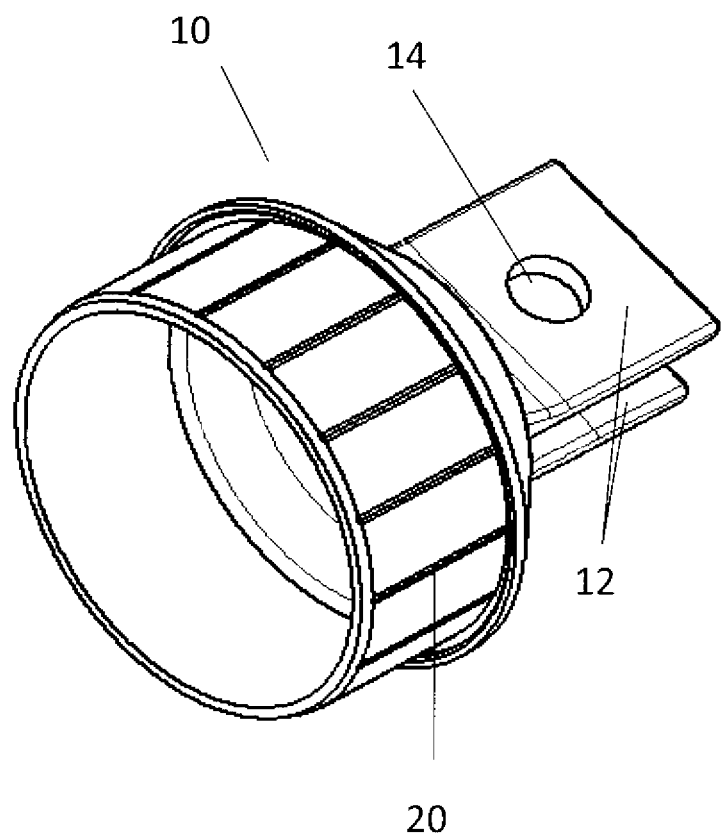
FIG. 3 shows an impact extrusion SEP for I.D. strut adhesion—ISO view
Figure 4:
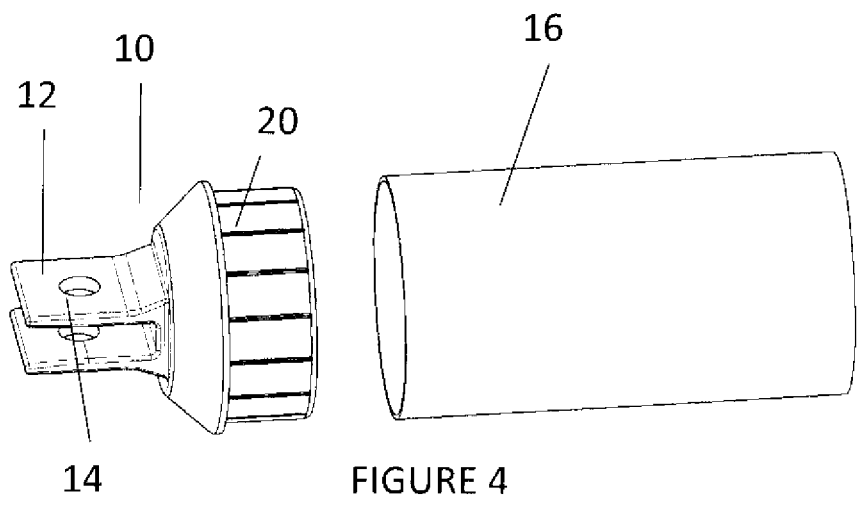
FIG. 4 shows an impact extrusion SEP for I.D. strut adhesion and strut assembly—Apart
Figure 5:
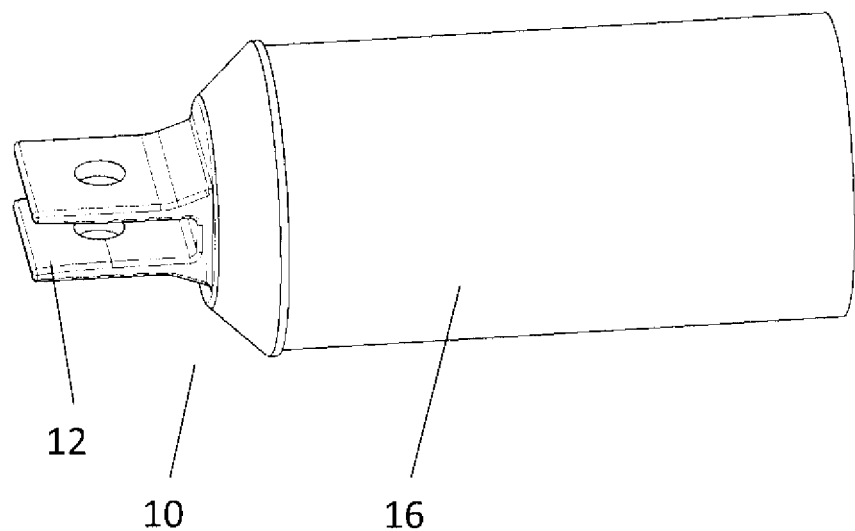
FIG. 5 shows an impact extrusion SEP for I.D. strut adhesion and strut assembly—Joined
Figure 6:
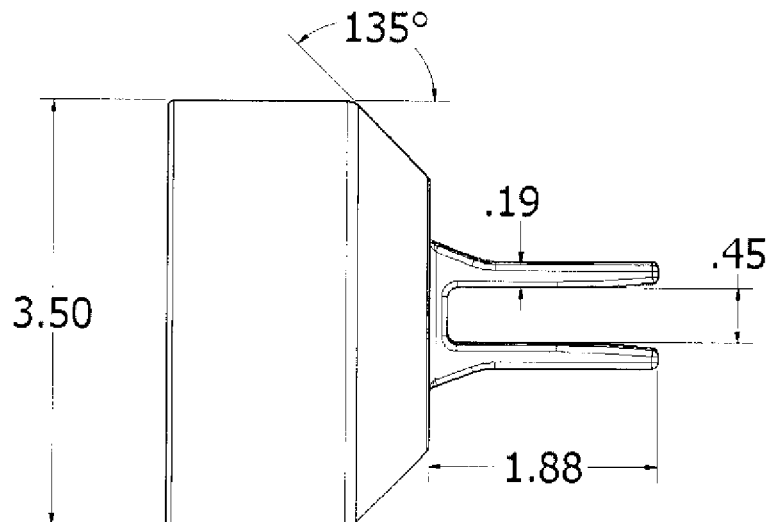
FIG. 6 shows an impact extrusion SEP for O.D. strut adhesion—Side view
Figure 7:
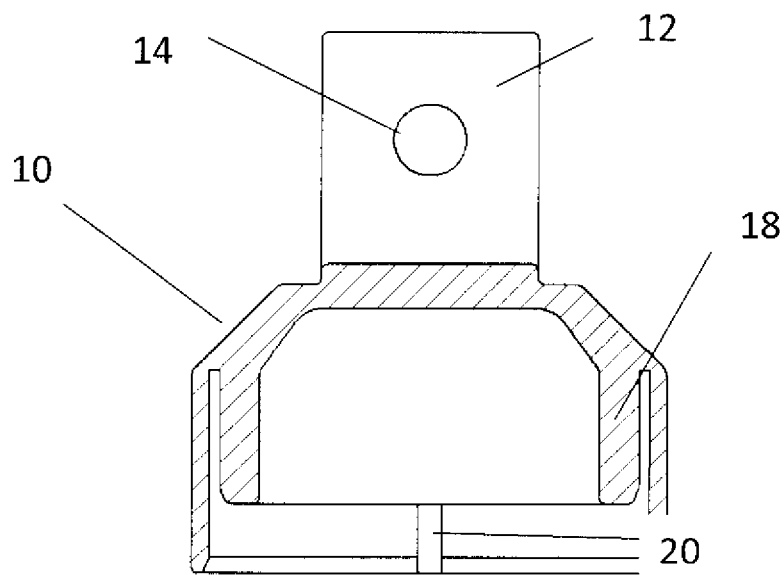
FIG. 7 shows an impact extrusion SEP for O.D. strut adhesion—Cross-section view

Referring now to the drawings wherein like reference numerals refer to similar or identical parts throughout the several views, and more specifically to FIGS. 75-102, 113 and 133 thereof, there is shown an apparatus 67 for transferring force to a frame 58 of a solar mirror array. The frame 58 has at least one structural element, such as a strut 16 or a chord 60. The apparatus 67 comprises a torque plate 68. The apparatus 67 comprises at least one node 22 attached to and in contact with the plate 68 which connects with the structural element.

The node 22 may have at least one fin 24 extending from the node's outer surface. The node 22 may have a solid central portion. The torque plate 68 can withstand a force greater than 1,800 lbs. The torque plate can withstand a minimum torque load of about 150,591 in-lbs. The plate 68 thickness may be about 9/16".

The present invention pertains to a method for transferring force to a frame of a solar mirror array. The frame has at least one structural element. The method comprises the steps of attaching a node to a torque plate. There is the step of attaching the structural element to the node of the frame which supports solar mirrors.

The present invention pertains to an apparatus 77 for attaching a primary solar mirror frame 58 array with a secondary mirror frame 58 array. The apparatus 77 comprises a primary torque plate 72 having an upper portion and a bottom. The apparatus 77 comprises a secondary torque plate 74 having an upper portion and a bottom. The apparatus 77 comprises a torque plate bearing 76 attached to the primary and secondary torque plates through an attachment flange 80 of the primary and secondary torque plate. The primary and secondary torque plates attach to an end of the primary and secondary frame, respectively, via nodes 22 of the frames 58 that fasten to the upper portions 79 and the bottom 81 of the respective plates. The flange 80 between the primary and secondary torque plates allows for rotational alignment between the primary and secondary torque plates.

The primary torque plate 72 may have an attachment flange 80 and the secondary torque plate 74 may have a matching hole 82 pattern to that of the primary torque plate's 72 attachment flange 80, and the bearing 76 is attached to the primary and secondary torque plates through the attachment flange 80 of the primary and secondary torque plates. The apparatus may include a first lifting bracket 88 attached to the primary torque plate 72 and a second lifting bracket 88 attached to the secondary torque plate 74 for lifting the frame 58 via the primary and secondary torque plates. The primary torque plate 72 may have a cross shape. The upper portion 79 of the primary torque plate may have a first cross arm 83 and a second cross arm 85.

Figure 73:
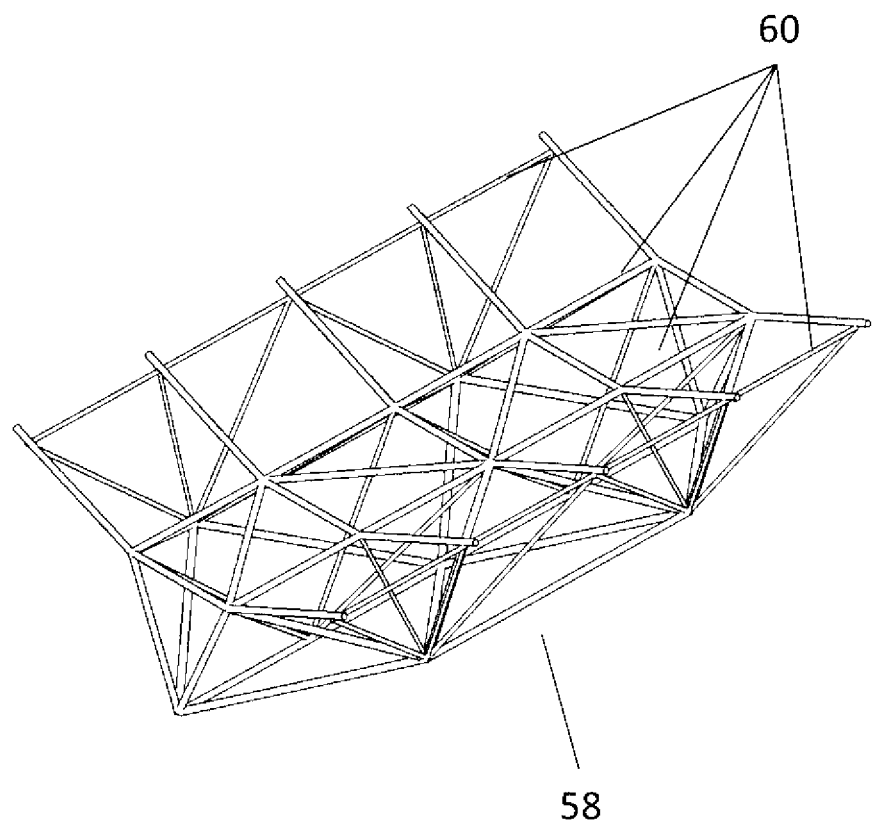
FIG. 73 shows a Series 7 frame showing 4 top chords—ISO view
Figure 74:
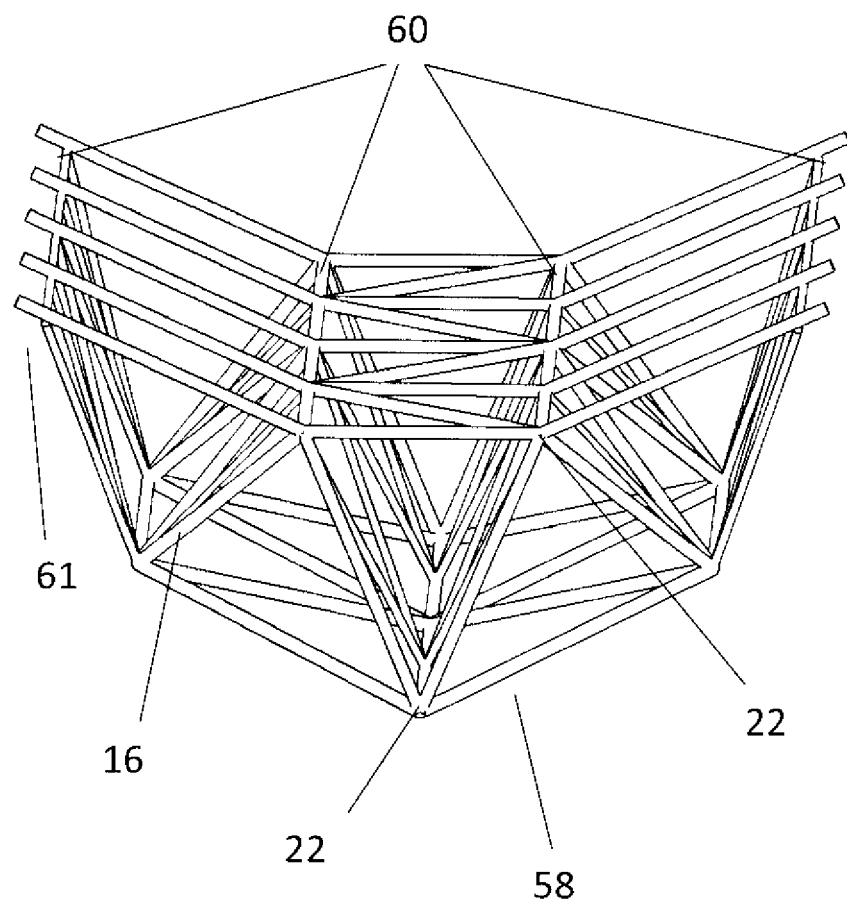
FIG. 74 shows a Series 7 frame showing 4 top chords—front view
Figure 75:
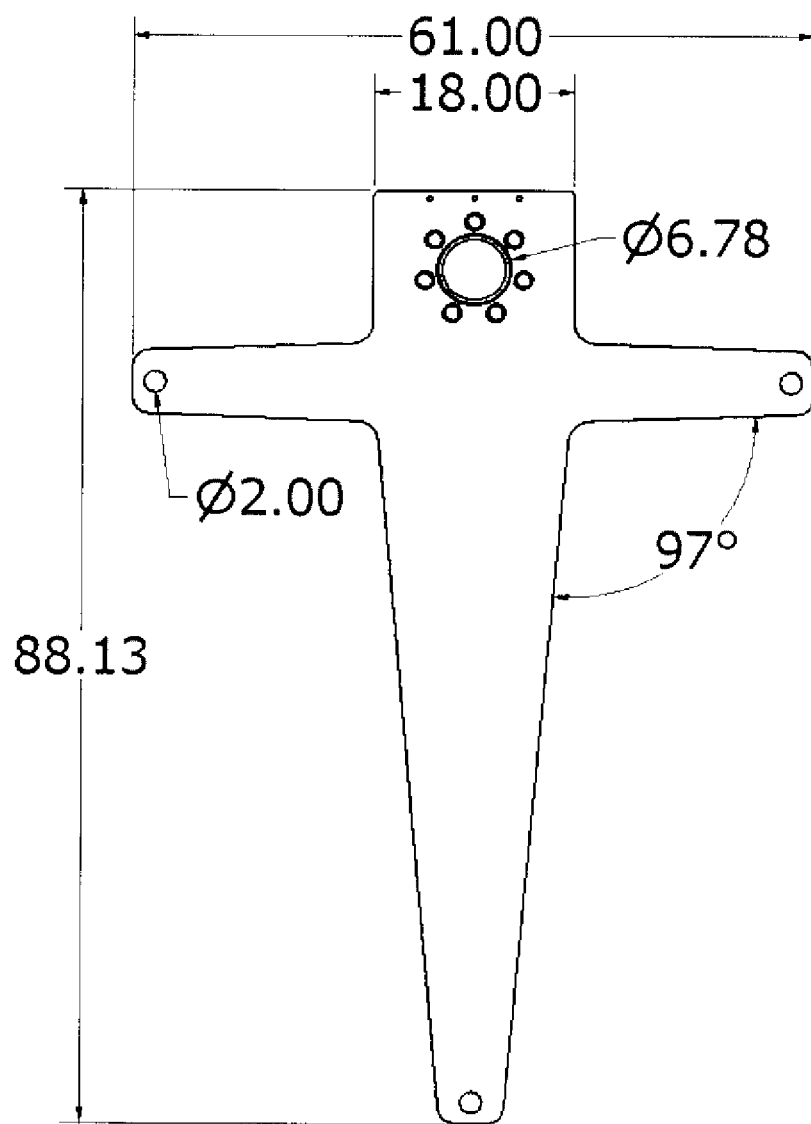
FIG. 75 shows a two piece double torque plate J—front view
Figure 76:
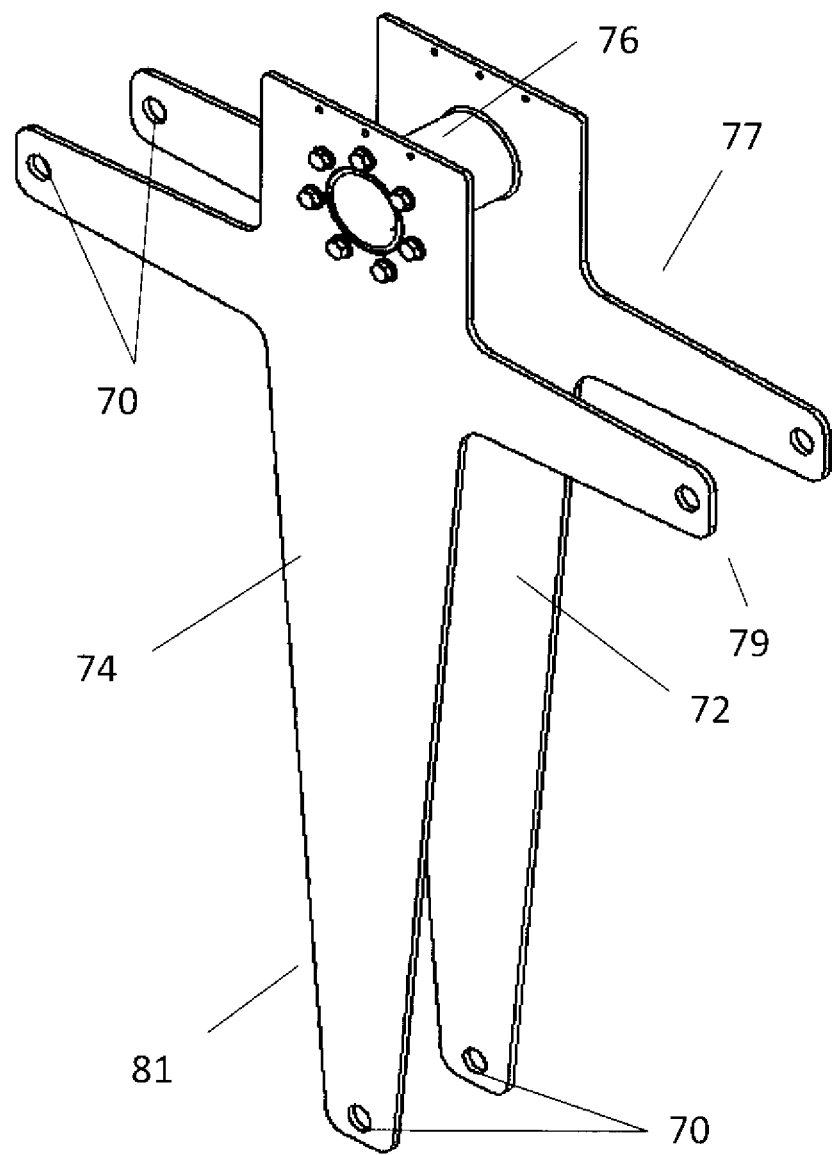
FIG. 76 shows a two piece double torque plate J—ISO view
Figure 77:
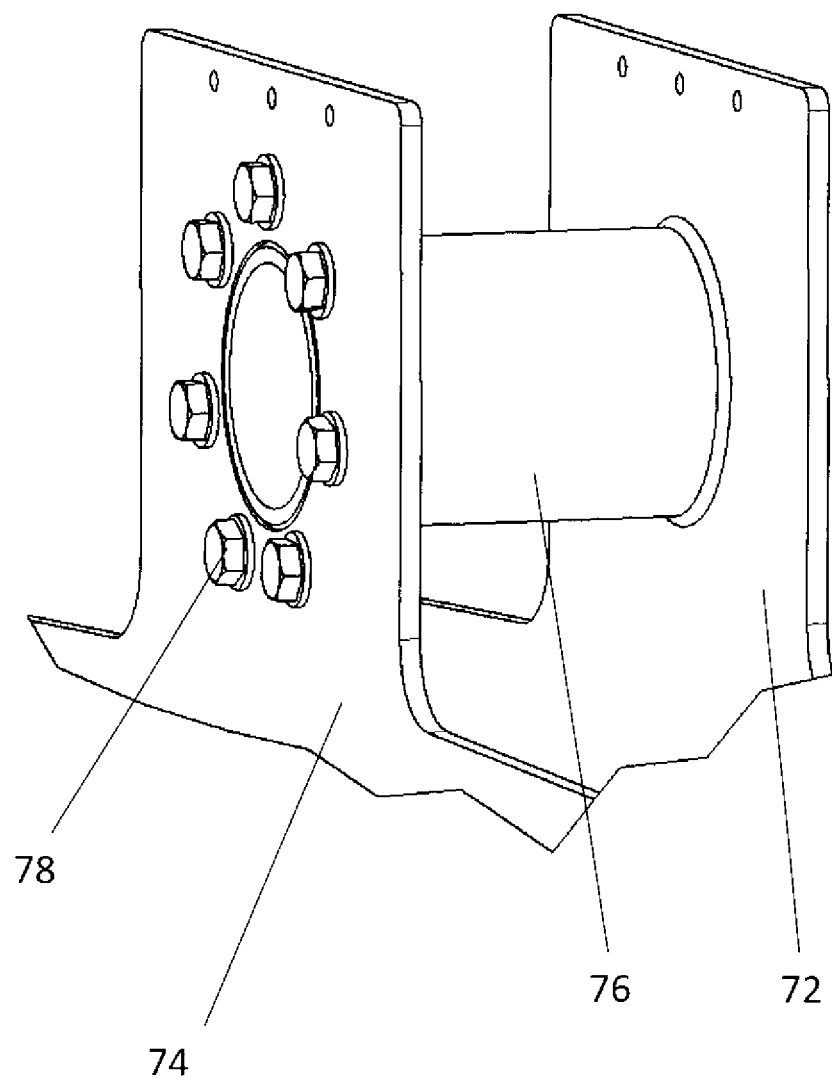
FIG. 77 shows a two piece double torque plate J—connection detail
Figure 78:
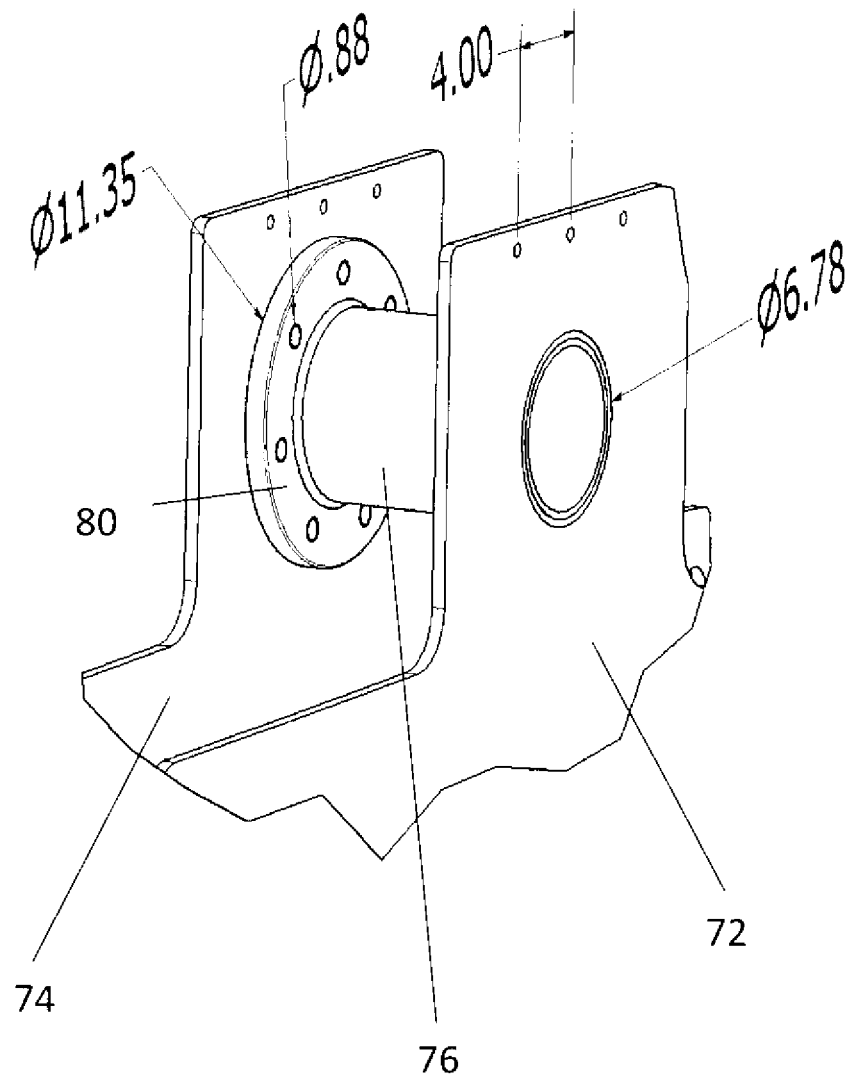
FIG. 78 shows a two piece double torque plate J—rear connection detail
Figure 79:
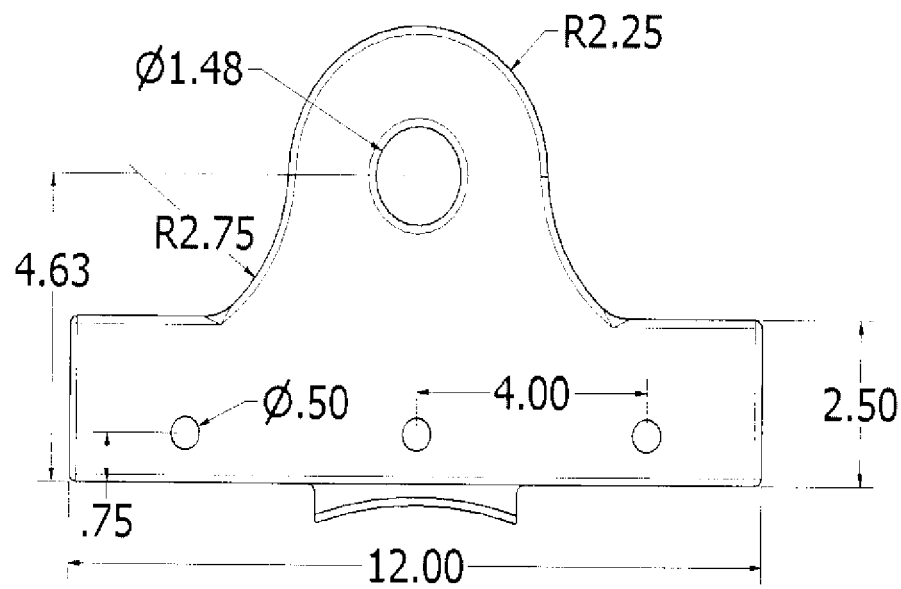
FIG. 79 shows a two piece double torque plate J lifting fixture—End View Back
Figure 80:
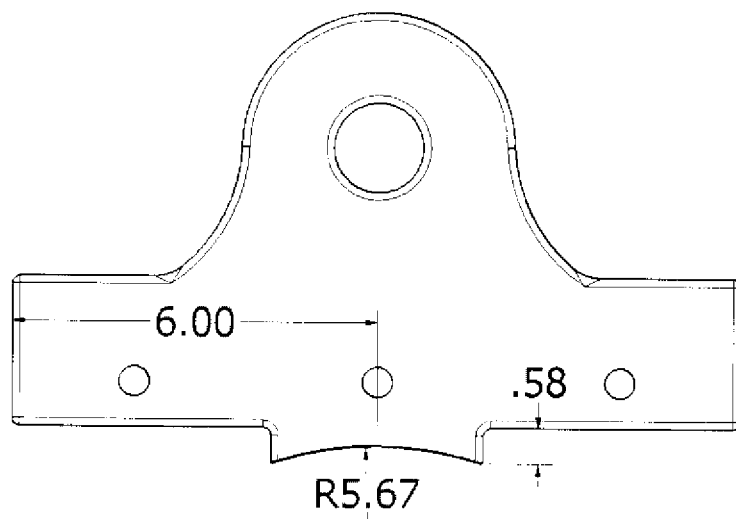
FIG. 80 shows a two piece double torque plate J lifting fixture—End view Front
Figure 81:
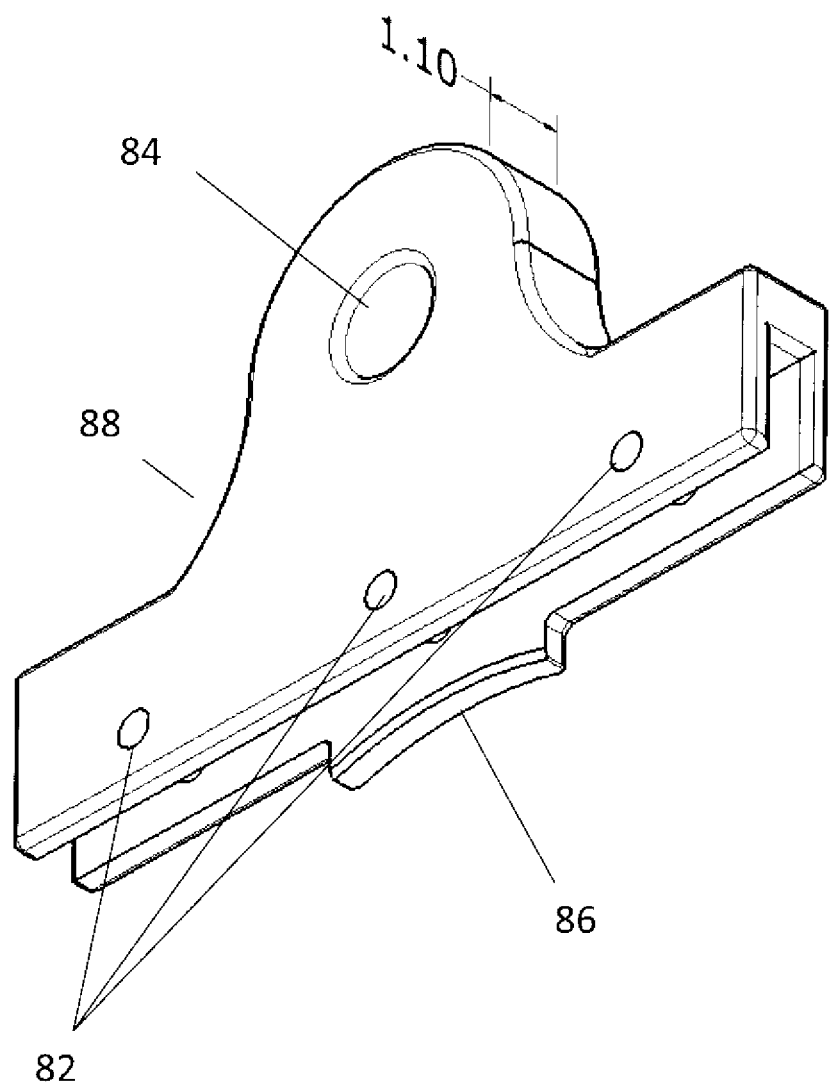
FIG. 81 shows a two piece double torque plate J lifting fixture—ISO view
Figure 82:
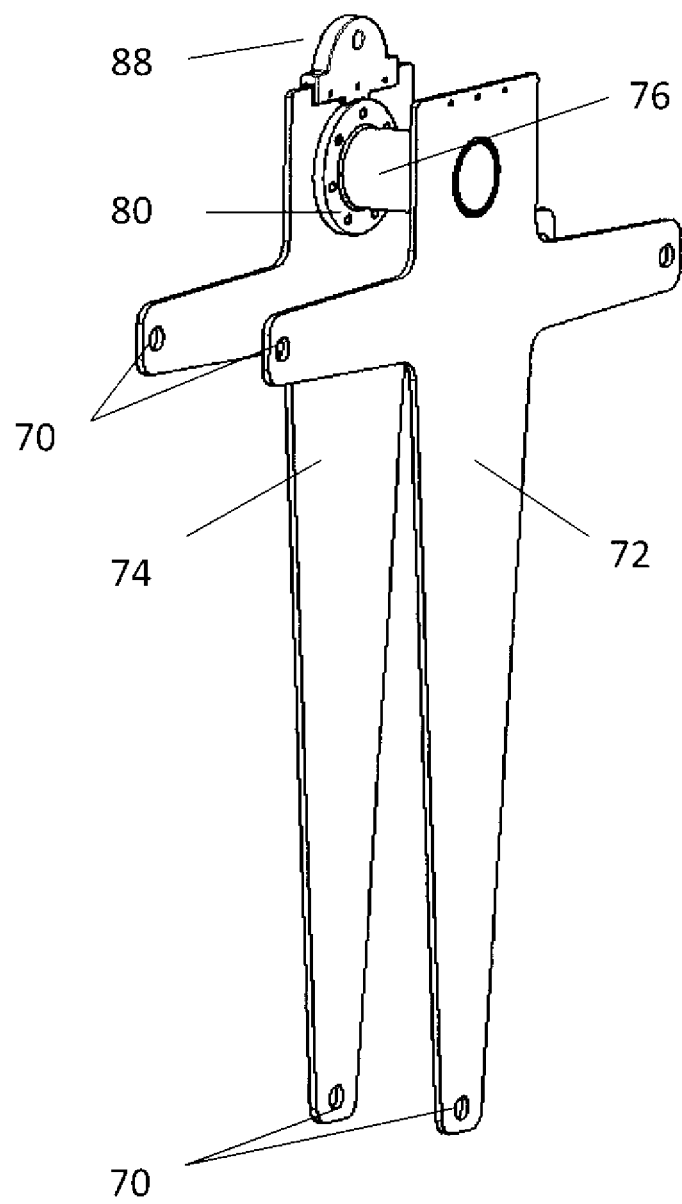
FIG. 82 shows a two piece double torque plate J & lifting fixture assembly
Figure 83:
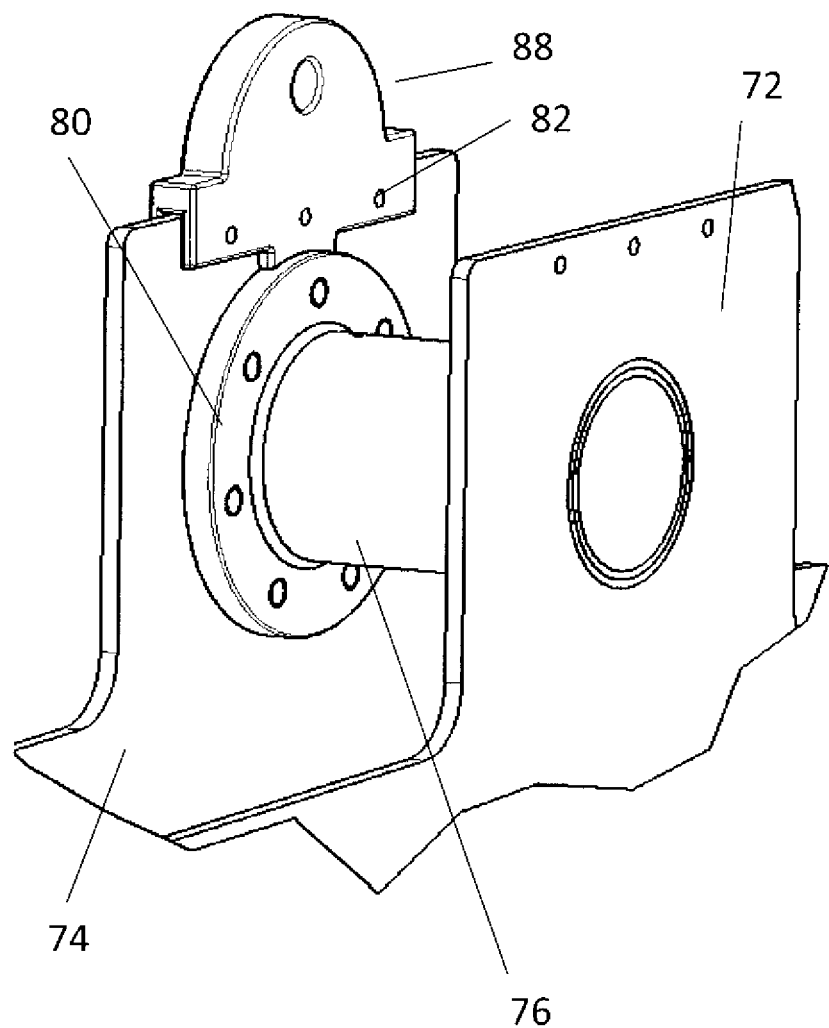
FIG. 83 shows a two piece double torque plate J & lifting fixture assembly detail
Figure 84:
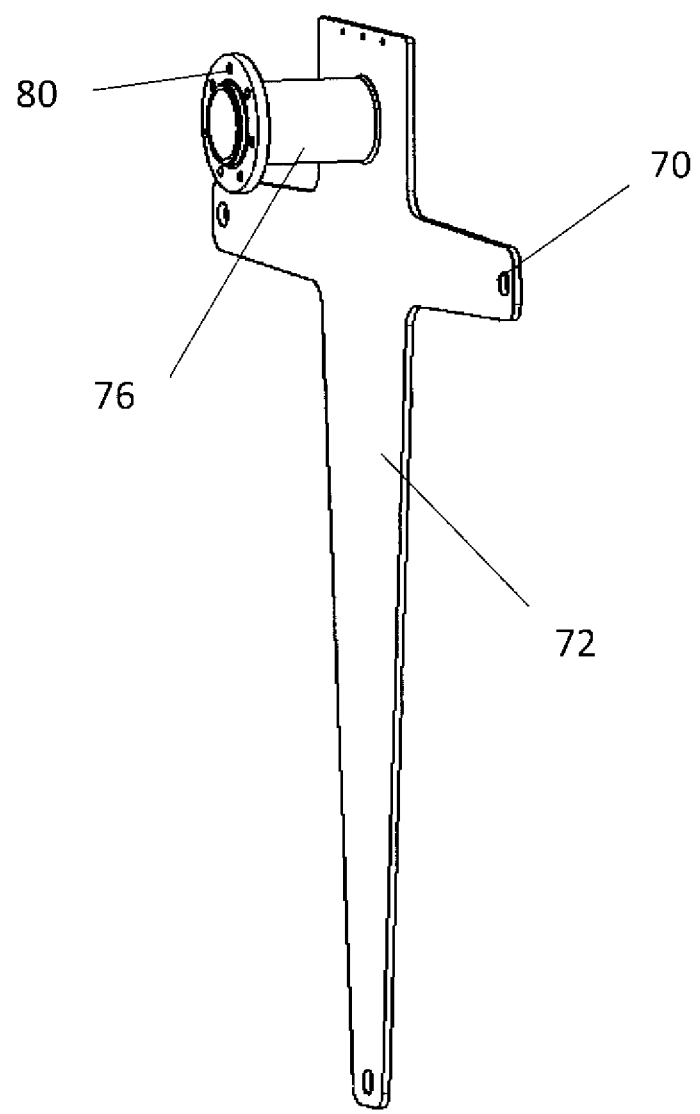
FIG. 84 shows a two piece double torque plate J—one side only—ISO view
Figure 85:
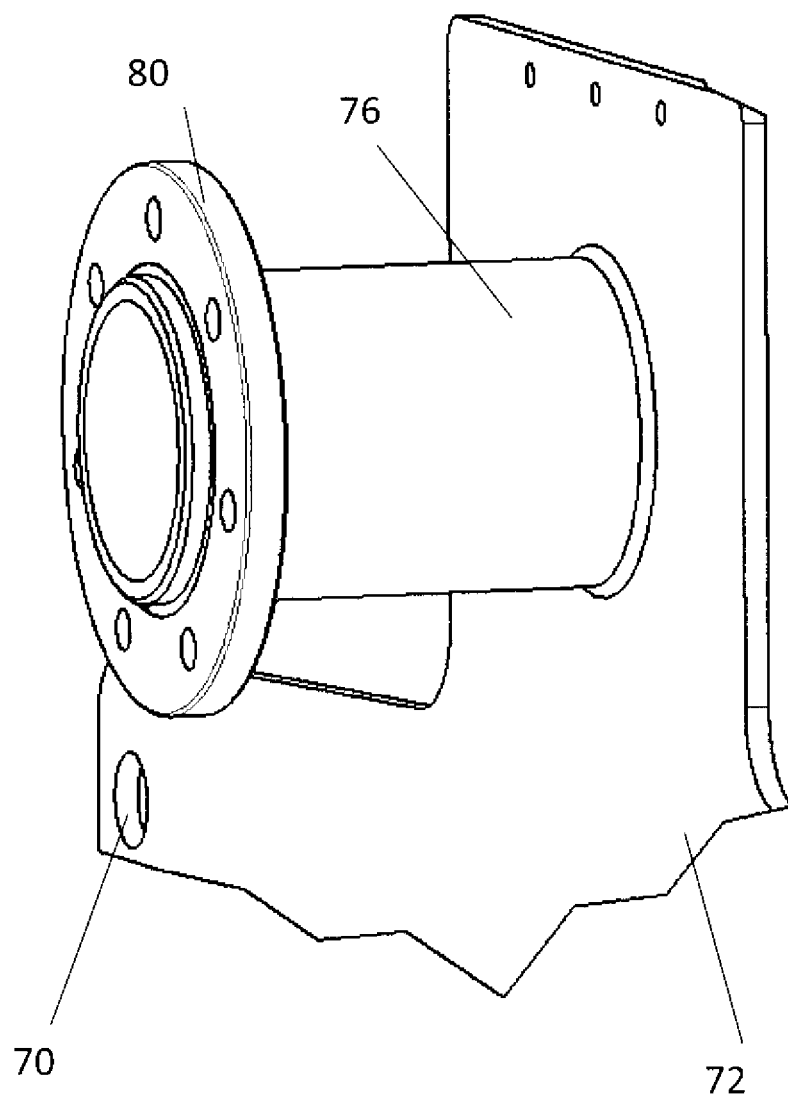
FIG. 85 shows a two piece double torque plate J—one side only detail

The present invention pertains to a solar trough frame 58, as shown in FIGS. 73 and 74, for holding solar mirrors 122. The frame 58 comprises a plurality of chords which include a top layer 61 of at least 4 chords 60, or alternatively only 4 chords 60 essentially in parallel with each other. The frame 58 comprises a plurality of struts 16. The frame 58 comprises a plurality of nodes 22 that connect to the struts 16 and chords 60. The frame 58 comprises a platform 123 supported by the chords 60 and struts 16 on which the solar mirrors 122 are disposed.

The four chords 60 of the top layer may have axial force limits of a minimum of about 500 lbs. The frame 58 may include a torque plate 68 having two connections to the top layer of chords 60. At least one of the four chords 60 of the top layer 61 may be one continuous piece that extends the frame's entire length. Alternatively, at least one of the four chords 60 of the top layer 61 is formed of segmented chords 28 that together extend the frame's entire length. The four chords 60 of the top layer 61 may have axial force limits of a maximum of about 20,674 lbs.

The present invention pertains to a method of forming a solar trough frame for holding solar mirrors of a solar frame array. The method comprises the steps of attaching a first strut to a top layer having at least 4 chords essentially in parallel with each other. There is the step of attaching a second strut to the top layer upon which a platform is supported and on which the mirrors are disposed.

The present invention pertains to a structural element for a support frame for solar mirrors of a solar array. The structural element comprises a strut end piece. The structural element comprises a strut. The structural element comprises adhesive disposed between the strut and the strut end piece which fixedly attaches the strut and the strut end piece together.

The element may include guides disposed between the strut and the strut end piece to provide spacing for the bonded joint. The strut wall thickness may be between 0.035 and 0.250" and the strut end piece thickness may be between 0.050 and 1.000". Together the strut and the strut end piece form a joint that can withstand loads up to between 20 and 20,000 lbs. The element may include a fastener which also attaches the strut and the strut end piece. No fastener may be used to attach the strut and the strut end piece.

The present invention pertains to a structural element for a support frame for solar mirrors of a solar array. The structural element comprises a strut end piece. The structural element comprises a strut fixedly attached with solid phase bonds to the strut end piece formed from strut and strut end piece without any additional solder or weld material.

The present invention pertains to a method for attaching a strut and a strut end piece together. The method comprises the steps of placing the strut end piece in contact with the strut. There is the step of rotational welding the strut end piece to the strut.

The present invention pertains to a method for attaching a strut and a strut end piece together. The method comprises the steps of placing the strut end piece in contact with the strut. There is the step of friction stir welding the strut end piece to the strut.

The present invention pertains to an apparatus for cleaning mirrors of a solar mirror array on a support frame having pylons from a vehicle. The apparatus comprises a blower assembly mounted on the vehicle. The apparatus comprises a blower mounted on the assembly that blows air at a mirror of the array when the vehicle is positioned alongside the mirror, the assembly moving the blower up and down.

The blower assembly may automatically position itself relative to the pylons, frames and mirrors. The apparatus may include an impact avoidance mechanism disposed on the vehicle to avoid impact by the vehicle with the pylons, frames and mirrors as the vehicle moves.

The present invention pertains to an apparatus for aligning a longitudinal member. The apparatus comprises a holder having an adjustment mechanism that fits with a first end of the first longitudinal member which holds a laser. The apparatus comprises a receiver that fits with a second end of the longitudinal member. The receiver has a grid upon which light from the laser shines. The adjustment mechanism adjusted so the light from the laser is centered about an axis of the longitudinal member.

The present invention pertains to a method for aligning longitudinal members between two solar frames so the two solar frames are aligned. The method comprises the steps of fitting a holder having an adjustment mechanism which holds a laser with a first end of a first longitudinal member of a first frame. There is the step of fitting a receiver with a second end of the first longitudinal member, the receiver having a grid upon which light from the laser shines, the adjustment mechanism adjusted so the light from the laser is centered about an axis of the first longitudinal member. There is the step of removing the receiver from the first longitudinal member. There is the step of placing the receiver into a first end of a second frame's longitudinal member so that the second frame can be aligned to the first frame.

The present invention pertains to a node for connecting struts and chords of a support frame for solar mirrors of a solar mirror array. The node comprises a solid central portion having a first end to which the chord is attached and which chord has an axis along its length substantially in alignment with a longitudinal axis of the central portion. The central portion has fins which extend from the central portion. The fins define at least two pairs of parallel spaced opposing substantially flat surfaces. The surface of each pair is spaced equidistantly from a center plane between them to which a strut is attached to each pair.

In the operation of the present invention, the description of the present invention, which follows, incorporates further improvements to the WES designs, covering the node 22, strut 16, strut end piece 10, chord, chord end piece 36, beam 46, beam end piece 38, torque plate 68, torque plate nodes, torque plate 68 alignment and adjustments and other components of the frame design and means to join these components together as needed for the design; a water free mirror 122 cleaning system is also disclosed. Separately and together these enhancements yield the improved designs, performance and costs.

SEP (Strut End Piece) 10/Strut 16 & CEP (Chord End Piece) 36/Chord terminology can often be used interchangeably; the location of the part determines what it's called (chords, whether single long pieces or segmented, often refer to the space frame members that extend along the longitudinal direction of the frame while struts 16 are members that are not along this direction).

The prior patent applications included (but are not limited to) the following:

Mirror 122 Support Structures using tubes loaded axially
    Modified I-beams as mounting means for Mirror 122 Support Structures
    Configuration of Main Supports/Longitudinal Members and Connectors
    Strut Designs
    Strut end piece 10 concept and design
    Means of fastening Strut end piece 10 to Connectors-vs-pins, rivets, bolts or other fasteners, flat-to-flat
    Fabrication and Assembly methodology
    Automatic mirror 122 cleaning/water collection/reclamation system
    Single Fin Sleeve
    Guided Insertion Strut end piece 10
    Swaged Strut End Connection
    Angled "Knuckle" Hinge Connector
    Additional Alternative Strut 16 and Strut end piece 10 Designs
    Hollow Single Fin node 22
    Hollow Single Fin node 22 design utilizing chord and chord end piece 36-vs-through chord (more detail on node 22 designed to best accommodate the hollow single fins)
    Torque plate 68 solid node 22 design
    Rolling Rib Location concepts
    Other design elements:
        Beam 46 and Beam end piece 38 Connector design
        Angled Beam 46 with Beam end piece 38 on one end/bracket on the top, eliminating extra pieced beyond Nodes A&B
        Mirror 122 Support Rail and Bracketry designs
        Mirror 122 rail to mirror 122 bracket designs
        Mirror 122 rail to Beam 46 connection designs
        Collector Tube Upright connection designs
        Pin and clip designs This patent application includes (but is not limited to) the following:

Different designs of strut end piece 10 designs (extruded, cast, die cast, impact extruded, etc.) single and multiple piece designs
    Different designs of chord end pieces 36
    Different designs of beam end pieces 38
    Alternative fastening of strut end pieces 10 to strut ends (and segmented chord 28 end pieces to chord ends) via adhesives, pinning, riveting, bolting, or other fasteners (may not be flat-to-flat)
    Inertia Friction Welding
    friction stir welding
    WES series 7 frame utilizing 4 top chords 60
    Various torque plate 68 design details with node 22, fastening and adjustment designs
        One piece double torque plate 68
        Two piece double torque plate 68
        Hollow node 22 connection design
        Welded solid node 22 connection design
    Frame Laser 114 alignment tool holder & receiver 120 and methodology for use
    Mirror blower design for cleaning mirrors 122 without using water Element Summary:
10—SEP
12—SEP fin
14—SEP attachment hole
16—Strut
18—Centering guides
20—Minimum gap guides
22—Node
24—Node fin
26—CEP (Chord End Piece) variant
28—Segmented Chord
30—Hollow node fin adaptor
32—Node attachment hole
34—Hollow node fin adaptor variant
36—CEP (Chord End Piece)
38—BEP (Beam End Piece)
40—Beam attachment hole
42—Node fin slot
44—Fastener hole
46—Beam
48—SEP (strut end piece) adaptor
50—Strut attachment hole
52—Vertical wall
54—Ball attachment
56—Lock nut
58—Solar frame
60—Top Chords
61—Top layer
62—Mating surface
64—Friction welded area
66—Horizontal walls
67—Apparatus for transferring
68—Torque Plate
70—Torque plate pin hole
72—Primary plate
74—Secondary plate A
76—Torque plate bearing
77—Apparatus for attaching
78—Attachment bolt
79—Upper portion
80—Attachment flange
81—Bottom
82—Torque plate attachment holes
83—First cross arm
84—Lift hole
85—Second cross arm
86—Flange seat
88—Lifting fixture
90—Attachment flange variant
92—Torque plate pin
94—Adjustable pin plate
96—Secondary plate B
98—Bolt guard
100—Non-adjustment pin plate
102—BEP (beam end piece) attachment hole
104—Beveled edge
106—Adaptor slot
108—Adjustment knobs
110—Laser holder
112—Friction tab
114—Laser
116—Alignment grid
118—Laser beam
120—Laser receiver
122—Mirror 123—Platform
124—Truck
126—Air supply tube
128—Scissor support arms
130—Blower duct adjustment power cylinder
132—Guide rails
134—Camera & proximity sensor
136—Blower & motor
138—Scissor support arm power cylinder
140—Blower duct
142—Pylon
144—Mirror blower assembly
146—Guide rail springs
148—Solid Node torque plate 68 connection (welded)
150—Deformation of hollow center portion For clarity, the following description will utilize the element numbers (noted as #) and figure numbers (noted as FIG. #). For communication purposes, the various items in this patent application can be grouped into the following categories (please note that some items from one category (for example, strut end pieces 10), such as fastening means (pins, bolts, rivets, adhesives, Inertia Friction Welding, friction stir welding, even how some of the end pieces fit into the longer portions (struts 16/chords/beams 46, etc.) may apply equally well to other listings (for example chord end pieces 36) but will not be completely re-explained in each description):

1. Strut end piece 10/strut designs: Many of the components of the WES CSP solar frame 58 design share common design features. In prior patent applications WES disclosed the various designs of struts 16, chords and beams 46; while some of these were configured as single pieces with fastening holes, many of the designs utilize a long tubular central portion (strut 16, for example) with one or two end pieces (strut end pieces 10, for example) fastened to the ends. The same design philosophy can be used for chords, beams 46 or potentially other structural members. For simplicities sake, the remainder of this description will use the terms "strut" and "strut end piece", although the same concept can be applicable to the other types of members.

In conventional space frames or trusses, the end connection of the struts 16 either to other structural members or to intermediate nodes 22 is critical, as the forces which are carried by the members must be transferred through the parts ends. Single piece struts, for example, can have pinned, riveted, bolted or otherwise fastened (mechanically interlocking, adhesively bonded, welded, etc.) connections (again, for the sake of simplicity, these will be called "pinned" for this description).

For simplicity, struts 16 loaded in a pure axial fashion are discussed (no moments applied to the members); this is often the case in the types of space frame designs used by CSP parabolic trough solar frames 58. In this document, Chords will also most often designate primarily axially loaded members while beams 46 often have side loads and moments applied to them (in the case of CSP frames often from the actual mirror 122 weight and mirror 122 wind loads attached to the beams 46). The axial forces carried by the strut 16 must be transferred to the pins (or other fastening means) and through these to the mating part (often a node 22). During component design analyses, it is important to ensure that the strut 16 and connection are designed to withstand these axial forces (reference requirements in the 2010 issue of the Aluminum Design Manual published by the Aluminum Association—widely recognized and used to guide designs of aluminum structures).

Where single piece struts 16 are used, the pins fastening these to the associated nodes 22 create bearing stresses on the strut 16 material surrounding the pins (whether the struts 16 are in axial tension or compression). As the wall thickness decreases, the bearing stress increases, so decreasing wall thickness can be a tradeoff with the negative effect of increasing bearing stress. Wall thicknesses of the strut 16 must also be consistent with the manufacturing capabilities of strut 16 production (greatly reduced wall thicknesses can often increase extrusion difficulty and cost of an extruded aluminum strut 16, for example).

1. Prior WES patent applications have shown detailed designs of strut 16 profiles to enhance the overall performance while reducing manufacturing and material cost (for example, the "Apple" strut 16 disclosed in patent application Ser. No. 12/798,757). The WES extruded strut end pieces 10 are designed to be fastened to the struts 16 with two or more pins (or fastened by other means), reducing the bearing stress per pin and thus decreasing the wall thicknesses required, while maintaining the assembly's capability to carry the overall axial loads; locally thickened strut 16 walls coupled with using multiple pins fastening the struts 16 to the strut end pieces 10 has been used as one way to ensure that the assembly performs adequately and that overall costs are kept low. The axial loads are thus transferred through the strut 16 walls to the multiple pins, and the extruded strut end piece 10 can then transfer the load to a single, larger diameter pin, acting on the strut end piece fins 12 which can be much thicker than the strut 16 walls (the strut 16 can be 4, 5 or more feet long while the strut end piece 10 is often only cut to a length of a few inches, so thicker fins add little to the weight (cost) of the structure as compared to having thicker strut 16 walls required at the fastener location.

This patent application will cover further enhancements to the strut 16 and strut end piece 10 designs (and beam 46/beam end piece 38 and chord/chord end piece 36 designs as well), designed to tradeoff end piece design and fastening means to the strut 16 with a more optimal strut 16 profile design.

The concept is to utilize adhesives, Inertia Friction Welding, friction stir welding, intermediate pieces or other means to spread the fastening load required to connect the end pieces to the longitudinal member (strut 16, chord, beam 46, etc.); by doing this, the strut 16 wall thickness can be kept as close to a consistent, thin, wall thickness as possible for the entire strut 16 profile, minimizing the overall weight (cost) of the strut 16. Similar to the discussion above, the end piece is then designed to transfer the longitudinal member's axial load to the pin connecting the thicker end piece fins to the associated node 22 connection.

a. Adhesive Bonding. FIGS. 1-16 illustrate various end piece design details for adhesive bonding; some of these design details will certainly be applicable to other fastening methods. Adhesively bonded joints work very well when the bond is loaded to induce shear within the bond material; bonded surfaces subject to tension, cleave or peel can also be accommodated, but not as readily. Adhesively bonded joints function well within a defined range of bond material thicknesses (for example, for a particular substrate and adhesive material, the ideal joint could be between 0.008" and 0.015" (although thicker and thinner joints can often be accommodated)). The designs shown in the figures utilize very thin raised portions 20 around the periphery of the end piece which help to prevent the end piece from "crowding" against one side (wall) of the longitudinal piece.

As disclosed in earlier WES patent applications the fastening of the end pieces to the longitudinal members can be accomplished by inserting the end pieces into the longitudinal member, perhaps in a jig of some sort, with the end pieces "joined" (pinned, bolted, adhesively bonded, etc. . . . ) to the longitudinal members. If the pieces are to be mechanically pinned or otherwise fastened, the mating holes can (but need not be) placed through both the longitudinal member and the end pieces while clamped together to allow for easy alignment and insertion of the pin(s) or fastener(s). Subsequent drilling, piercing or otherwise creating the hole for the pin or fasteners connecting the end pieces to the node fin(s) 24 can then be done to the sub assembled unit to ensure that the hole to hole distances between the end pieces are not subject to a buildup of tolerances.

The end piece can be manufactured by various means. The design shown in the figures could be cast, die cast, impact extruded or produced by other means. Depending on the capabilities of the production process, features such as the secondary internal wall shown in FIG. 7 can be incorporated to allow adhesive bonding of both the inside and outside surfaces of the longitudinal pieces (struts 16, chords, beams 46, etc.). The particular design shown is very deep, and would likely be difficult to produce, but other, shallower (from top to bottom as shown) depths would be possible. The other characteristic of this type of design feature is to assist in centering the longitudinal member.

Figure 8:
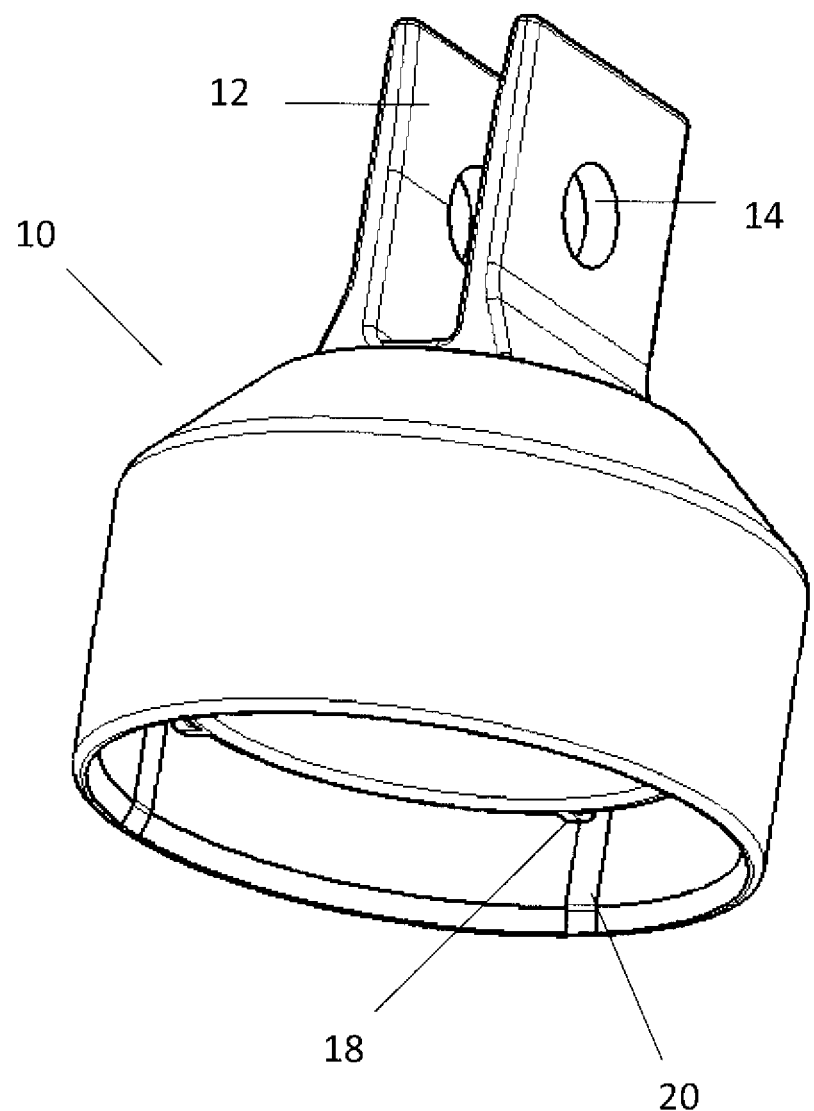
FIG. 8 shows an impact extrusion SEP for O.D. strut adhesion—ISO view
Figure 9:
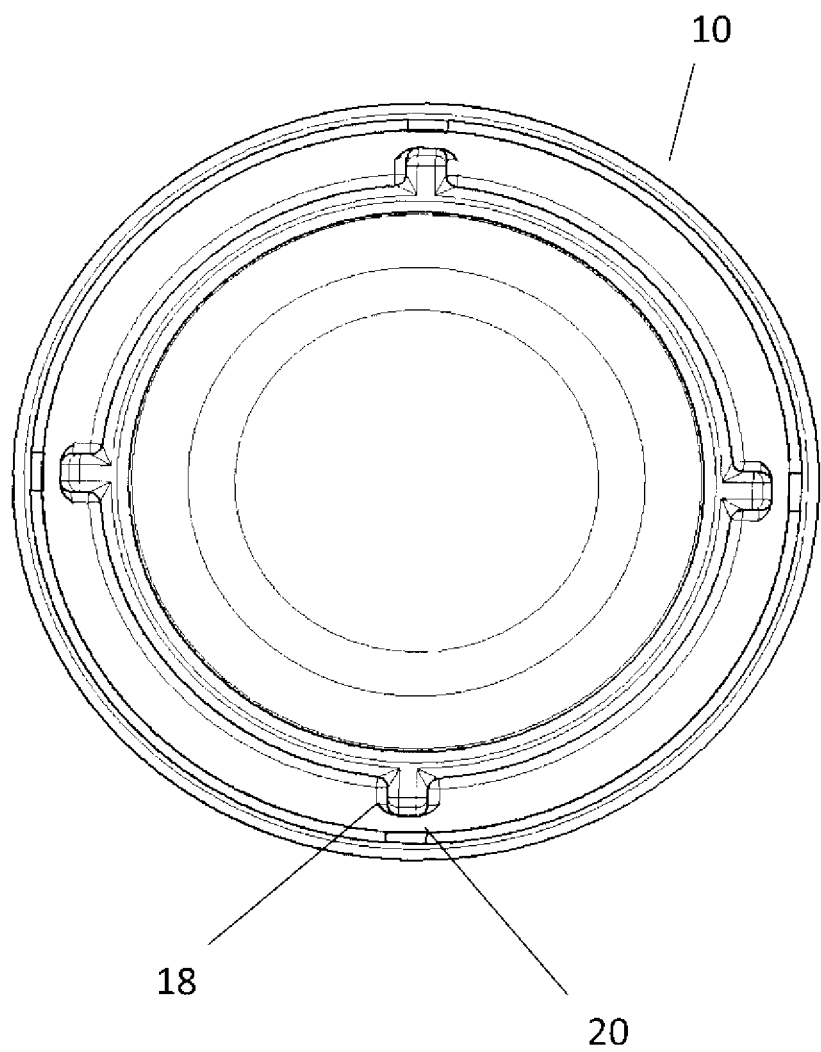
FIG. 9 shows an impact extrusion SEP for O.D. strut adhesion—bottom view
Figure 10:
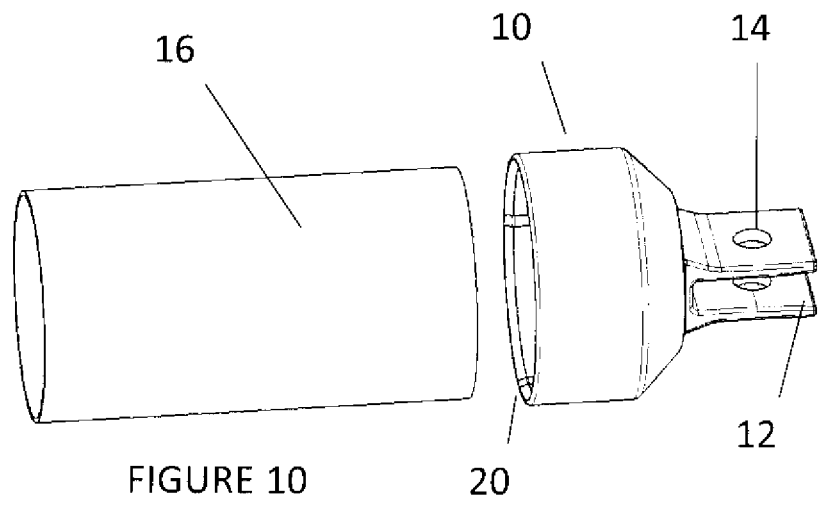
FIG. 10 shows an impact extrusion SEP for O.D. strut adhesion and strut assembly—Apart
Figure 11:
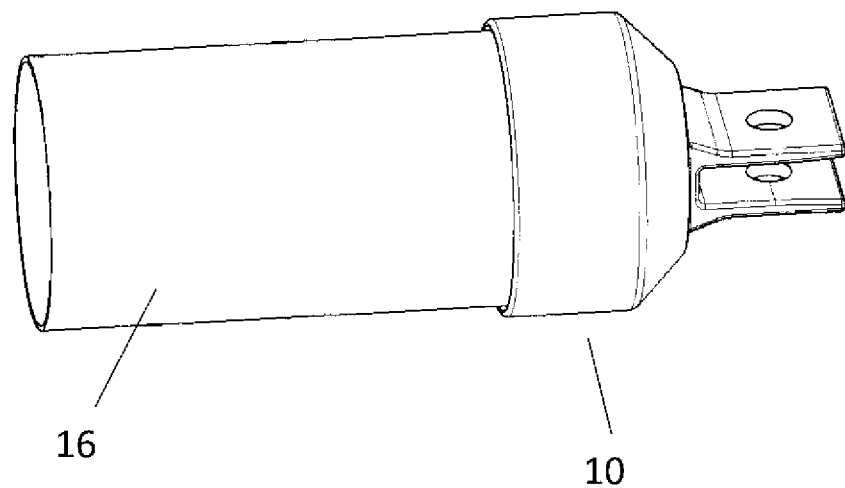
FIG. 11 shows an impact extrusion SEP for O.D. strut adhesion and strut assembly—Joined
Figure 12:
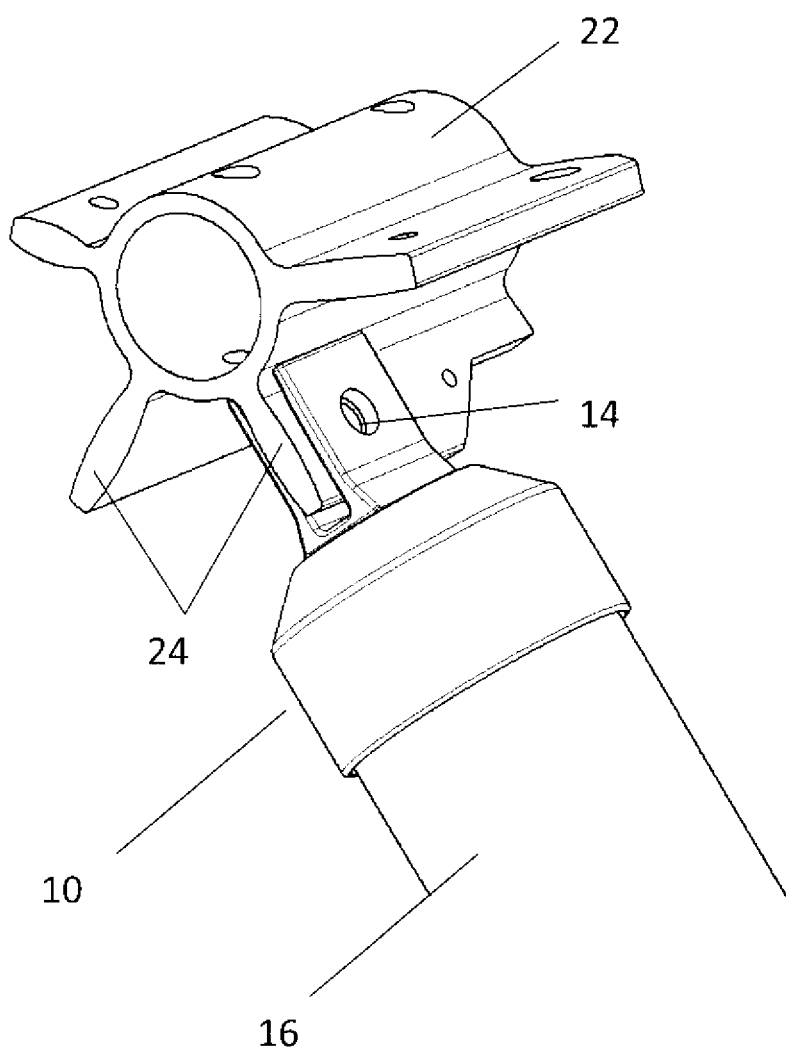
FIG. 12 shows an impact extrusion SEP for O.D. strut adhesion, strut & node assembly
Figure 13:
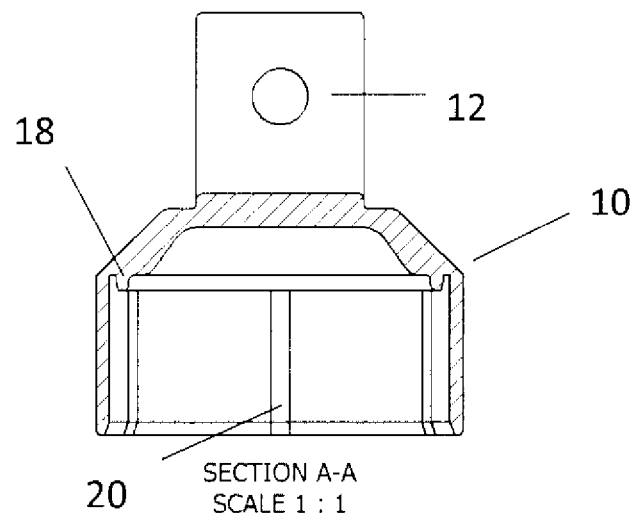
FIG. 13 shows an impact extrusion SEP for O.D. strut adhesion alternative design—Cross-section view
Figure 14:
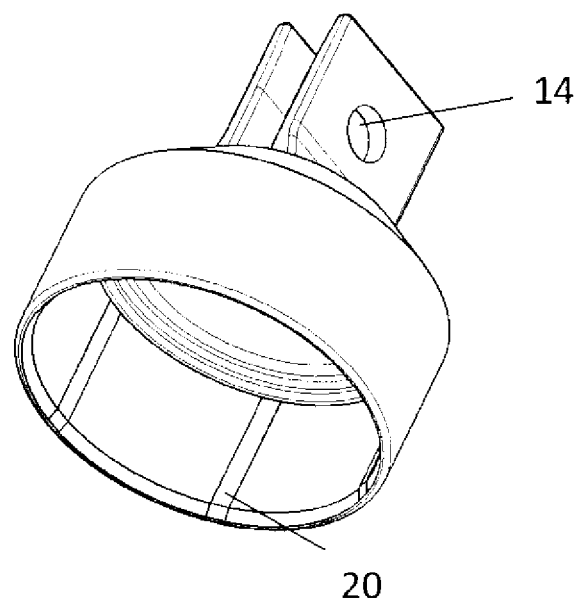
FIG. 14 shows an impact extrusion SEP for O.D. strut adhesion alternative design—ISO view
Figure 15:
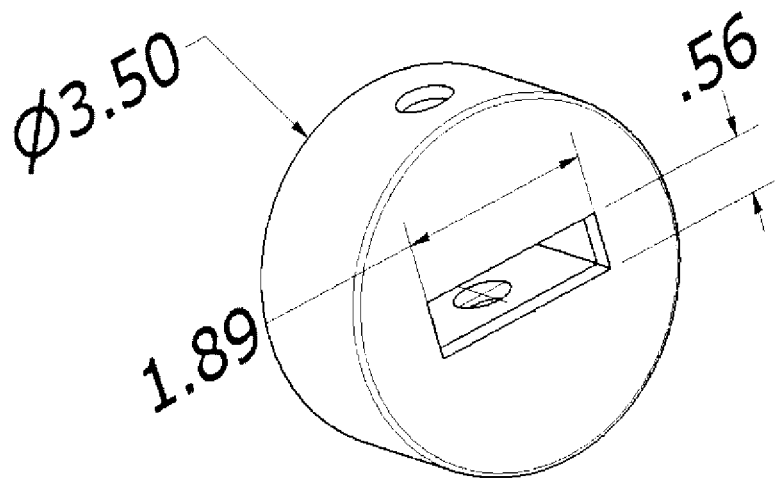
FIG. 15 shows an impact extrusion Strut/chord end piece variant—ISO front view
Figure 16:
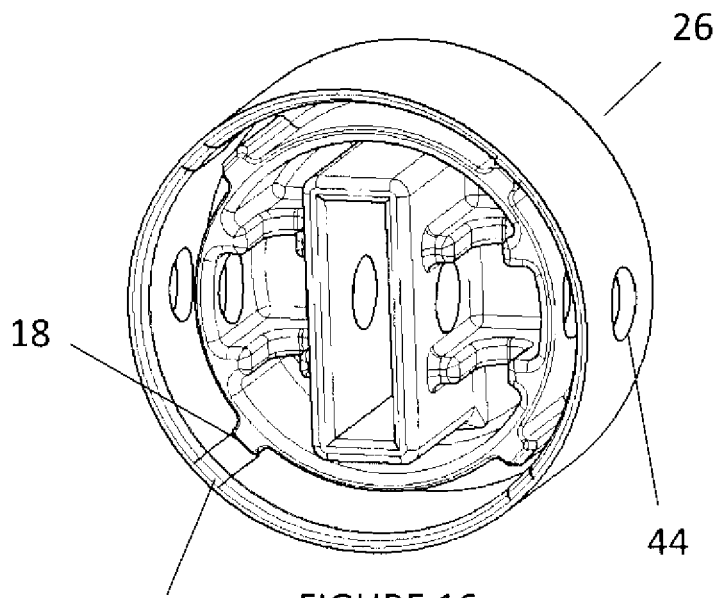
FIG. 16 shows an impact extrusion Strut/chord end piece variant—ISO back view
Figure 17:
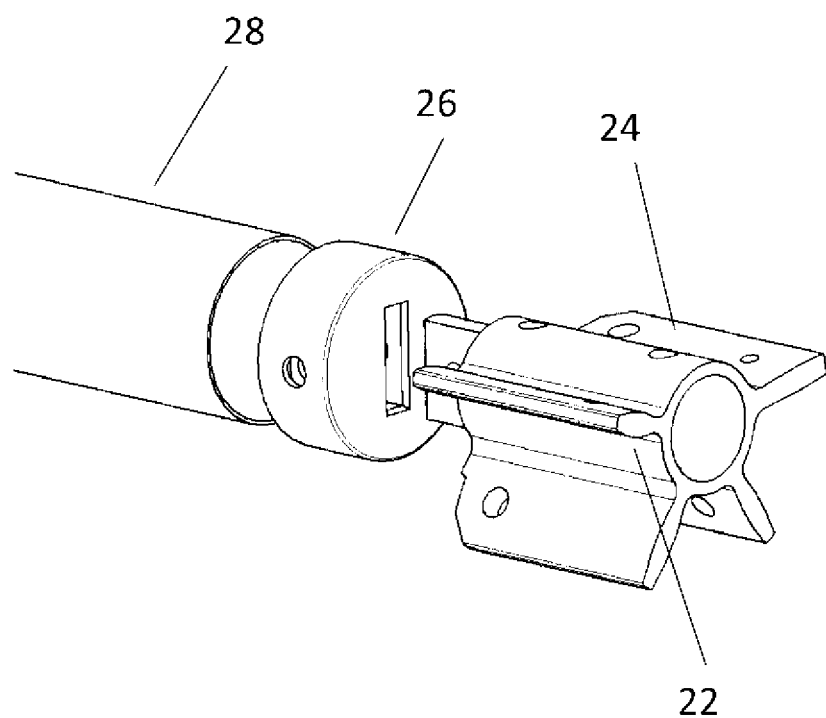
FIG. 17 shows an impact extrusion Strut/chord end piece variant assembly
Figure 18:
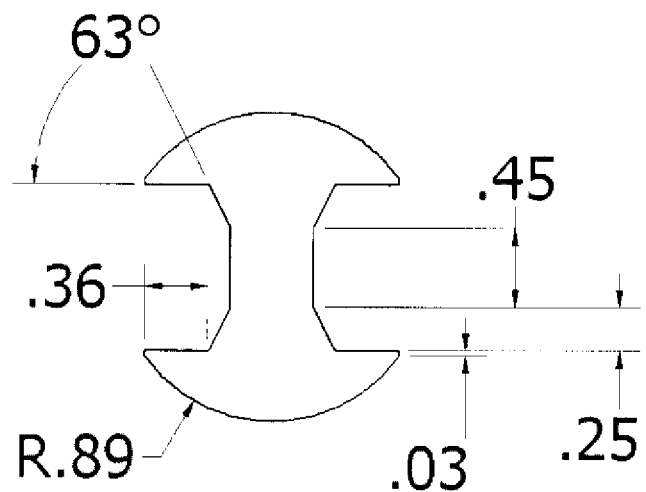
FIG. 18 shows an extruded & drilled hollow node fin adaptor—End View
Figure 19:
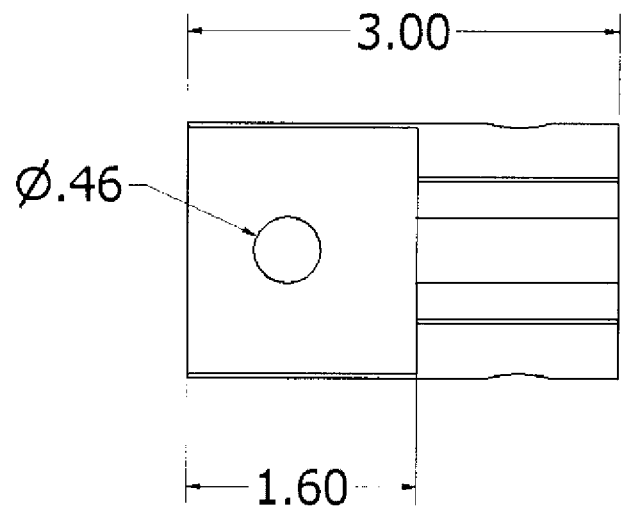
FIG. 19 shows an extruded & drilled hollow node fin adaptor—Side View
Figure 22:
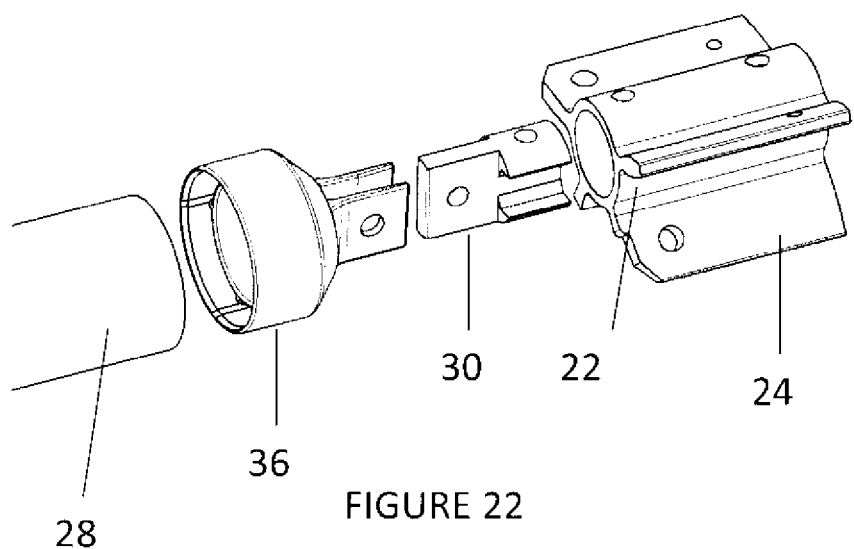
FIG. 22 shows an extruded & drilled hollow node end adaptor assembly—Apart
Figure 23:
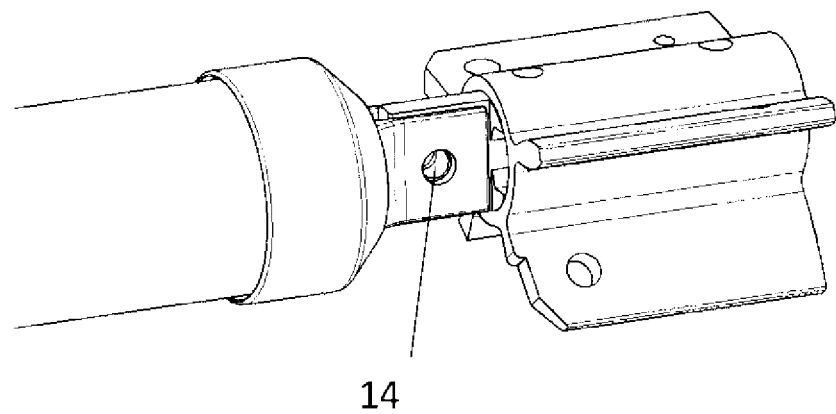
FIG. 23 shows an extruded & drilled hollow node end adaptor assembly—Joined

FIGS. 1-5 envision an end piece which slides inside of the longitudinal member while FIGS. 6-14 envision an end piece into which the longitudinal member is inserted (note the shallow "bond thickness" spacing designed in (FIGS. 8-10). The final design of how the inner or outer cups transition into the "fins" which attach to the node fin(s) 24 is a matter of structural design and manufacturing method (some, such as impact extrusion, are best suited to more "stepped" transitions (best seen in FIGS. 2, 6 and 10) while others, such as casting or die casting, may be better suited to designs where the "cup" more smoothly "flows" into the fin(s)).

Adhesively bonded joints rely on the bond material, substrates, cleanliness and/or preparation of the substrates and the total bond area (square inches of bond) for example. The designs shown in the associated figures contemplate a tubular longitudinal member and a cup-like end piece, but the longitudinal member profile and end piece can certainly vary. It is certainly conceivable to utilize an adhesively bonded extruded end piece (such as those shown in prior WES patent applications) or even a combination of adhesively bonded and mechanically interlocked (the longitudinal member could have raised "pips" in or on it that keep the end piece from rotating in compressive loading applications) or fastened (pinned, bolted, riveted or otherwise fastened) in combination with the adhesively bonded components. FIGS. 15-23 illustrate an internal or external "cup" which could, for example, be inserted into or around a chord member, either directly allowing pinned (or other) field fastening to a node 22 or to an intermediate member itself attached to the node(s) 22. Design features can be incorporated to utilize pinned (riveted, bolted, etc.), adhesively bonded or a combination of the two for the connections. FIGS. 20-23 show how a hollow node 22 and intermediate pieces can be utilized to provide a fin along the axis of the node 22 onto which a longitudinal member, with or without an end piece, can be fastened.

Various adhesives are possible, but for simplicities sake 3M's 2 part adhesives, "DP920" and "DP420" will be discussed, both of which exceed the strength requirements of the applications described herein.

As an example, a 3" diameter strut 16 with a 1" bond overlap which would see loads varying from 5800 lbs of tension to 5800 lbs of compression on the strut 16/strut end piece 10 assembly was considered. The adhesive material was tested up to 140° F. (maximum desert ambient conditions are 134° F. in the western hemisphere). Using a 1.95 safety factor, this would require 1,200 psi of shear strength from the adhesive.

Aluminum samples were tested with a 0.005" bond thickness, a 48 hour room temperature cure followed by 2 hours at 140° F. at 140° F.; the DP420 samples achieved 2379-2867 psi shear strength (2617 average) and the DP920 samples achieved 1335-1359 psi shear strength (1344 average).

In this application, the centering guides 18 and minimum gap guides 20 ensure that the strut 16 is centered-vs-the strut end piece 10 with a minimum gap of 0.005". The adhesive is applied, the strut end pieces 10 are slid onto the strut 16, twisted slightly to distribute the adhesive and the assembly is clamped for the required "time to handling strength" (varies by adhesive). Because the bonding will occur in the extrusion/fabrication factory (not on site at the solar field), and the strut 16/strut end piece 10 assemblies must then be transported to the solar field site, the time to full cure is grossly exceeded.

A bond thickness of 0.005" to 0.012" is preferable. The adhesive selection was based on no special cleaning or surface preparation of the aluminum substrates.

A strut 16 or chord may be adhesively attached to a node 22 directly. For instance, this could be accomplished using a Gossamer-style node 22 with segmented chords 28 or chord connectors, perhaps using only adhesives OR adhesives and a pinned joint to reduce part of the load requirement from the pinned connection (thinner walls/smaller diameter pin, etc. due to the adhesive taking part of the load). The other advantage of using the pin and the adhesive is that the pins could help to hold the parts while the adhesives cure.

Figure 24:
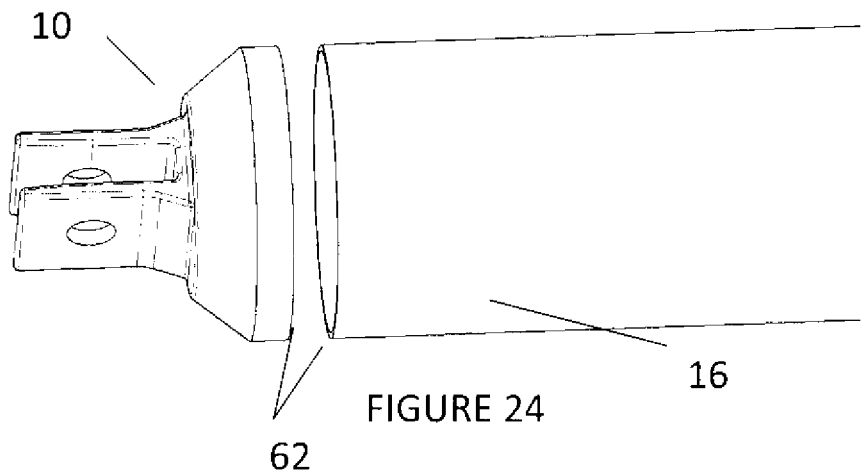
FIG. 24 shows an impact extrusion SEP & strut prior to Inertia Friction Welding
Figure 25:
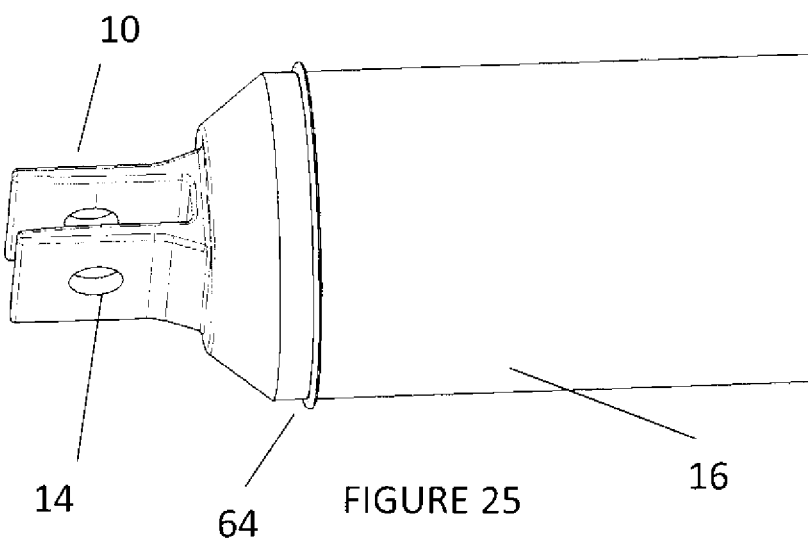
FIG. 25 shows an impact extrusion SEP & strut attached by Inertia Friction Welding
Figure 26:
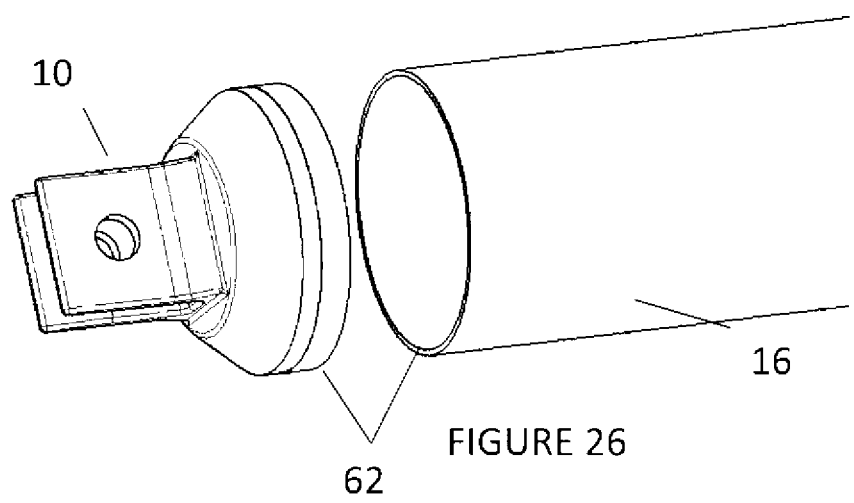
FIG. 26 shows an impact extrusion SEP & strut prior to Friction Stir Welding
Figure 27:
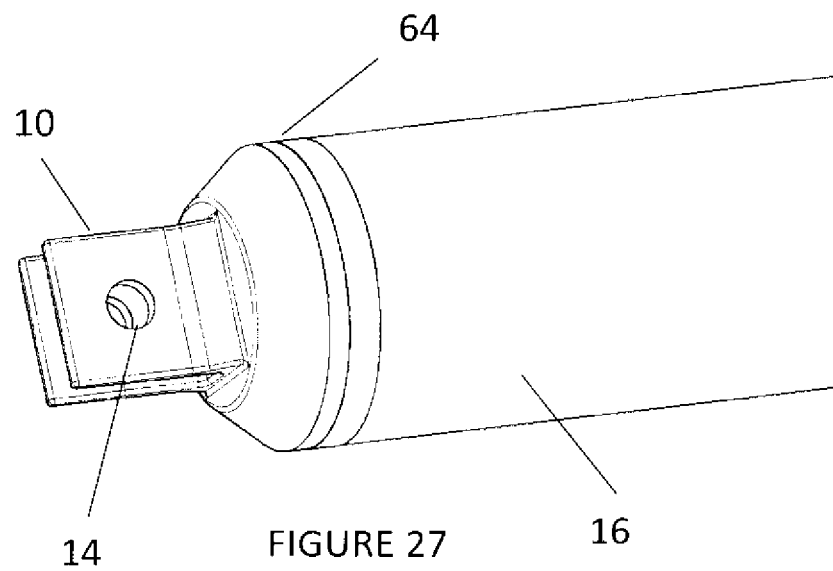
FIG. 27 shows an impact extrusion SEP & strut attached by Friction Stir Welding
Figure 28:
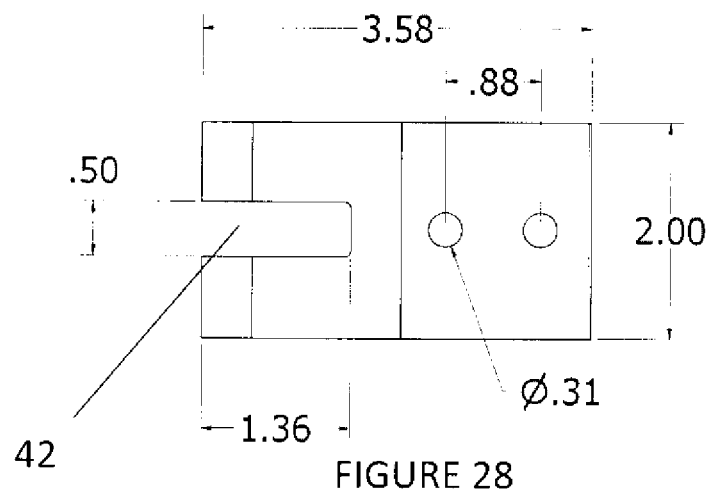
FIG. 28 shows a BEP (beam end piece)—Side View
Figure 29:
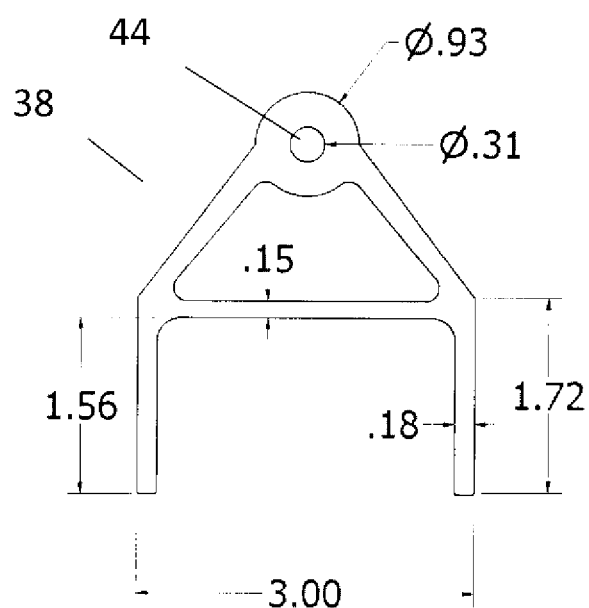
FIG. 29 shows a BEP (beam end piece)—Front View
Figure 30:
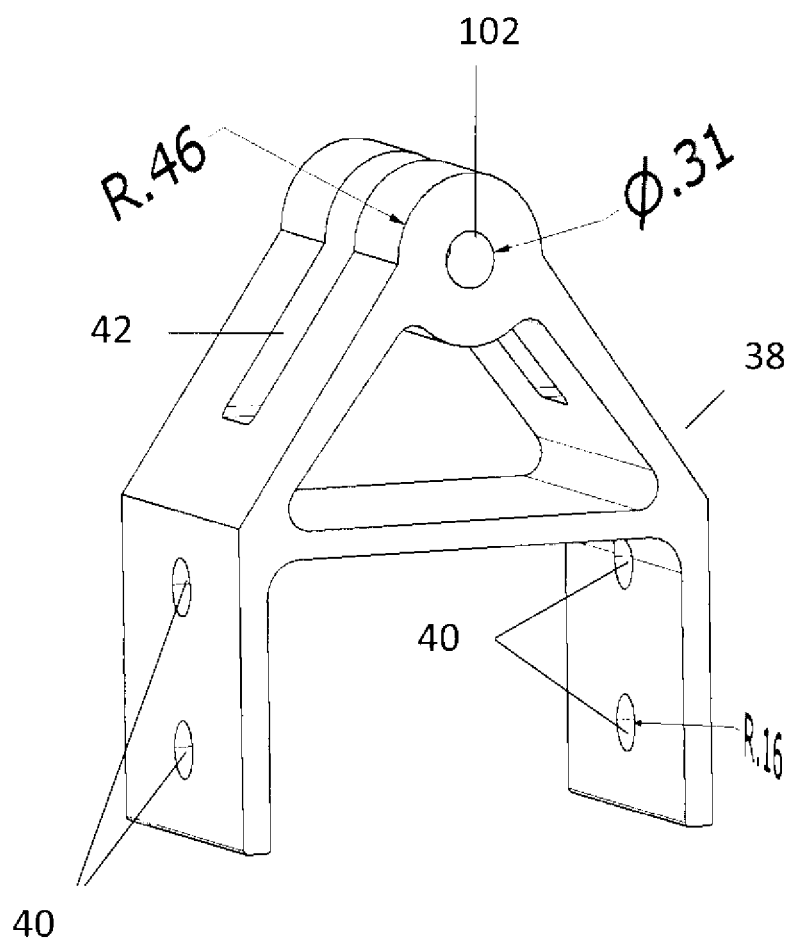
FIG. 30 shows a BEP (beam end piece)—ISO view
Figure 31:
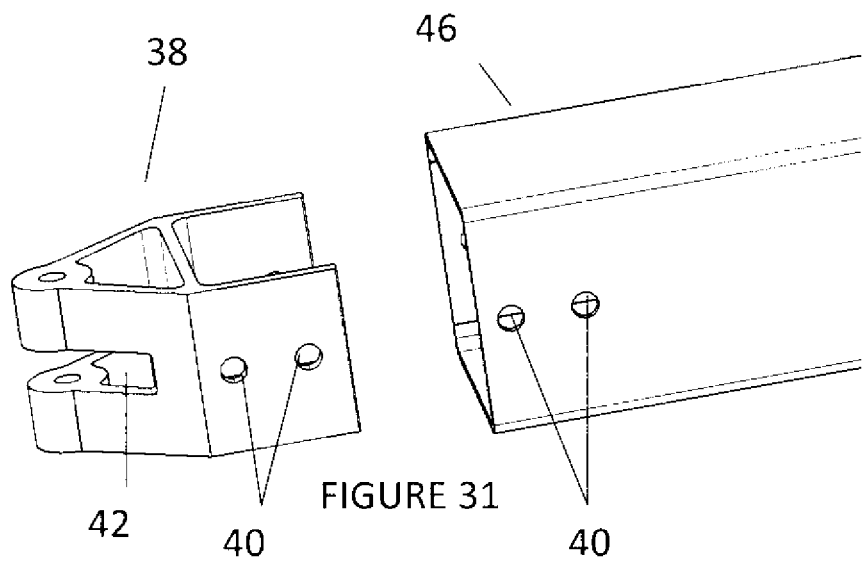
FIG. 31 shows a BEP (beam end piece) & beam assembly—Apart
Figure 32:
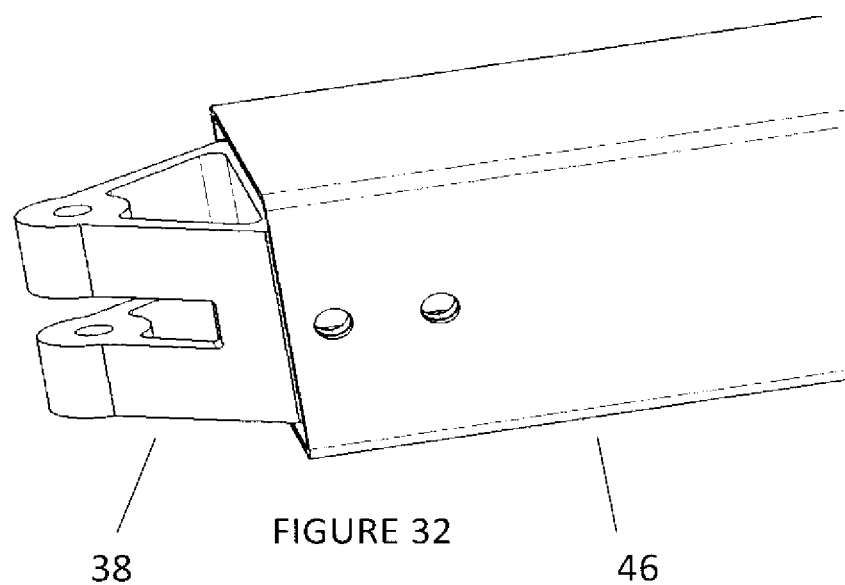
FIG. 32 shows a BEP (beam end piece) & beam assembly—Joined
Figure 33:
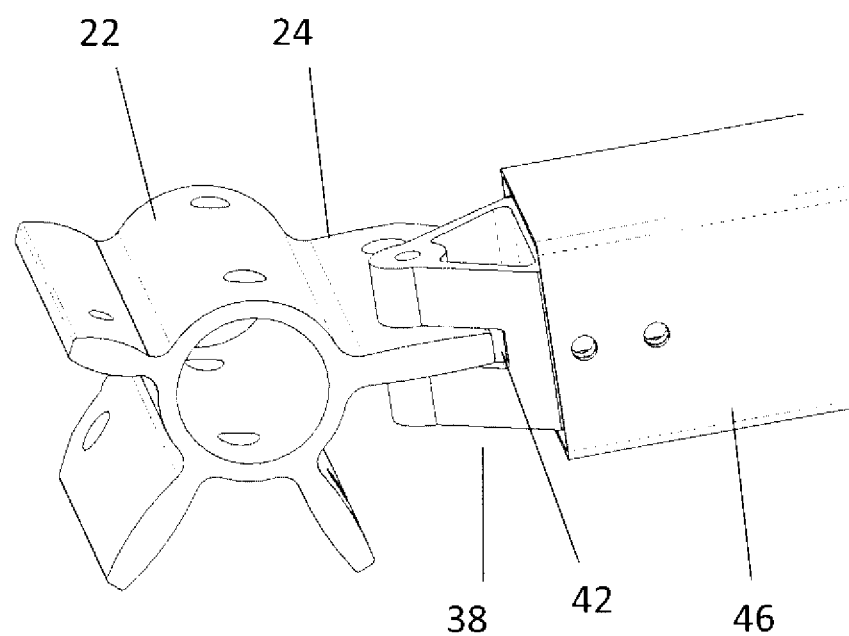
FIG. 33 shows a BEP (beam end piece) & node assembly
Figure 34:
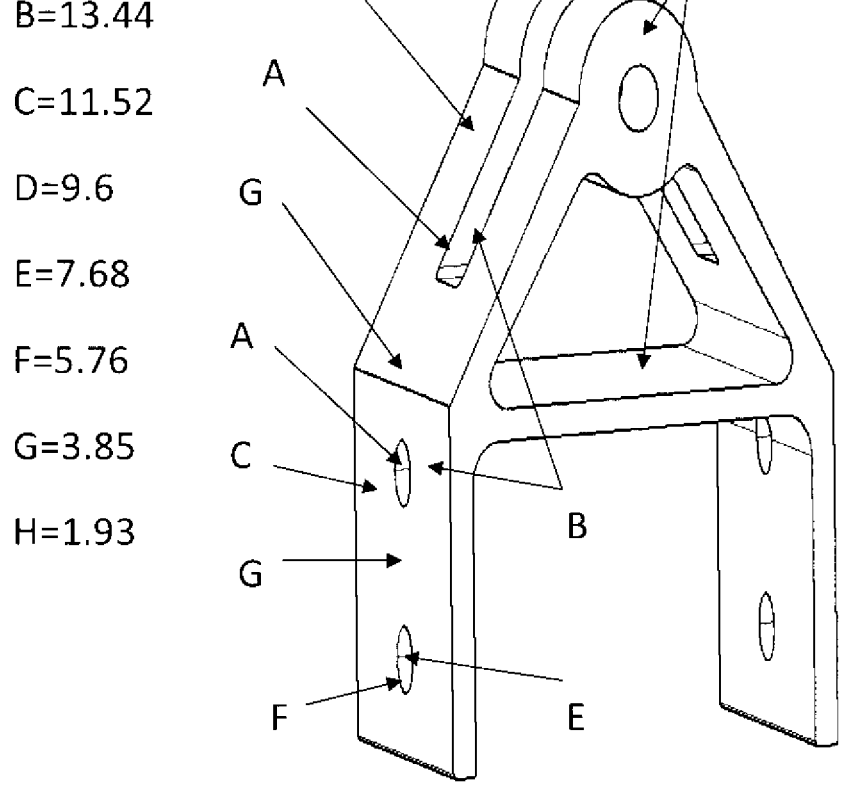
FIG. 34 shows a BEP (beam end piece) FEA—Von Mises Stress
Figure 35:
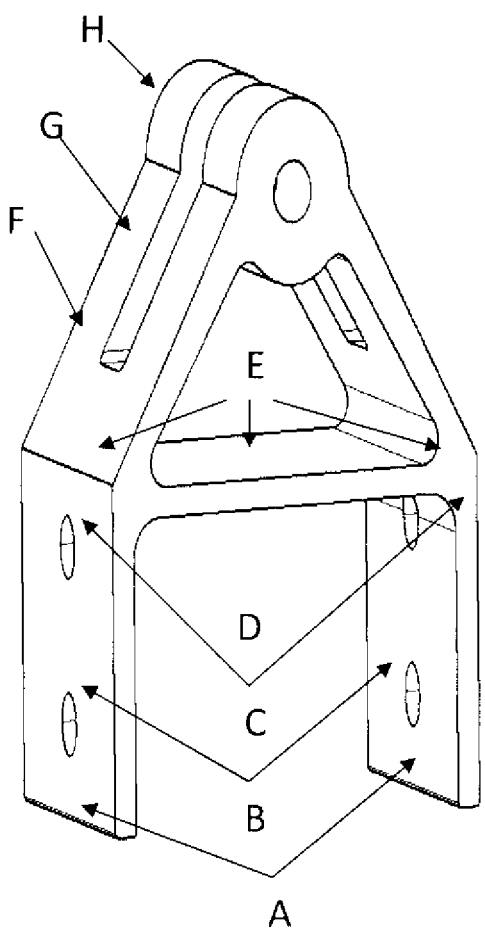
FIG. 35 shows a BEP (beam end piece) FEA—Displacement
Figure 36:
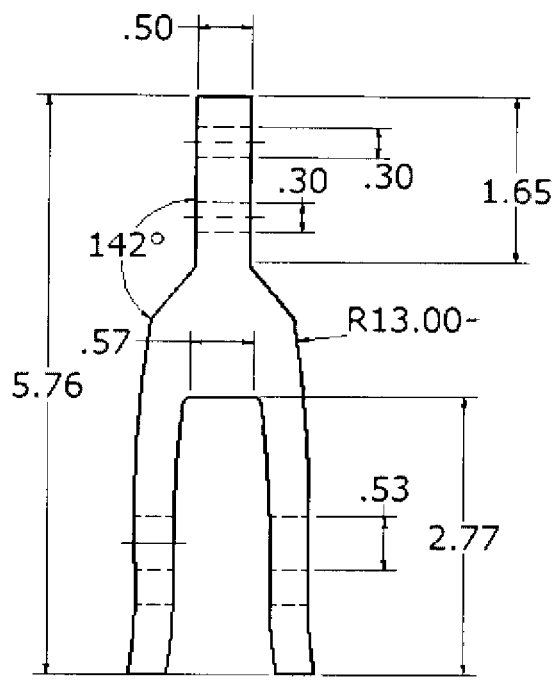
FIG. 36 shows a two piece SEP 1 for pins or adhesive—End view
Figure 37:
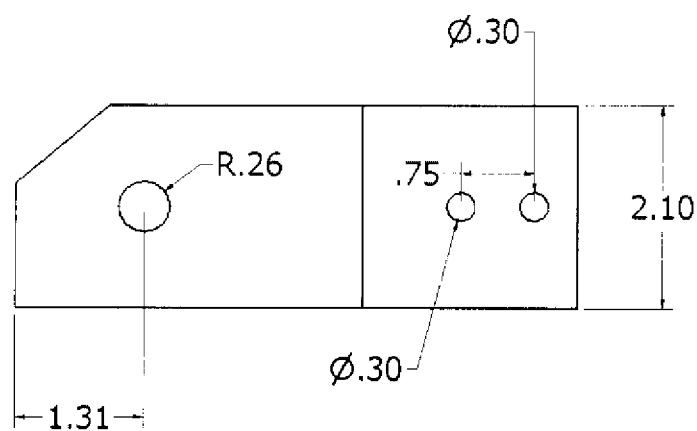
FIG. 37 shows a two piece SEP 1 for pins or adhesive—Side View
Figure 38:
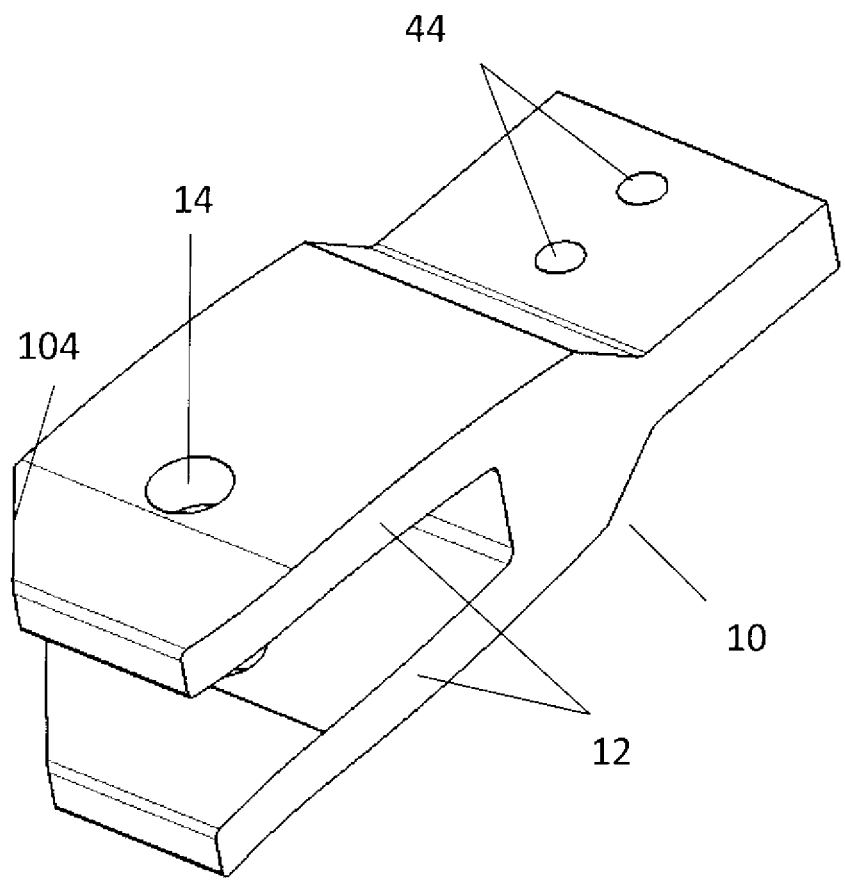
FIG. 38 shows a two piece SEP 1 for pins or adhesive—ISO view
Figure 39:
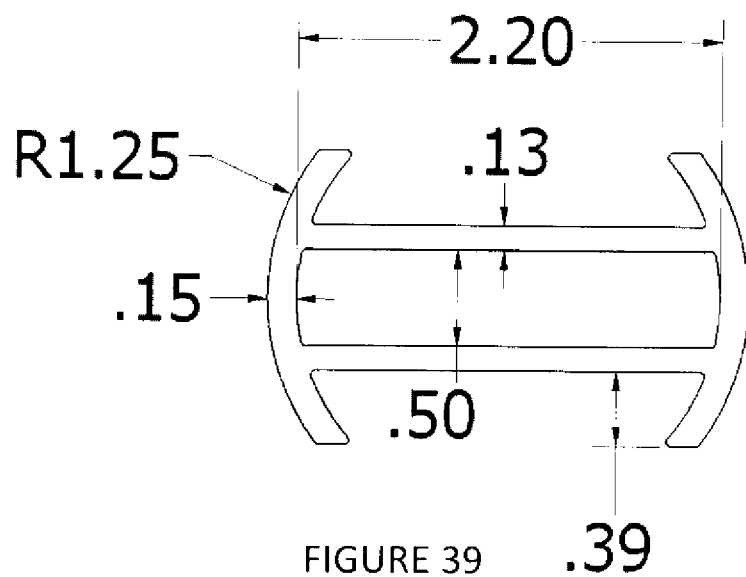
FIG. 39 shows a two piece SEP 1 adaptor for pins or adhesive—End view
Figure 40:
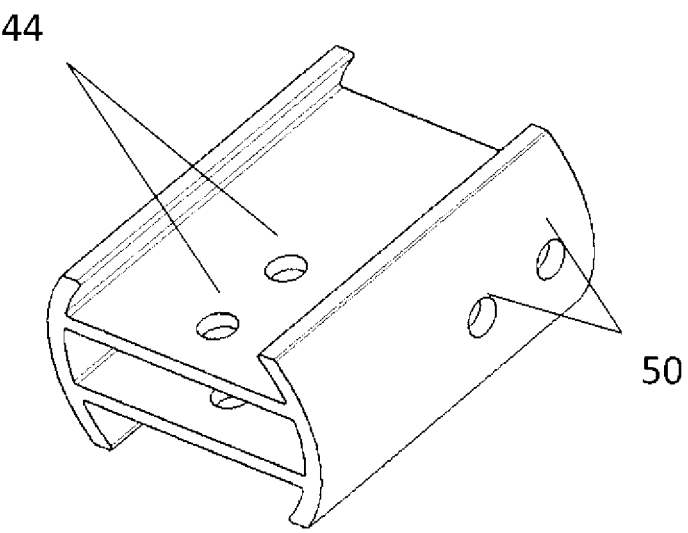
FIG. 40 shows a two piece SEP 1 adaptor for pins or adhesive—ISO view
Figure 41:
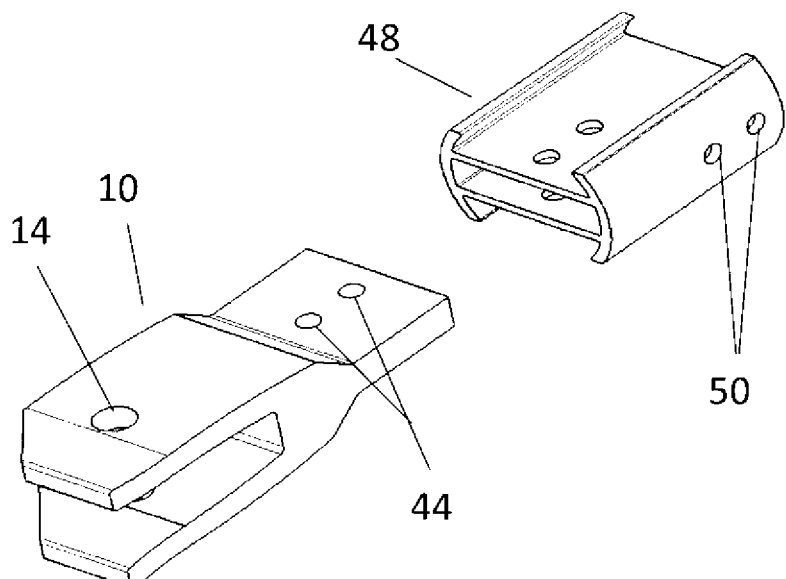
FIG. 41 shows a two piece SEP 1 & adaptor sub-assembly—Apart
Figure 42:
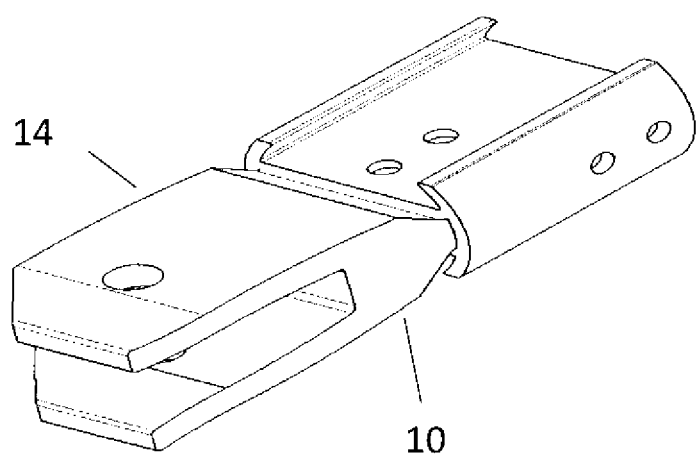
FIG. 42 shows a two piece SEP 1 & adaptor sub-assembly—Joined
Figure 43:
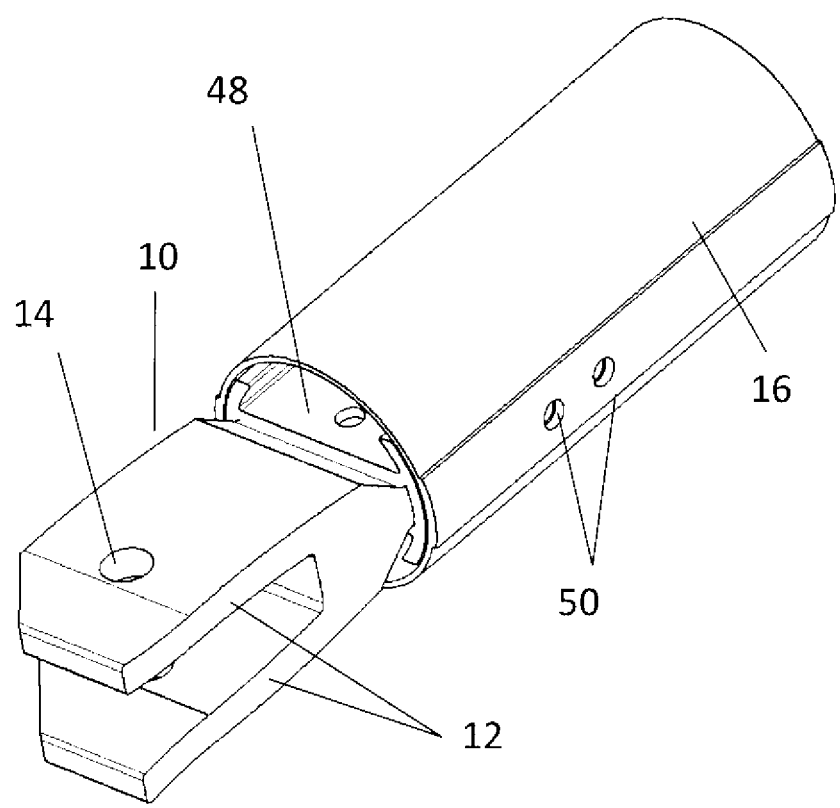
FIG. 43 shows a two piece SEP 1, adaptor & strut assembly
Figure 44:
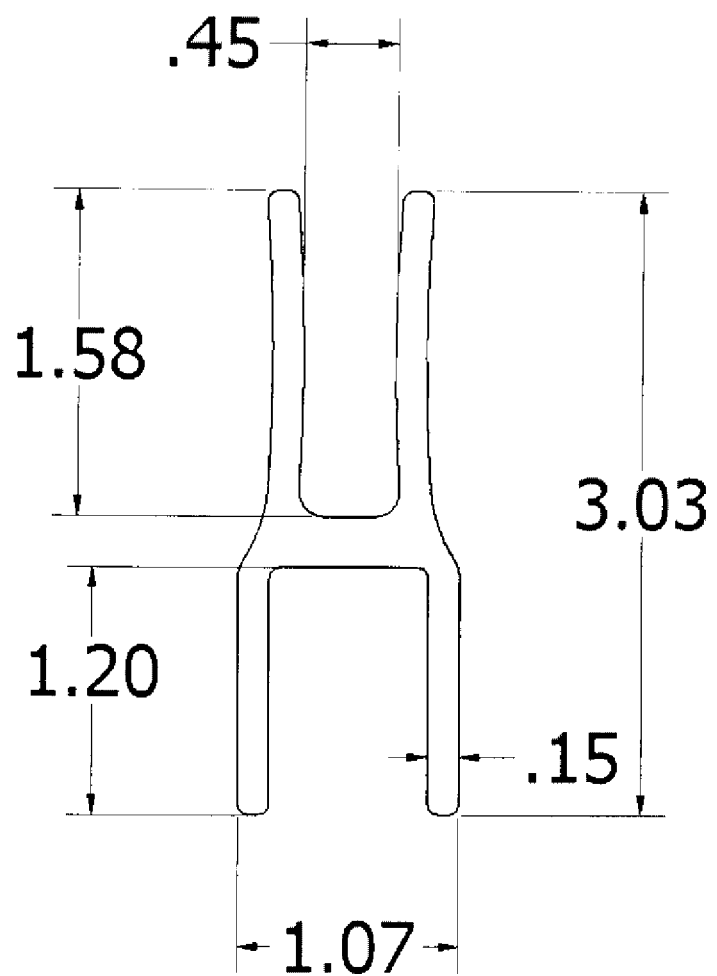
FIG. 44 shows a two piece SEP 2 for pins or adhesive
Figure 45:
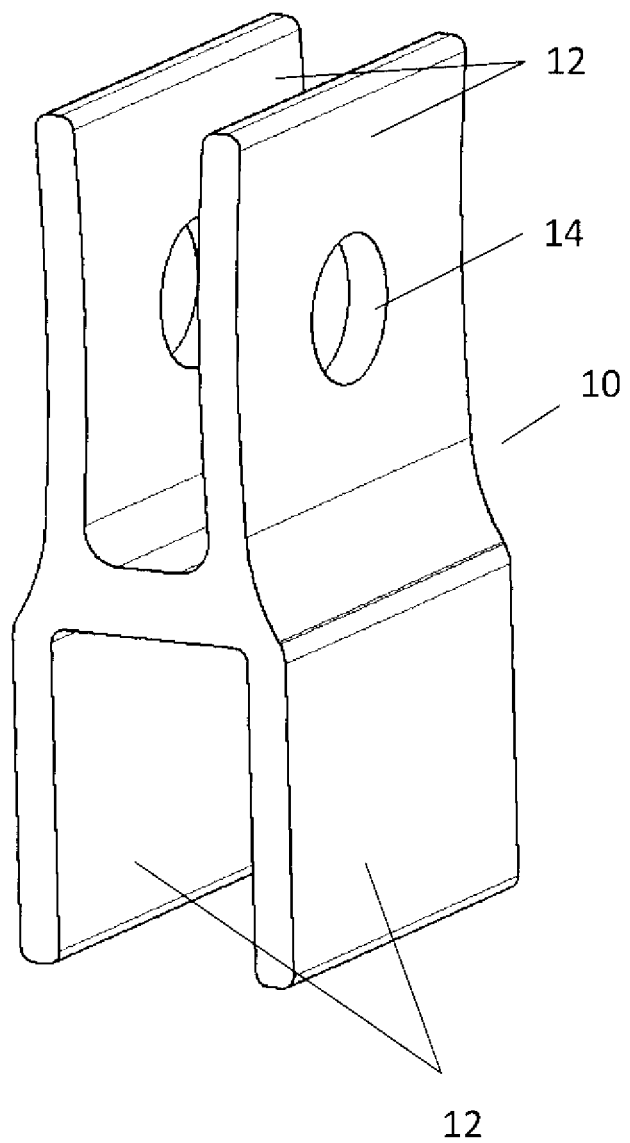
FIG. 45 shows a two piece SEP 2 for pins or adhesive—ISO view
Figure 46:
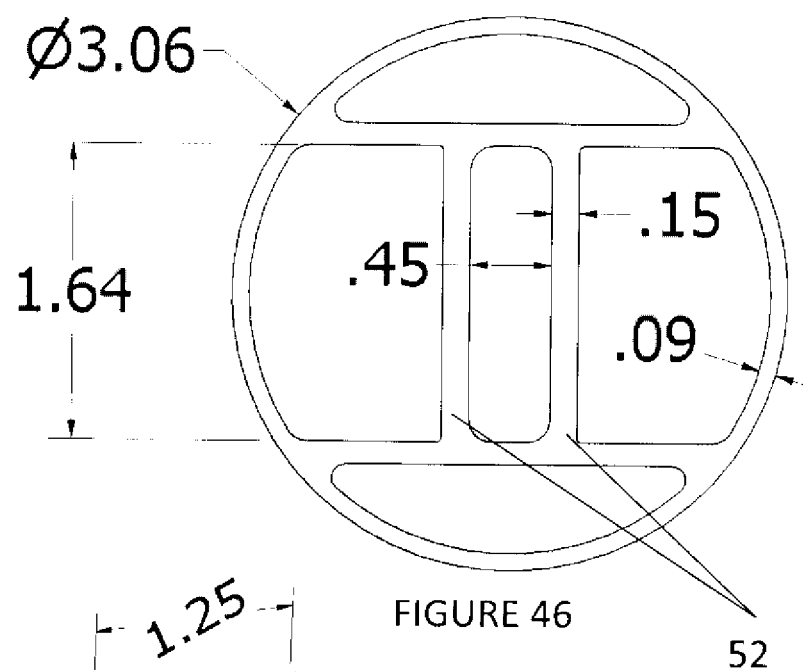
FIG. 46 shows a two piece SEP 2 adaptor for pins or adhesive—End view
Figure 47:
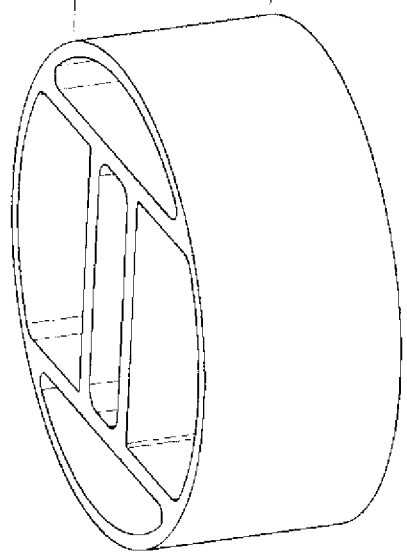
FIG. 47 shows a two piece SEP 2 adaptor for pins or adhesive—ISO view
Figure 48:
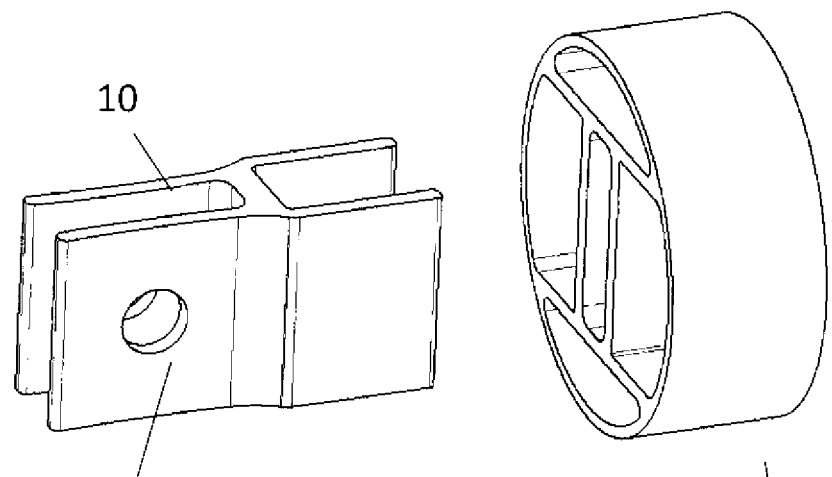
FIG. 48 shows a two piece SEP 2 & adaptor sub-assembly—Apart
Figure 49:
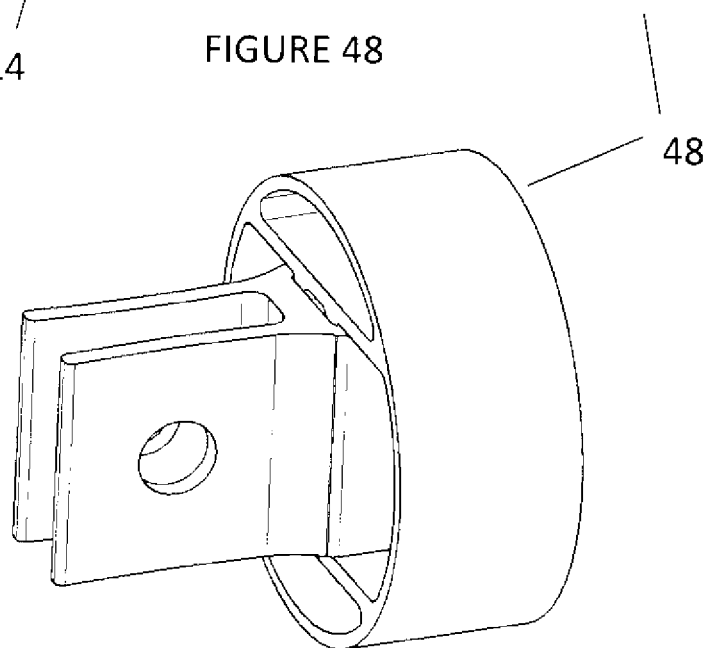
FIG. 49 shows a two piece SEP 2 & adaptor sub-assembly—Joined
Figures 50, 51:
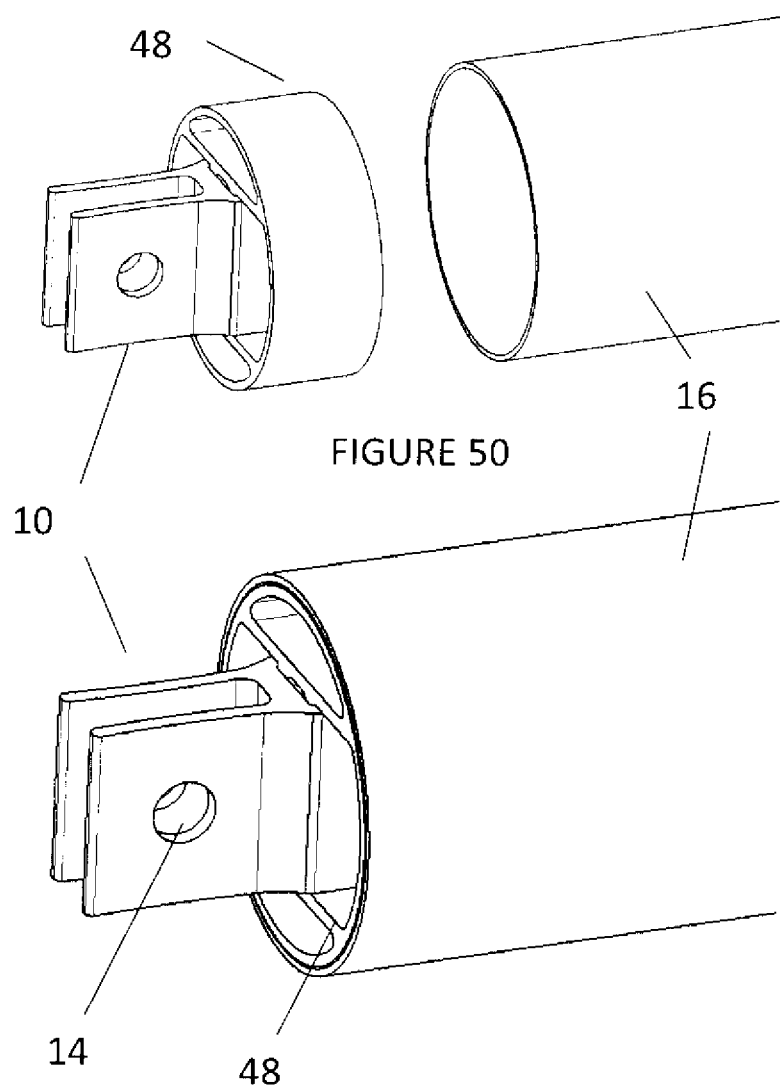
FIG. 50 shows a two piece SEP 2, adaptor & strut assembly—Apart
FIG. 51 shows a two piece SEP 2, adaptor & strut assembly—Joined
Figure 54:
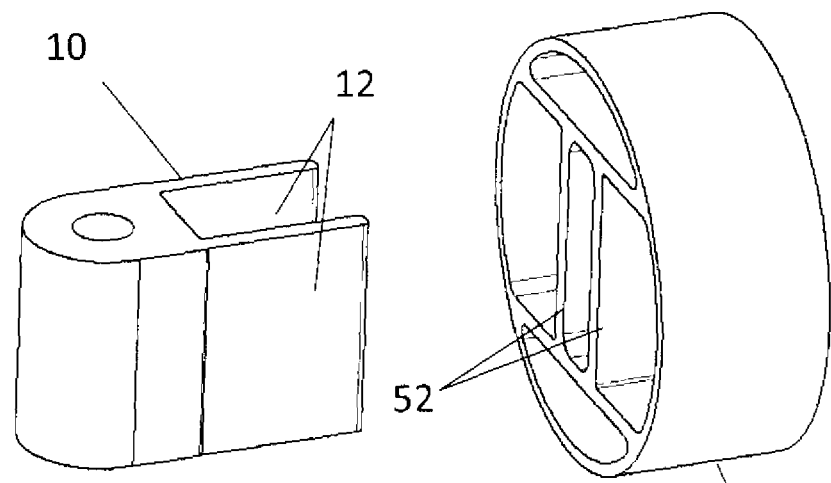
FIG. 54 shows a two piece SEP 3 & adaptor sub assembly—Apart
Figure 55:
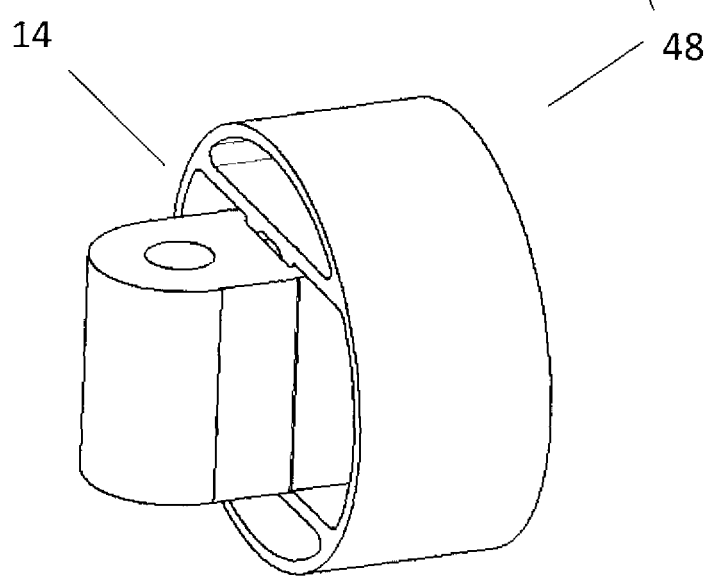
FIG. 55 shows a two piece SEP 3 & adaptor sub assembly—Joined
Figure 56:
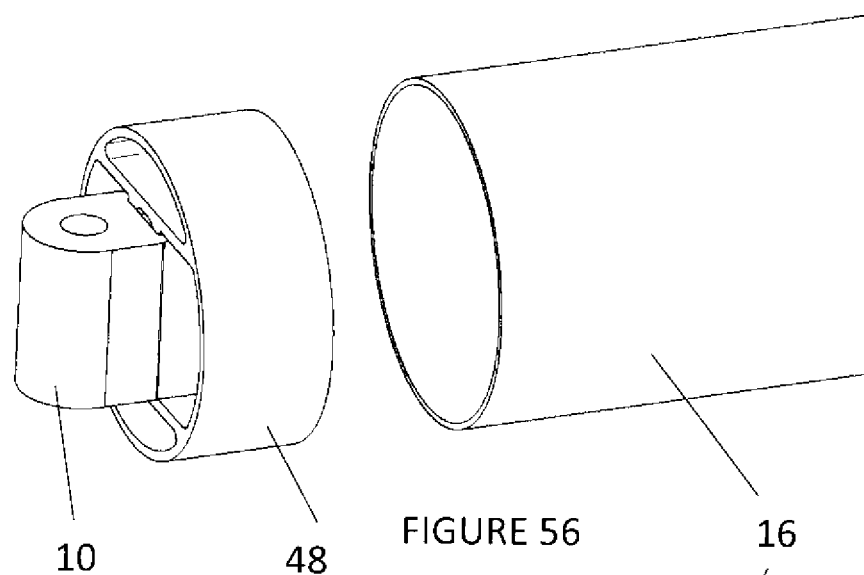
FIG. 56 shows a two piece SEP 3, adaptor & strut assembly—Apart
Figure 57:
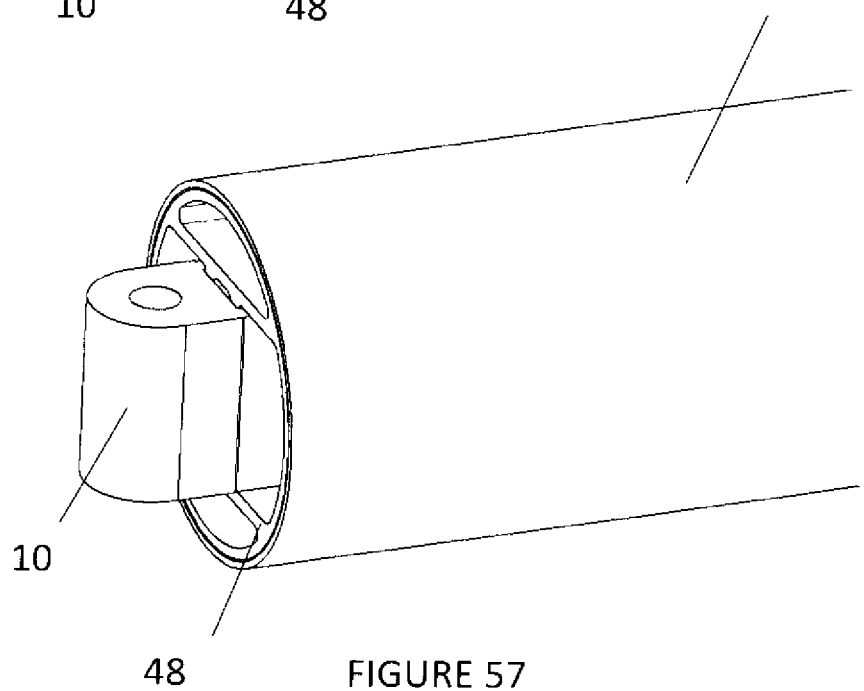
FIG. 57 shows a two piece SEP 3, adaptor & strut assembly—Joined
Figure 58:
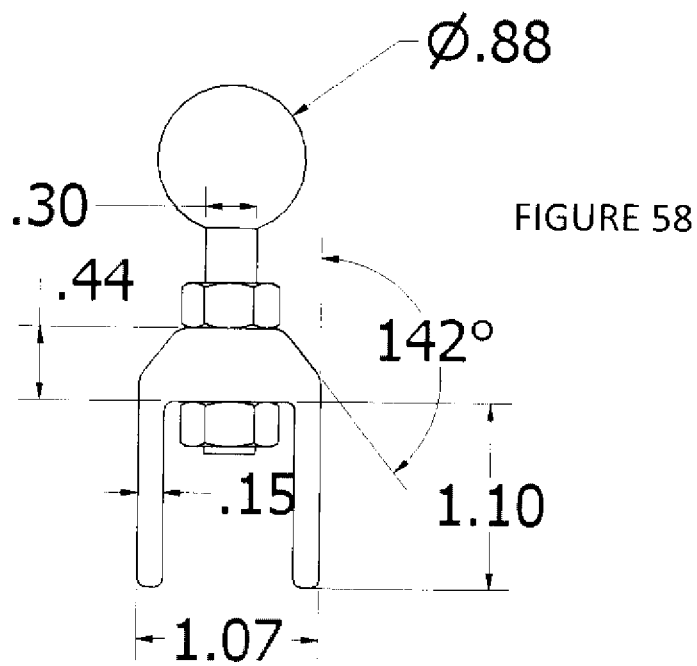
FIG. 58 shows a two piece SEP 4 for pins or adhesive—End view
Figure 59:
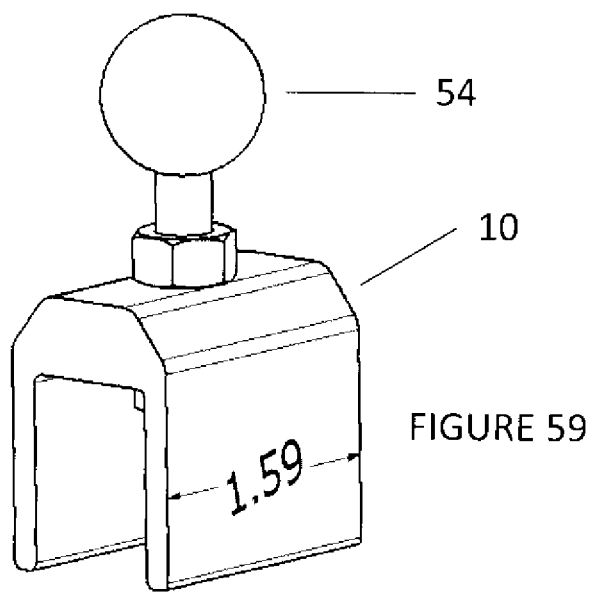
FIG. 59 shows a two piece SEP 4 for pins or adhesive—ISO view
Figure 62:
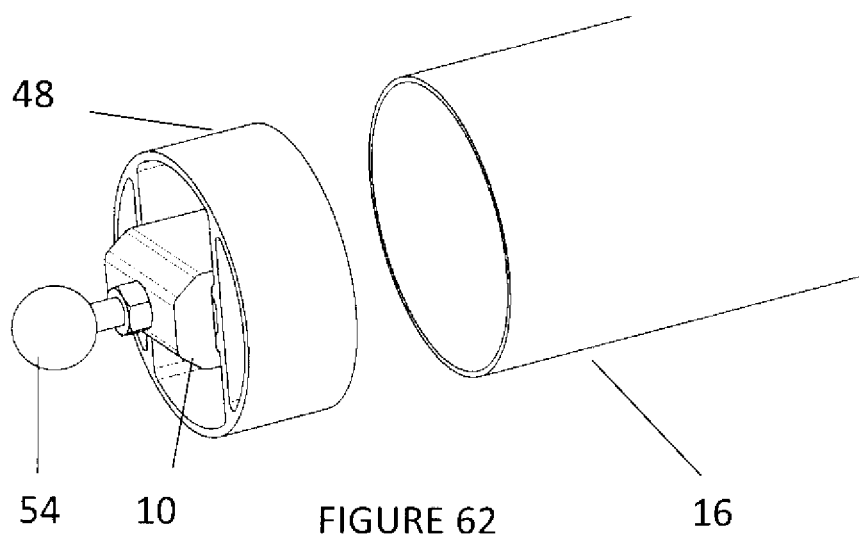
FIG. 62 shows a two piece SEP 4, adaptor & strut assembly—Apart
Figure 63:
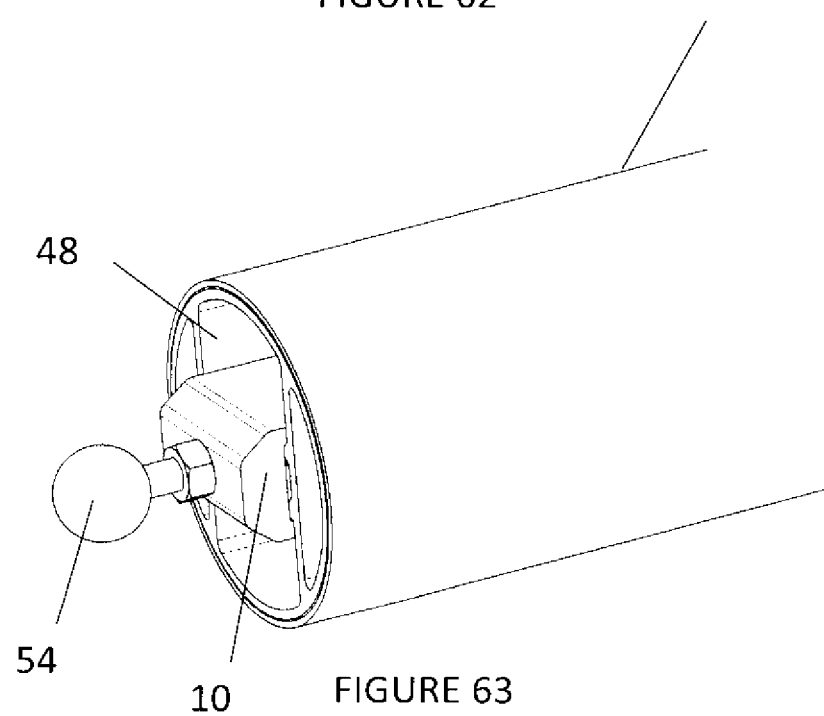
FIG. 63 shows a two piece SEP 4, adaptor & strut assembly—Joined
Figure 64:
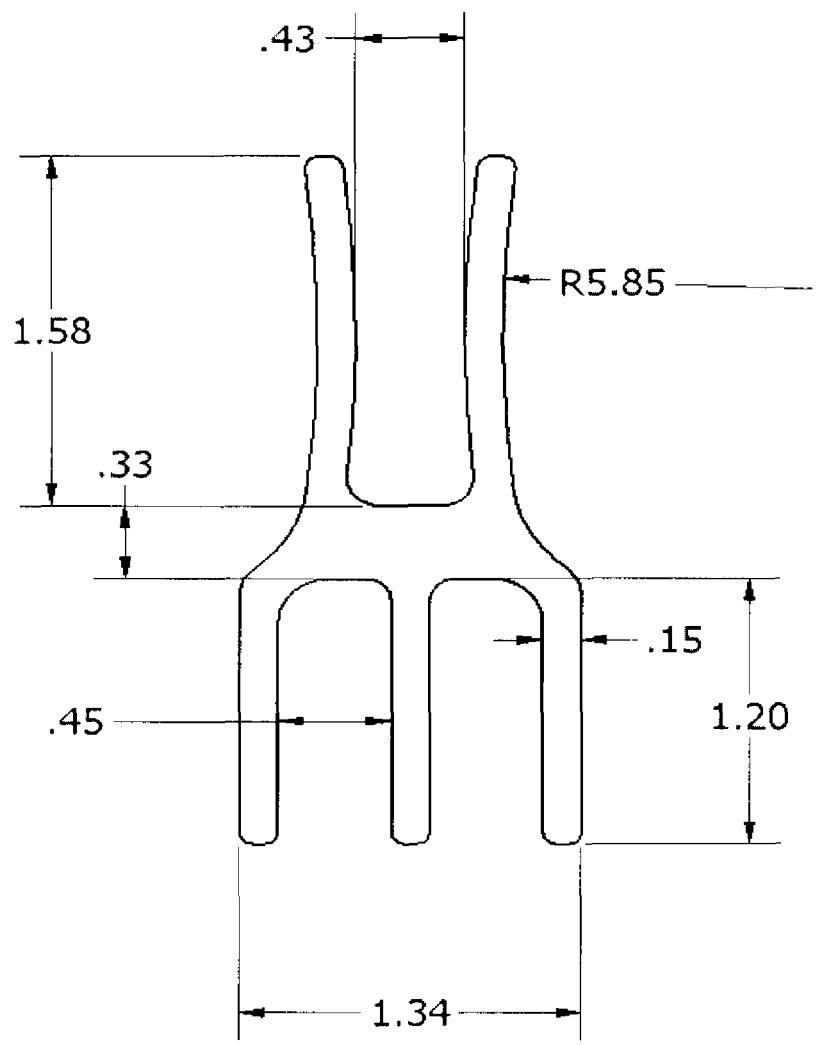
FIG. 64 shows a two piece SEP 5 for pins or adhesive
Figure 65:
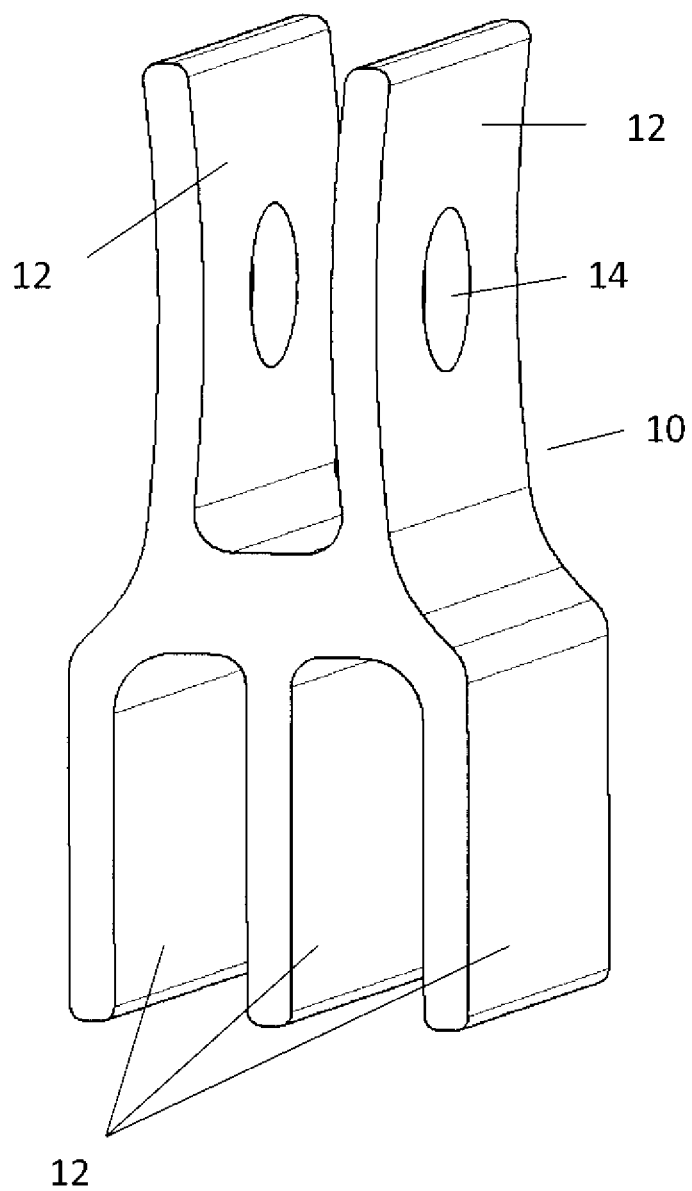
FIG. 65 shows a two piece SEP 5 for pins or adhesive—ISO view
Figure 66:
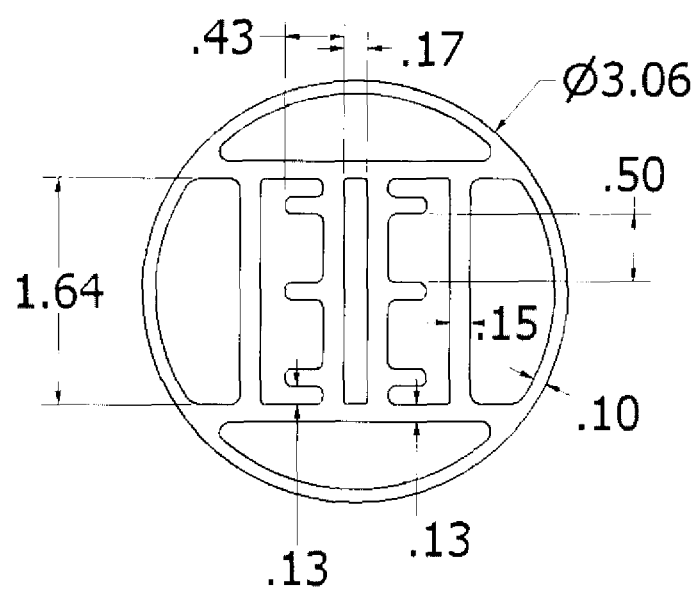
FIG. 66 shows a two piece SEP 5 adaptor for pins or adhesive
Figure 67:
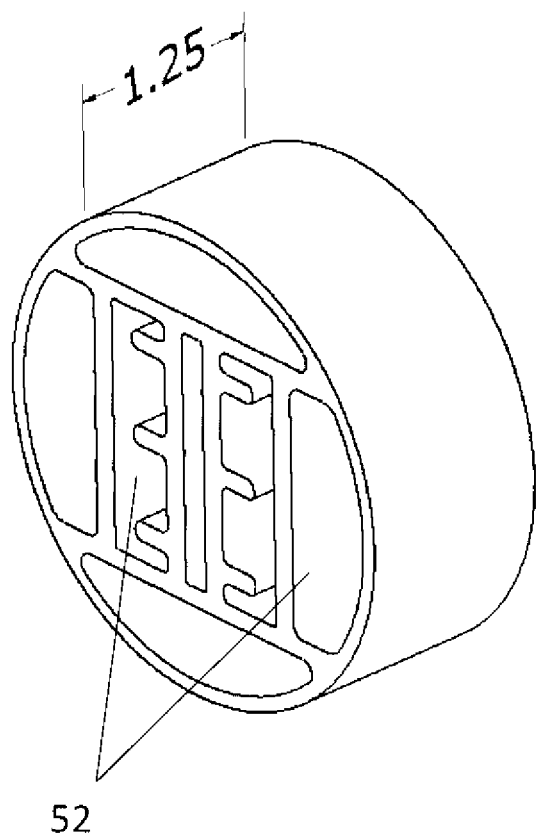
FIG. 67 shows a two piece SEP 5 adaptor—ISO view
Figure 68:
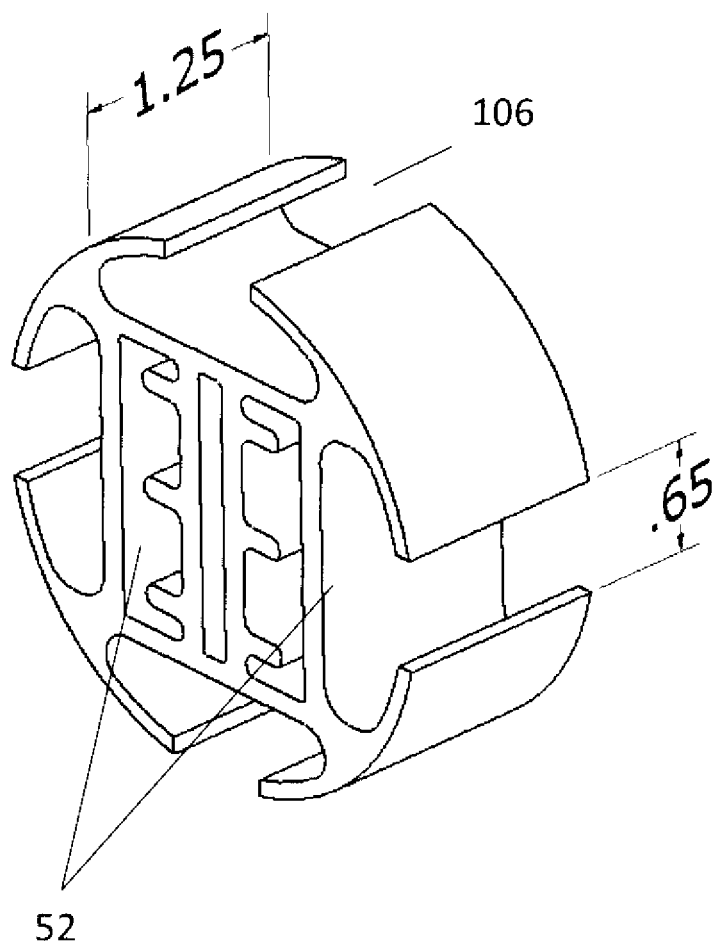
FIG. 68 shows a two piece SEP 5 alternative adaptor—ISO view
Figure 69:
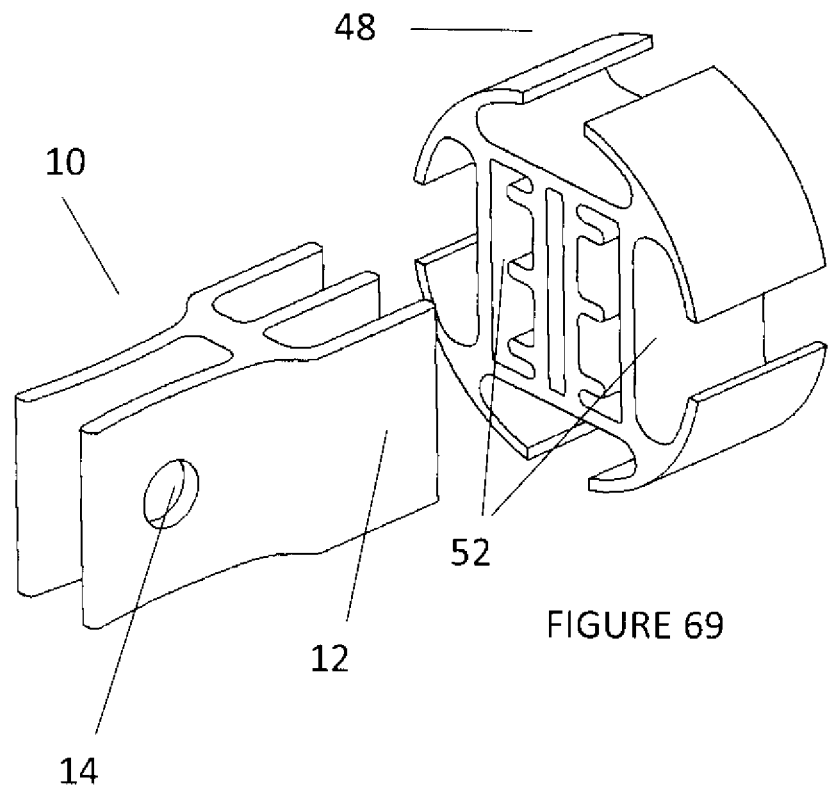
FIG. 69 shows a two piece SEP 5 & alternative adaptor sub assembly—Apart
Figure 70:
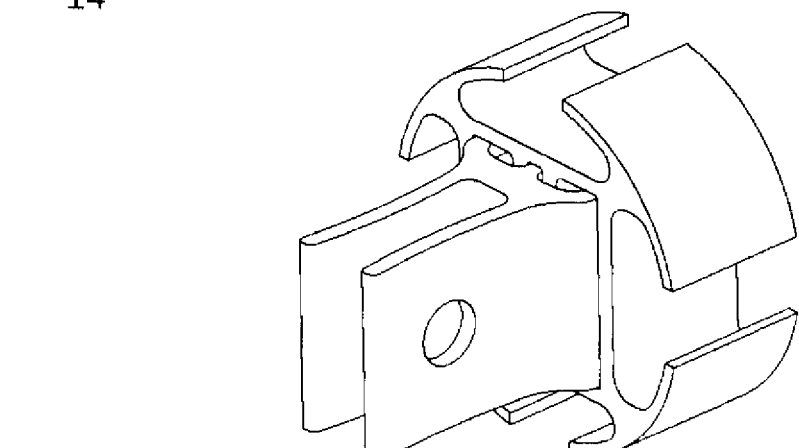
FIG. 70 shows a two piece SEP 5 & alternative adaptor sub assembly—Joined
Figures 71, 72:
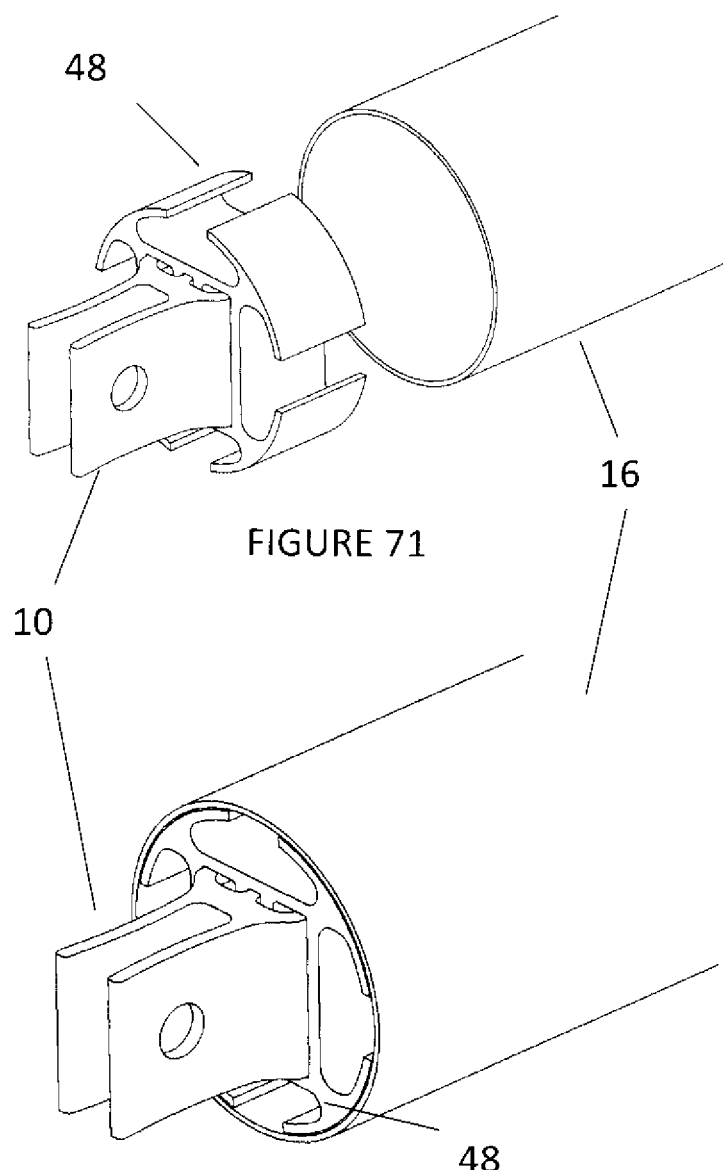
FIG. 71 shows a two piece SEP 5, alt adaptor & strut assembly—Apart
FIG. 72 shows a two piece SEP 5, alt adaptor & strut assembly—Joined

This same logic could be used for a strut 16 connection, using either a Gossamer style node 22 or a WES "hybrid node" to reduce deformation under load due to the through chord—again, this could be used with or without a pin.

b. Rotational Welding (Inertia Friction Welding). FIGS. 24-25 show how an end piece can be welded onto the longitudinal member (either conventional welding or via inertial friction welding, where one member rotates against the other to generate the necessary heat to accomplish the weld).

c. Friction Stir Welding. FIGS. 26-27 show how an end piece can be welded onto the longitudinal member via friction stir welding where a rotating tool "disturbs" the base metal of the end piece and longitudinal member, "mixing" them together (the process and tool are not shown—just the parts before and after joining via FSW.

Both Inertial and Friction Stir Welding techniques are existing joining technologies used for various materials. Both of these joining techniques can be used for joining struts 16/chords to their end pieces, for instance for solar frame 58 applications.

Both Inertial and Friction Stir Welding use no weld material.

Inertial welding as applied to struts 16/chords and end pieces would use the struts 16/chord rotating-vs-the end pieces. The high speed of rotation coupled with forcing the two parts together creates heat which melts the base material. Rotation is stopped at a precise time to assure rotational alignment.

Friction Stir Welding uses a rotating steel tool, often with a pointed end on it, which rotates at the interface between the parts to be joined, melting and mixing" of the base materials of the two parts.

In some applications the two base materials melt together and solidify, in others, like FSW, it is more of a "plastic" "forging/mixing" together of the base materials.

2. Beam end piece 38. As noted previously, Strut 16 and Chords generally undergo axially loading as part of their designs incorporating nodes 22 (there is some MINOR side loading and moments from the weight of these relatively light members and any wind loads acting on them directly). Beams 46, on the other hand, generally see quite large side loads and moments due to the weight and wind loads associated with the reflective surfaces which depend upon them for support. The part designs depicted in FIGS. 28-39 provide greatly enhanced part efficiency in handling these additional (beyond axial) loads. The additional side loads can be envisioned in FIG. 33 if the reader assumes that the reflective surface is mounted above the beam 46 and is thus either pushing downward on the beam 46 or lifting up on the beam 46. The beam end piece 38 design shown can be adapted for use with other components (chords or struts 16) as well.

Some designs of strut end pieces 10 and chord end pieces 36 shown in prior WES patent applications are shown as having been produced from extruded aluminum, as is this beam end piece 38 design. The difference is that in the prior designs, the fin(s) are produced in the direction of extrusion through the extrusion of aluminum through a die, while the "fins" shown in FIGS. 28-39 are produced by machining or otherwise removing material from the extruded end piece. The fastening holes shown on the bottom legs can attach to the longitudinal piece (beam 46, for example) via pins, rivets, bolts or other fasteners, or these legs can be adhesively bonded or otherwise joined as discussed previously in the patent application. The fastener hole 44 for attaching the end piece fin(s) to the node fin(s) 24 can be extruded into the piece during the extrusion process, drilled or pierced after extrusion or extruded and subsequently drilled/pierced/honed, etc, depending on the requirements.

The main feature which enhances the efficiency of the beam end piece 38 in this application is that the full cut length of the extruded end piece is resisting the side load-vs-just the extruded fin thickness in prior designs showing an extruded end piece. FIGS. 36-43 illustrate alternative means to create end pieces (shown utilizing fins) for longitudinal members using an additional transition piece (FIGS. 39-43) which can be fastened to the portion which attaches to the node fin(s) 24 and to the longitudinal member (both of these connections can be pinned, riveted, bolted or otherwise joined, adhesively bonded or via using a combination of these approaches. The length of the transitional piece can be varied to provide more bonding surface along the length of the longitudinal member, as required by the load requirements of the part, the adhesive utilized, the substrates and their preparation (surface finishing, cleaning, etc.).

FIGS. 44-51 illustrate the design of and end piece (with fins) and associated transitional piece designed to be adhesively bonded to the longitudinal member. The portion with the fins that attach to the node fin(s) 24 can be adhesively bonded to the intermediate part which in turn can be adhesively bonded to the longitudinal member (the purpose of all of these intermediate members is to allow the long, longitudinal member to be as simple/light as possible if the longitudinal tube had complex hollows such as the intermediate piece, it would be MUCH heavier—in addition, the extrusion difficulty increases, slowing the extrusion velocity and further increasing the cost of the part.

FIGS. 52-57 and 58-63 illustrate how different types of end pieces can be utilized with this system (intermediate parts). The design illustrated in FIGS. 52-57 would be well suited to accept side loads such as might occur in a beam 46 and beam end piece 38 subassembly. The design illustrated in FIGS. 58-63 would be better suited for primarily axial loaded longitudinal members (where the node 22 could incorporate perhaps a "socket" design). FIGS. 64-72 illustrate an end piece design which could be easily extruded and cut to length and which could be adhesively bonded to the intermediate piece 9 a third leg is shown to allow greater bonding area of the end piece to the intermediate piece); the intermediate piece could then be bonded to the longitudinal member.

Double fin Design for solid node 22

This design allows for a strut 16 to be attached to our solid node 22 with or without the use of a strut end piece SEP 10. The benefits of the solid node 22 over the hollow node 22 have been explained in detail in U.S. patent application Ser. No. 12/927,813. FIGS. 147 through 150 show FEA results for the double fin solid node and the double fin hollow node. In this comparison each node 22 was loaded in the same manner. A compression load of 5,000 lbs was applied to each of the side fins to show how the hollow would deform in such a case. The solid node 22 resulted in 57.5% less maximum stress in the part and 41.8% less deformation then the hollow node in this case. The hollow node is still a viable design for some of the connection points of the frame.

3. Torque plate 68 designs. FIGS. 75-78 illustrate a torque plate(s) 68 design (currently designed utilizing plate steel). This design utilizes nodes 22 at the inside top vertices and bottom vertex of the frame geometry (refer to FIG. 74), providing two functions—supporting the frame on either end in a bearing mounted to the pylons 142 on either end and allowing one frame to be fastened to the next so that a drive mechanism rotating one frame can also rotate the frame adjacent to it, and that to the one adjacent to it, for a total of from two frames joined together to more than two (CSP parabolic trough designs in use have between 4 and 6 frames on either side of the drive driven by the drive, although this number can be greater or lower depending on system design considerations). FIGS. 75-78 illustrate how the torque plate 68 behind and slightly above the front torque plate 68 (FIG. 76) has a welded tube attached to it with a flange on the end of the tube. The torque plate 68 attaches to the end of the frame via nodes 22 that fasten to the ends of the cross arms and the bottom of the cross. The flange has holes in it which correspond to holes on another torque plate 68 intended to be fastened to an adjacent frame.

Figure 86:
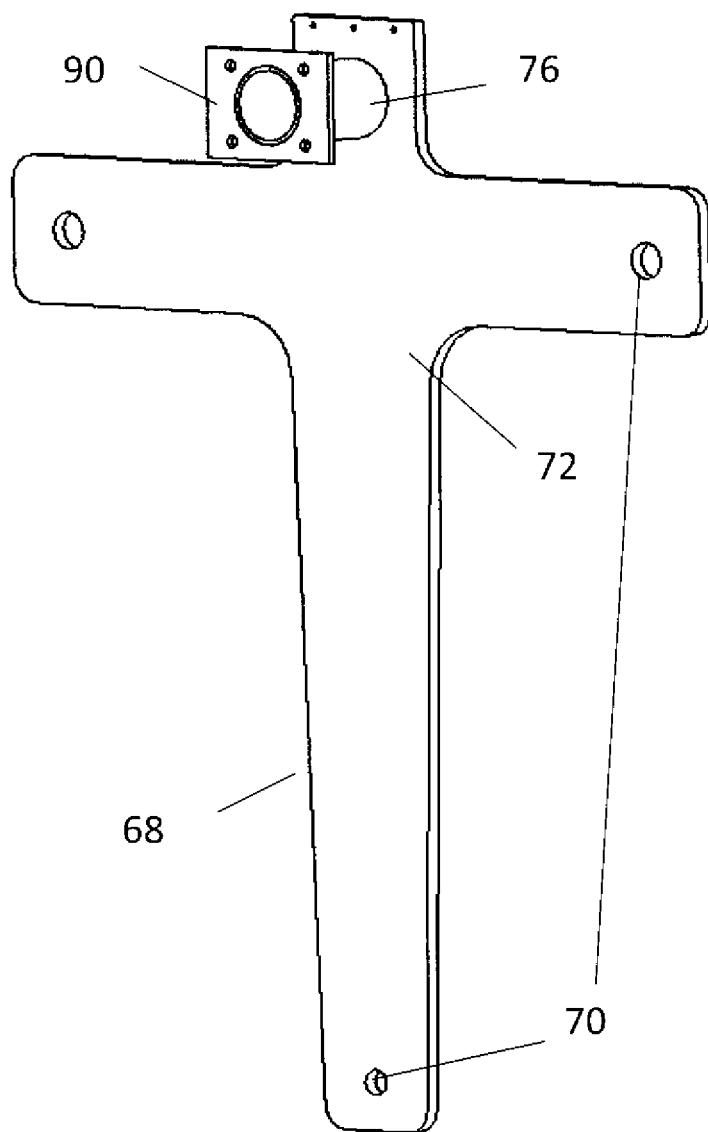
FIG. 86 shows a two piece double torque plate J alternative connection plate
Figure 87:
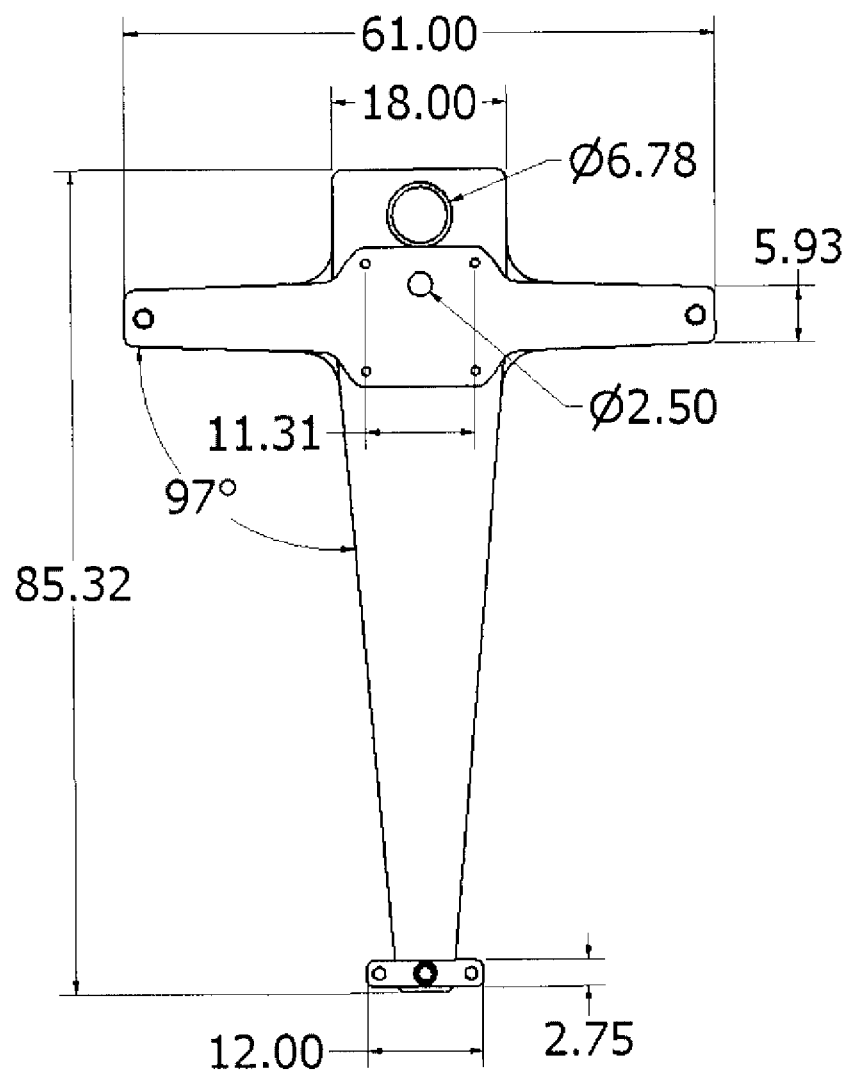
FIG. 87 shows a two piece double torque plate N
Figure 88:
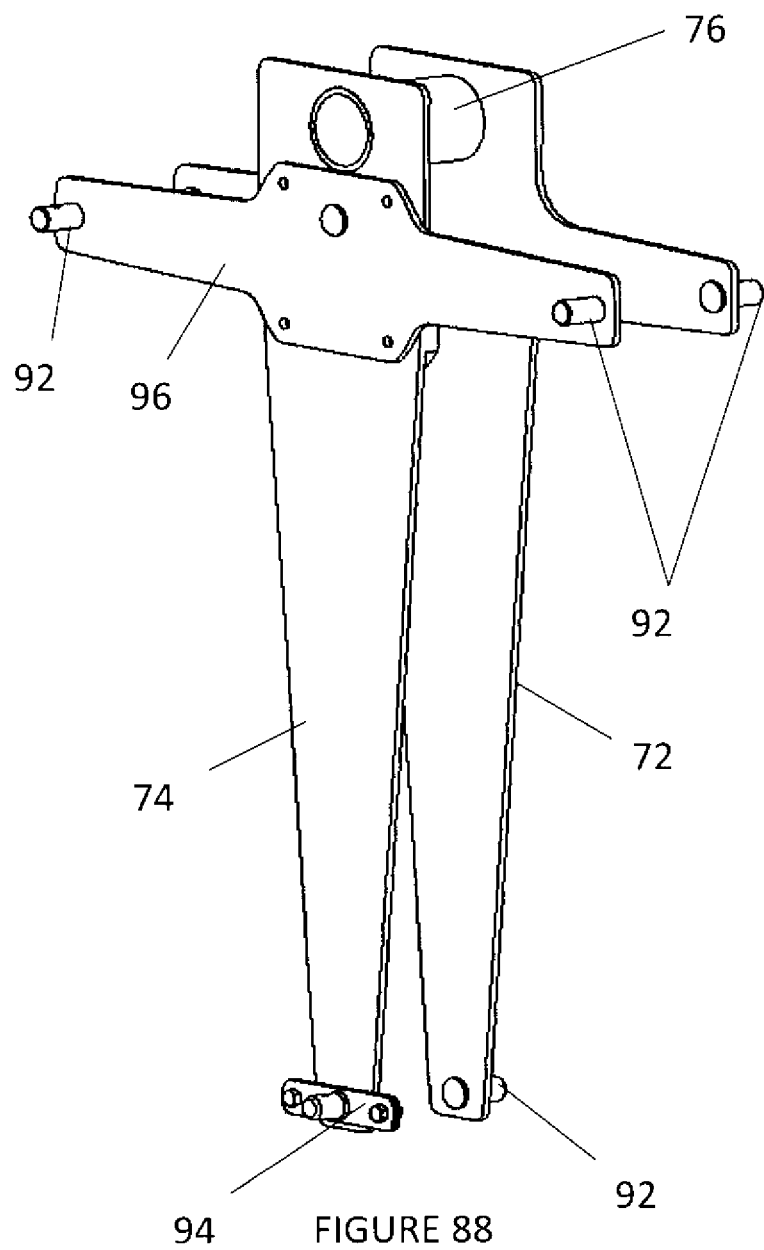
FIG. 88 shows a two piece double torque plate N—ISO view
Figure 89:
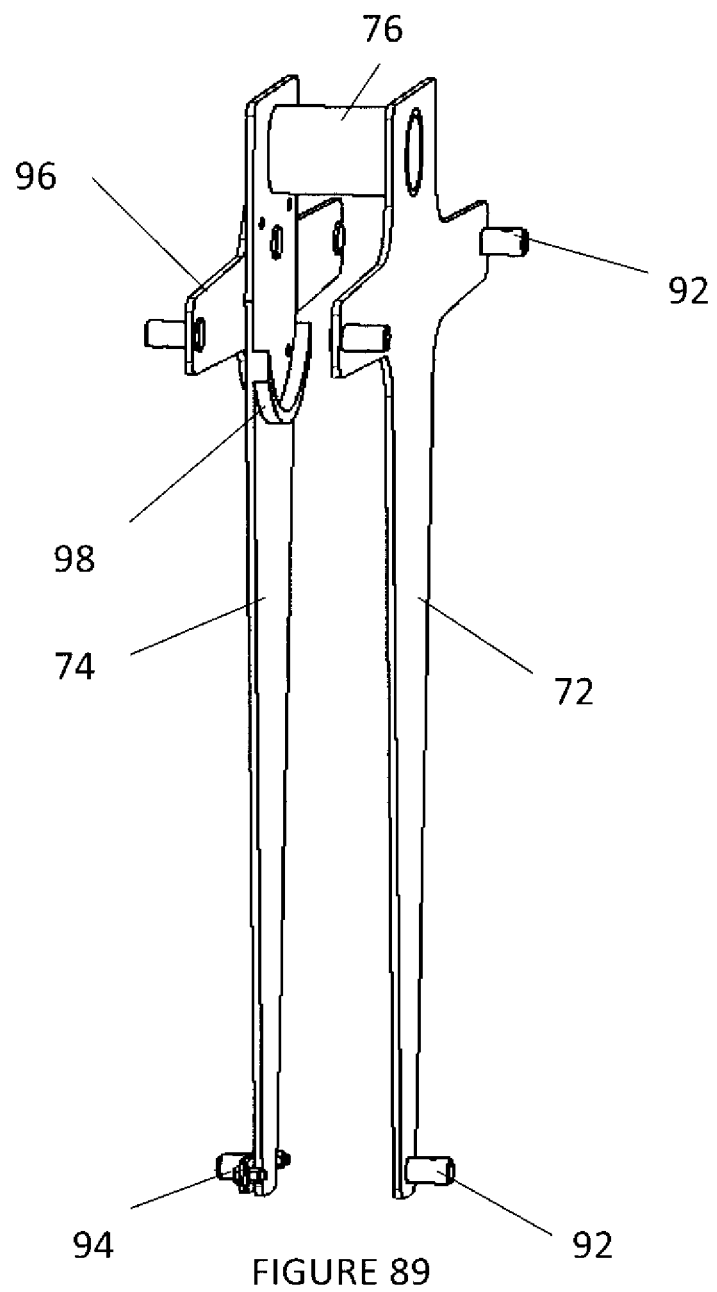
FIG. 89 shows a two piece double torque plate N—Side view

The bolted connections between the flange and the next torque plate 68 allow for slight rotational alignment of one frame to another. One intent is to have a torque plate 68 attached to each end of each frame when it is assembled, and to contemplate lifting the assembly via attachment brackets (FIGS. 79-83) which attach to each of the torque plates 68 upper edges. This method of assembly allows easy lifting/manipulation of the assembled frames with torque plates 68 onto the line of pylons 142 that they are mounted on; as mentioned, the bolted connections on the flange can allow rotational adjustment/alignment of the frames. FIG. 86 illustrates one of a large number of different geometries/number of fasteners defining the connection between the flange and the torque plate 68 (trading off number and size of fasteners, torque carrying capability, etc.). FIGS. 87, 88 and 89 illustrate a torque plate 68 design which incorporates a fastened (-vs-cut from one piece) arm assembly which allows for frame adjustment and allows for the frame to be lifted from the torque plate 68 on one side of the frame and the arm assembly from the other end; it also incorporates thick structural pin(s) which could be inserted into hollow node(s); this type of system would typically be employed where the first frame to be attached to a drive unit side would have a single torque plate 68 on the drive side of the frame with a double torque plate 68 minus the arm assembly 96 on the other end. The next frame would have the arm assembly 96 on one end (which would be attached to the double torque plate 68 of the first frame via these pin(s) and a "double torque plate" attached to the other end (minus arm assembly—96). The process repeats until the last frame associated with the line of frames has only a single torque plate 68 attached to its far end. The curved guide shown in FIG. 89 is intended to protect the bolt heads from the pylon 142.

Figure 90:
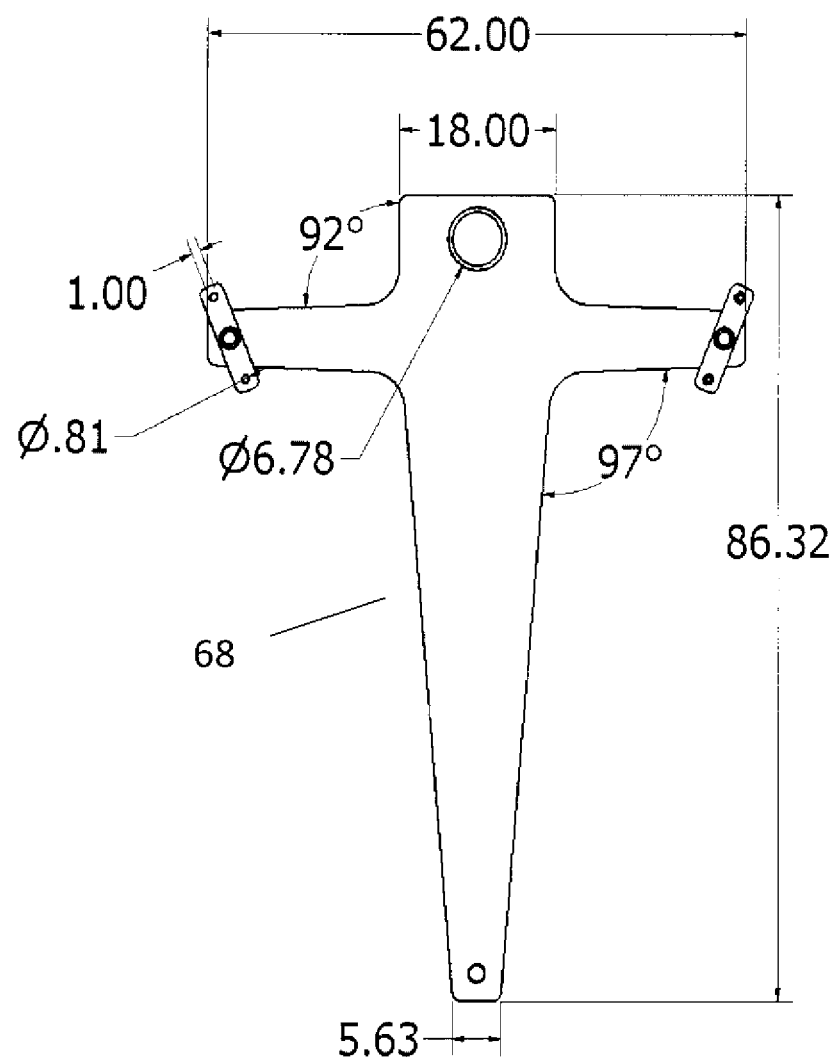
FIG. 90 shows a one piece double torque plate N
Figure 91:
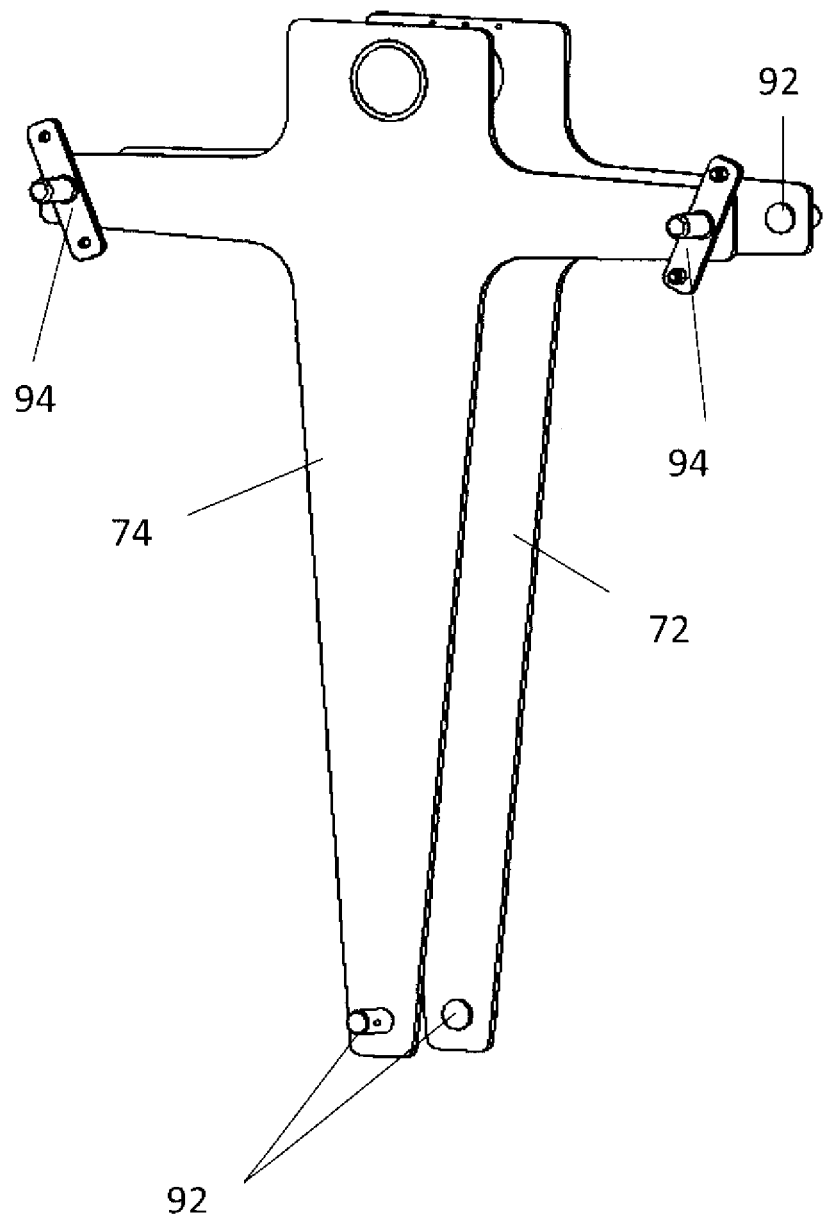
FIG. 91 shows a one piece double torque plate N—ISO view
Figure 92:
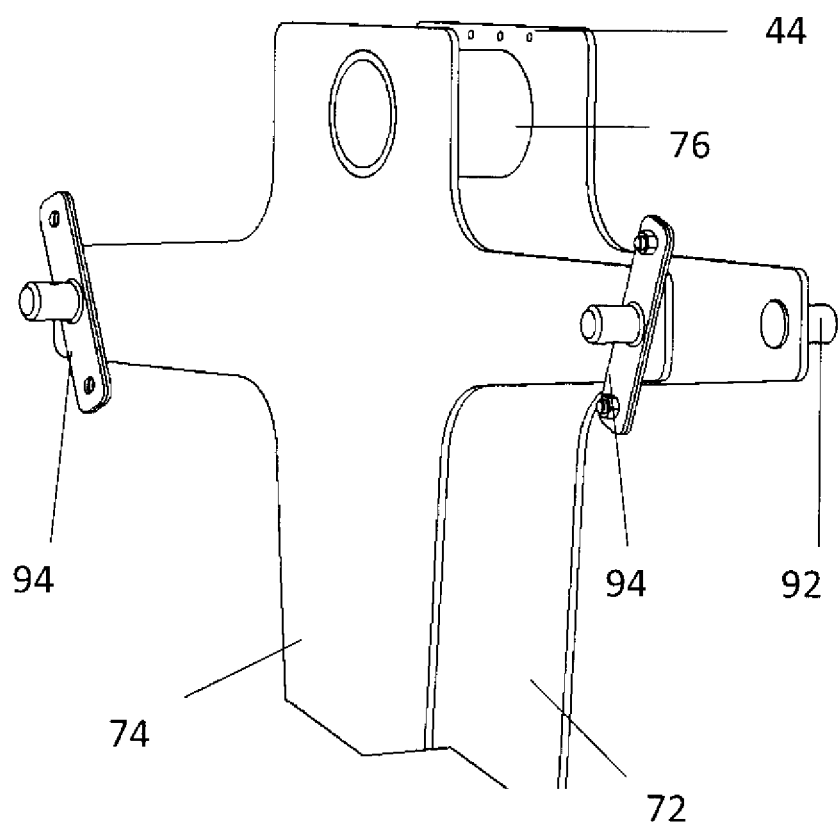
FIG. 92 shows a one piece double torque plate N—ISO view detail
Figure 93:
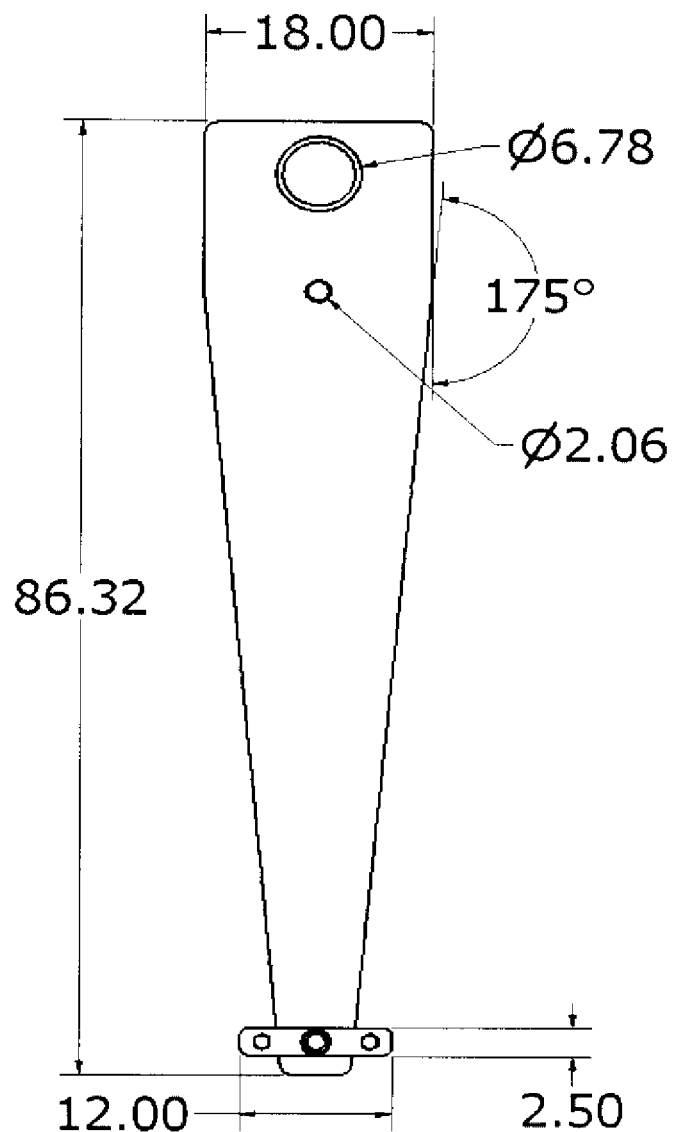
FIG. 93 shows a one piece double torque plate N1
Figure 94:
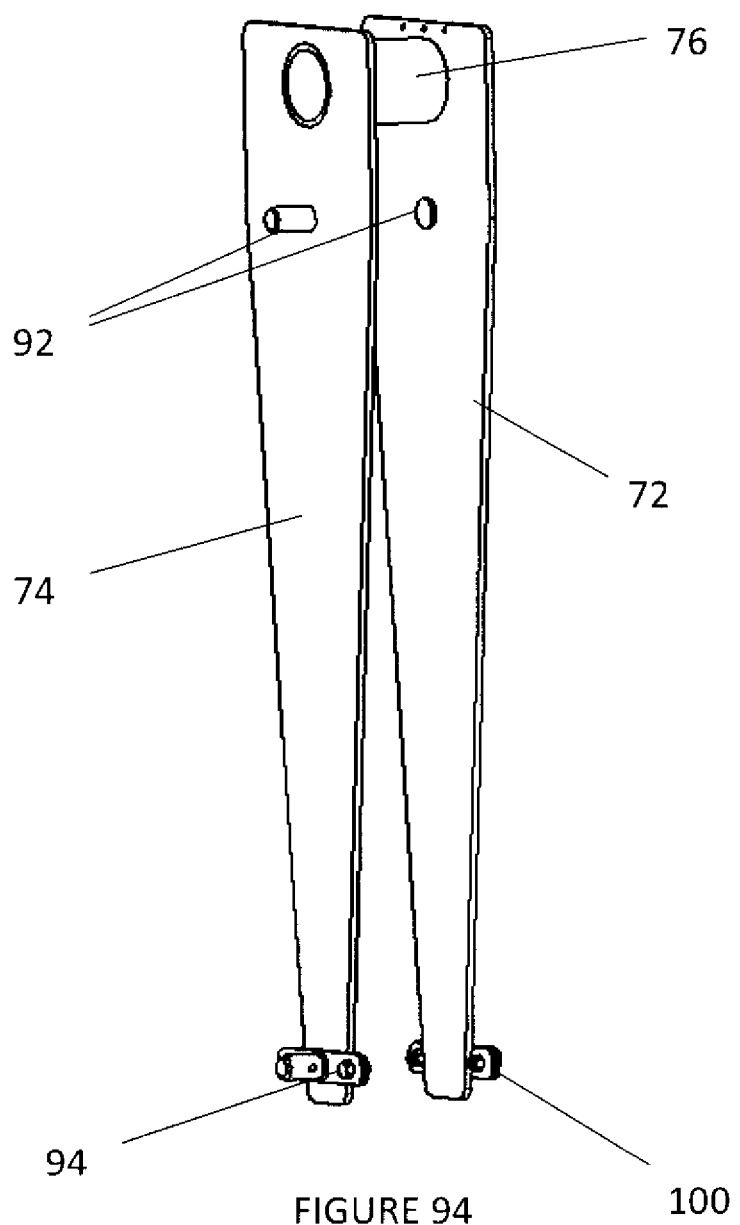
FIG. 94 shows a one piece double torque plate N1—ISO view
Figure 95:
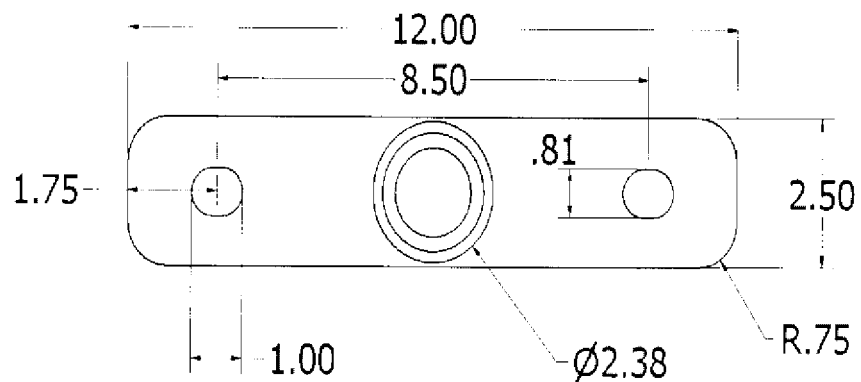
FIG. 95 shows a torque plate pin with adjustable plate—Front view
Figure 96:
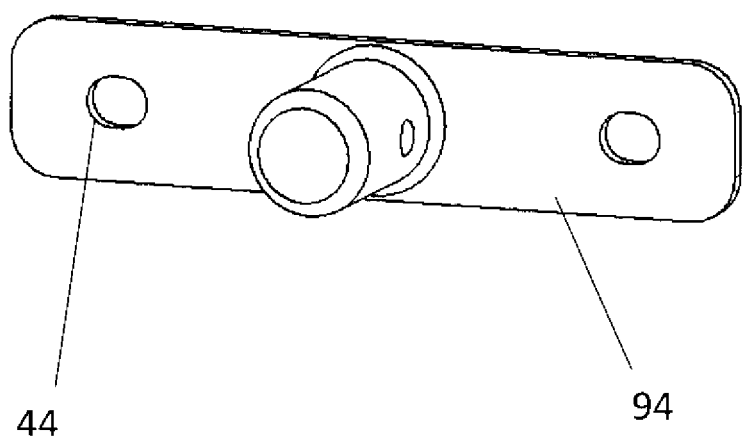
FIG. 96 shows a torque plate pin with adjustable plate—ISO view
Figure 97:
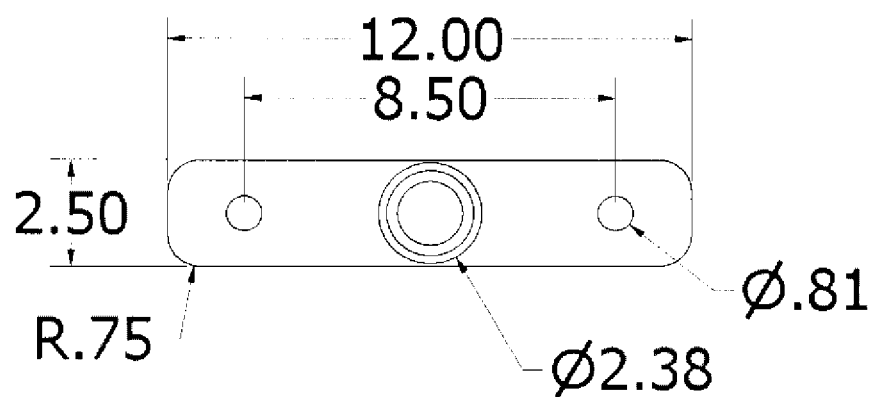
FIG. 97 shows a torque plate pin with non-adjustable plate—Front view
Figure 98:
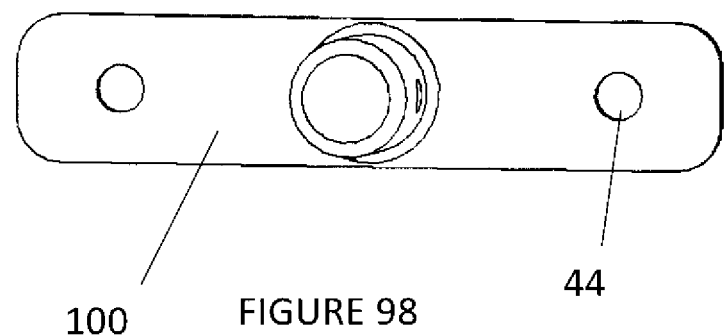
FIG. 98 shows a torque plate pin with non-adjustable plate—ISO view
Figure 99:
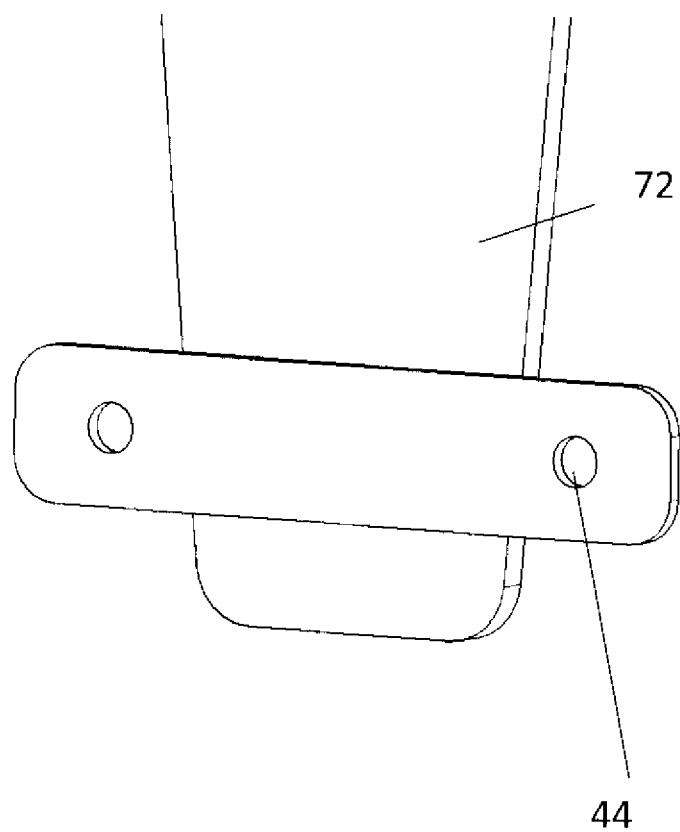
FIG. 99 shows a torque plate pin mount plate
Figure 100:
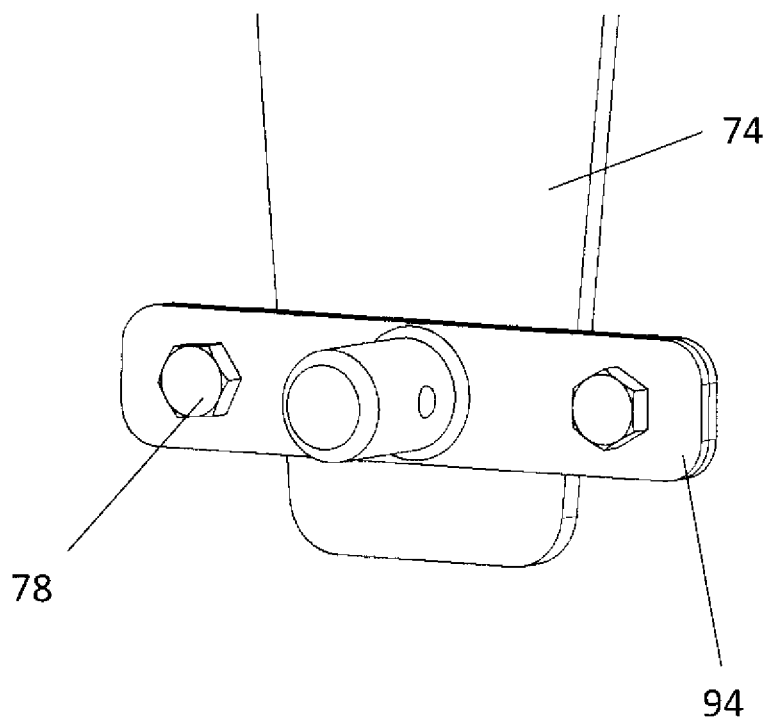
FIG. 100 shows a torque plate & pin with adjustable plate assembly
Figures 101, 102:
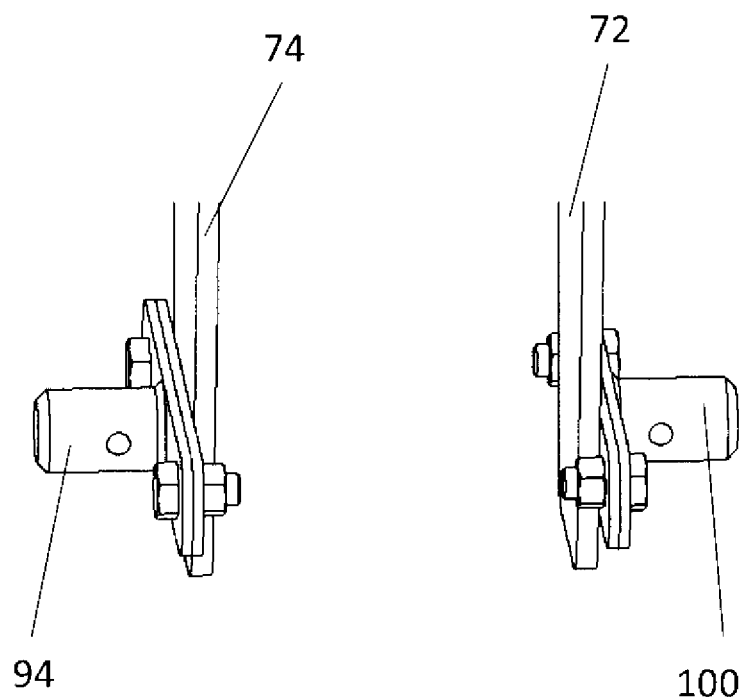
FIG. 101 shows a double torque plate with adjustable pin plates—side view
FIG. 102 shows a double torque plate without adjustable pin plates—side view
Figure 103:
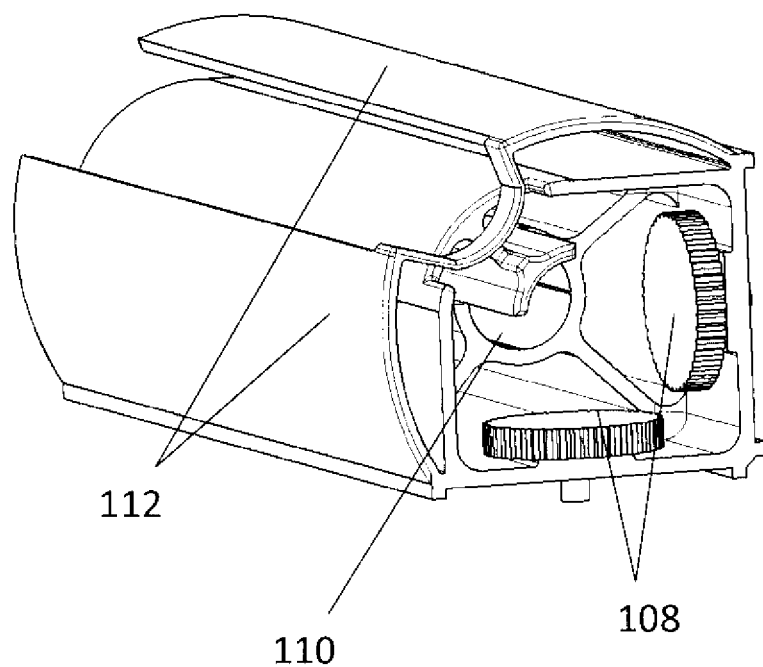
FIG. 103 shows a Frame Laser Alignment Tool Holder—Front ISO View
Figure 104:
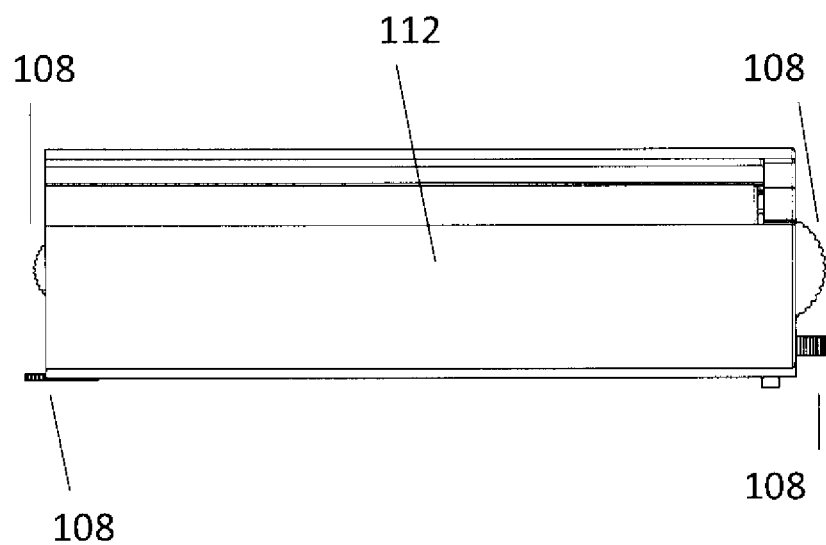
FIG. 104 shows a Frame Laser Alignment Tool Holder—Side View
Figure 105:
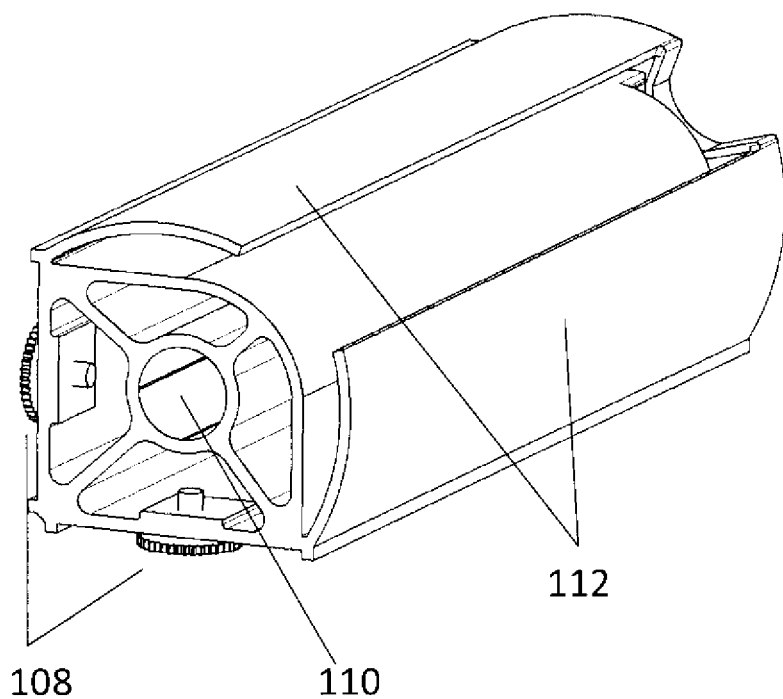
FIG. 105 shows a Frame Laser Alignment Tool Holder—Back ISO View

FIGS. 90-92 illustrate an adjustment pin plate which allow rotational adjustment between one frame and the next (the pin plate has some round and some slotted holes). FIGS. 93-102 illustrate a straight (-vs-cross shaped) torque plate 68 design which could be associated with a different frame geometry.

4. WES frame geometry and design. FIGS. 73 and 74 illustrate a "series 5" WES design (5 triangles as viewed from the end). This design was first shown in patent application Ser. No. 12/583,787; the purpose of illustrating it again in this patent application is to demonstrate that this design utilizes four top chords 60.

Benefits of a frame with four top chords 60 vs. three top chords 60:

A 4 chord system allows for the beams 46 to more closely match the parabolic shape of the mirror 122 surface. This allows for shorter connections between the beam 46 and mirror 122 rail which reduces the forces applied to the beam 46 resulting in lighter members, brackets, and fasteners. The total length of members needed to connect to the mirrors 122 is reduced up to 18.5% by using a 4 chord system compared to a 3 chord system.

A 4 chord system creates three beams 46 instead of two. These beams 46 have a shorter span which allows for smaller sections compared to a 3 chord system. This is also true for some of the struts 16. The beam 46 spans for a 4 chord system are between 10-30% shorter than the beam 46 span for a 3 chord system.

A 4 chord system allows for two connections to the torque plate 68 at the top layer instead of one. The torque at the end of the frame is distributed over more connections/members resulting in a lighter and potentially more rigid frame. The forces at the torque plate 68-to-node connection are 37-80% smaller for a 4 chord system compared to a 3 chord system.

Specifically, the beams 46 and struts 16 in a 4 chord system can span between 40 and 200 inches. The range for the force at the torque plate 68 is greater than 1,800 lbs. to 10,000 lbs. and up to 32,000 lbs. This is the shear force located at the connection between the torque plate 68 and the nodes 22. The minimum torque load for a single torque plate 68 is about 150,591 in-lbs. the maximum is 2,520,842 in-lbs. (6,250,000 in-lbs. for hurricane prone regions). Typical would be about 700,000 in-lbs.

The purpose of these two piece torque plate 68 designs is to allow the attachment of both torque plates 68 to the frame during the assembly process. This then allows the frames to be lifted and placed by the torque plates 68 and then adjusted for frame to frame alignment which is not possible with other frames. To accommodate such constraints, the plate thickness is about $9/16''$ and the size of the plate has the dimensions shown in FIG. 75. The top four chords have axial force limits of a min. of about 500 lbs. and a max of about 20,674 lbs.

5. Frame-to-frame laser 114 alignment. FIGS. 103-112 illustrate a frame-to-frame alignment system designed to utilize laser 114 alignment tools with tubular frame designs. The particular design shown is for a tubular node or longitudinal member utilizing at least two sides at right angles to each other (ID of the tube), although other designs for other profiles could be easily adapted. The intent is to slide the holder shown in FIG. 103 into the ID of the longitudinal member, and to place a laser 114, such as those used to be placed into the bores of rifles or other munitions' bores, into the holder. A "receiver" is slid into the ID of the opposite end of the longitudinal member. Note that both the laser holder 110 and receiver 120 have flexible members designed to "flex" and "crowd" the part toward one side of the longitudinal members ID.

Figure 110:
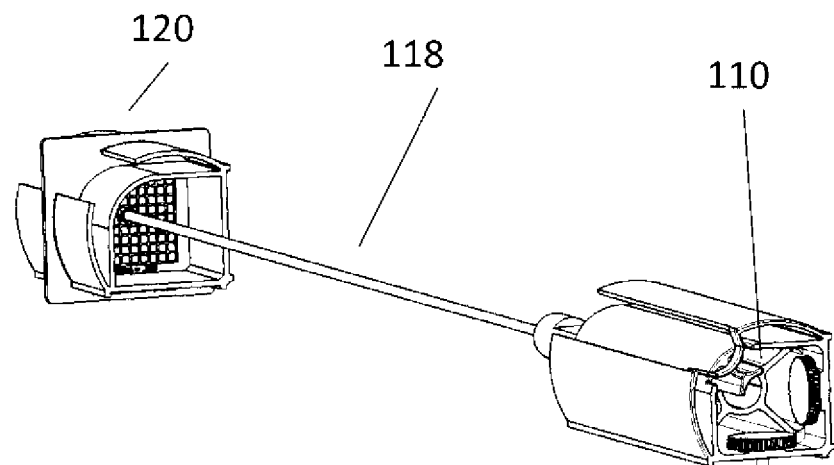
FIG. 110 shows a Frame Laser Alignment Tools—Showing Laser Beam Between them—Back ISO view
Figure 111:
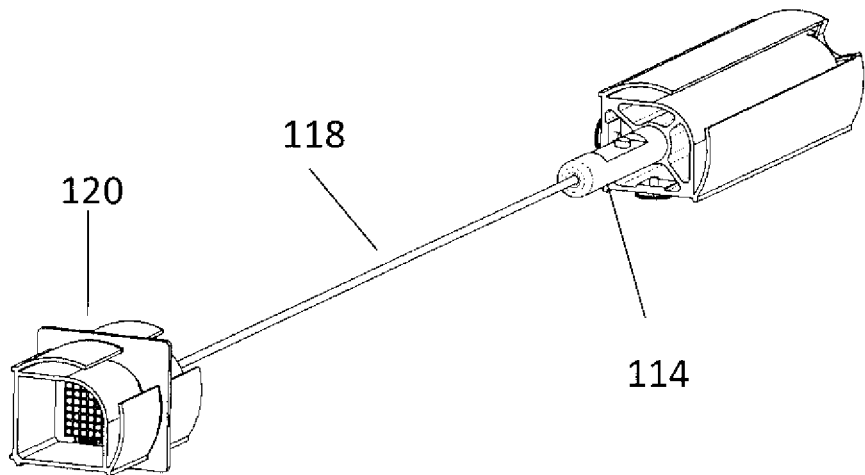
FIG. 111 shows Frame Laser Alignment Tools—Showing Laser Beam Between them—Front ISO view
Figure 112:
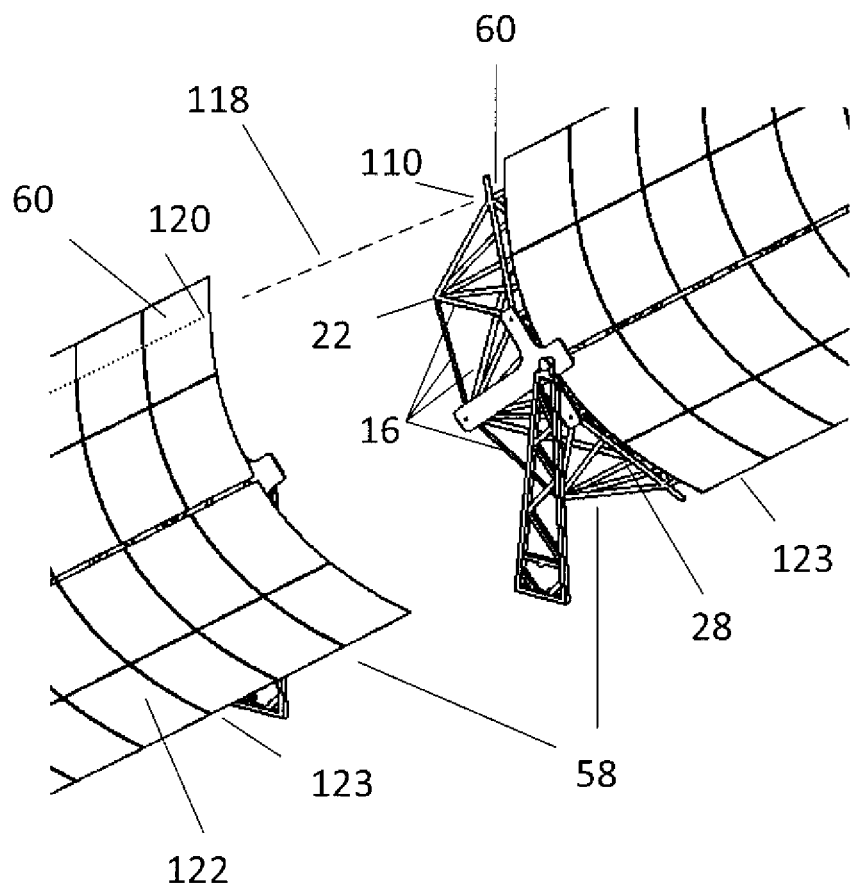
FIG. 112 shows Solar Frames with Frame Laser Alignment Tools in place
Figure 113:
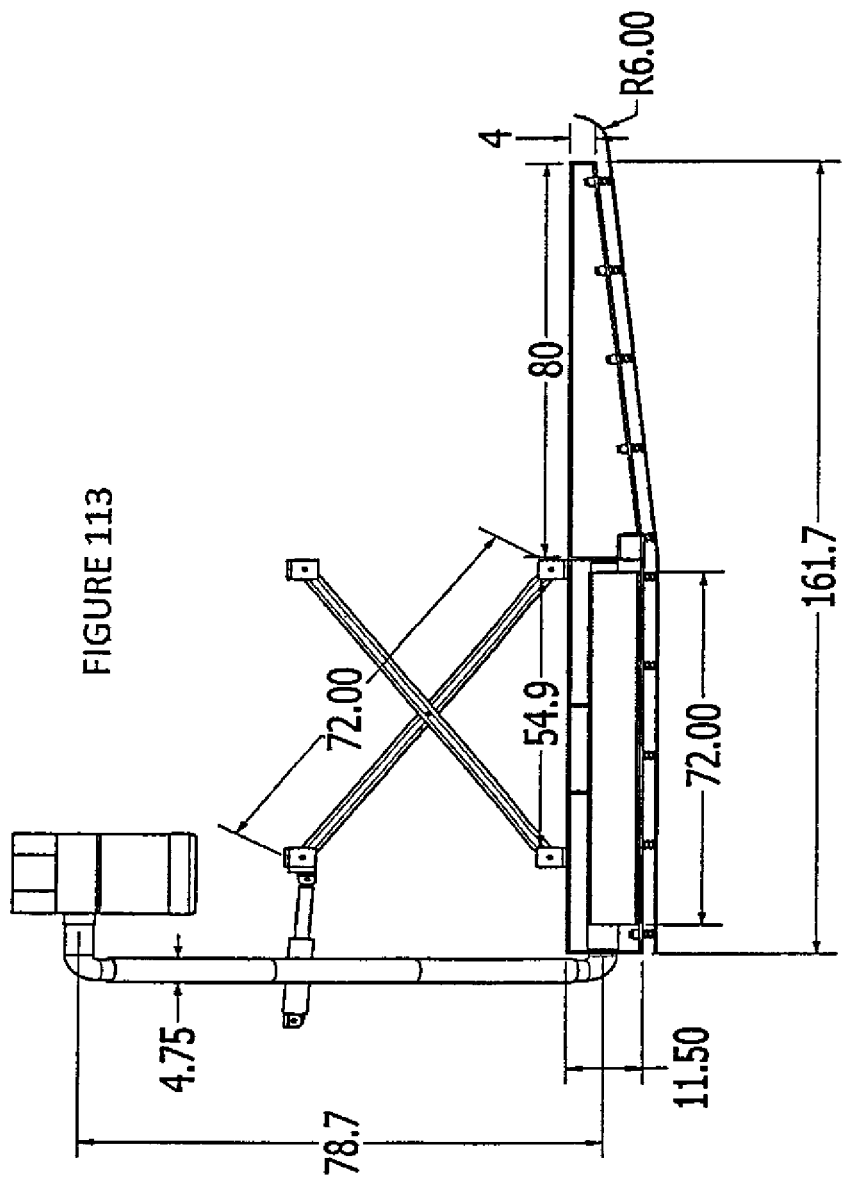
FIG. 113 shows a Mirror blower assembly print—Top View
Figure 114:
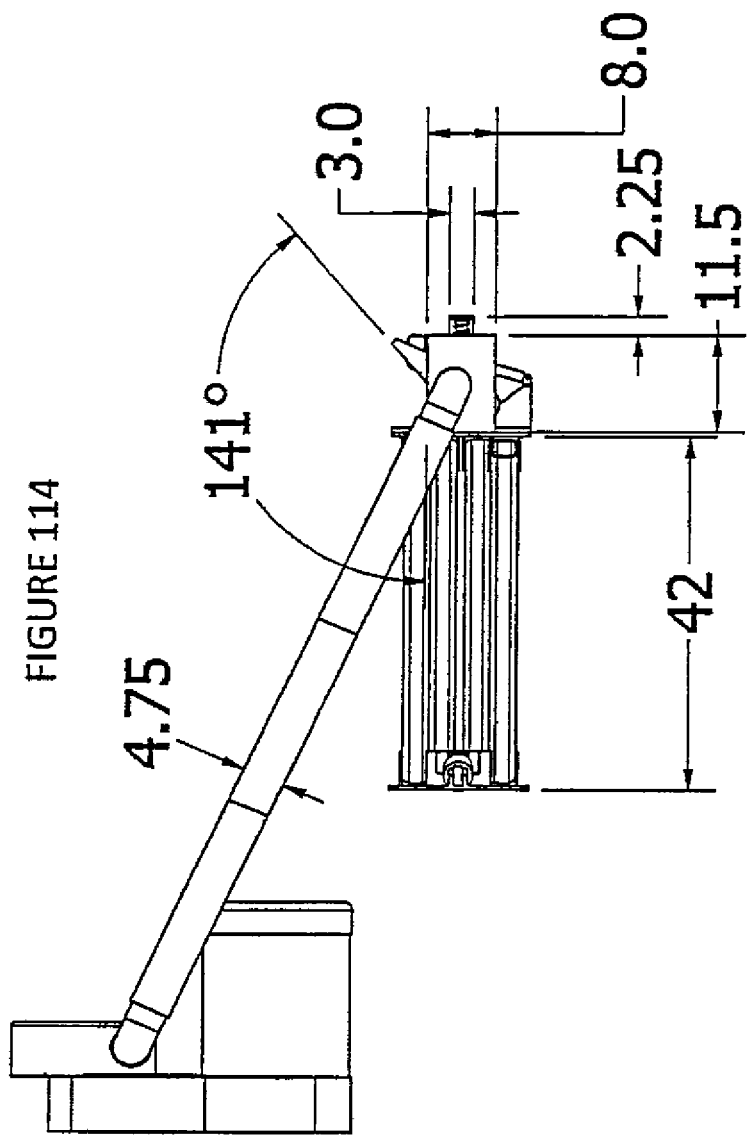
FIG. 114 shows a Mirror blower assembly print—Back View
Figure 115:
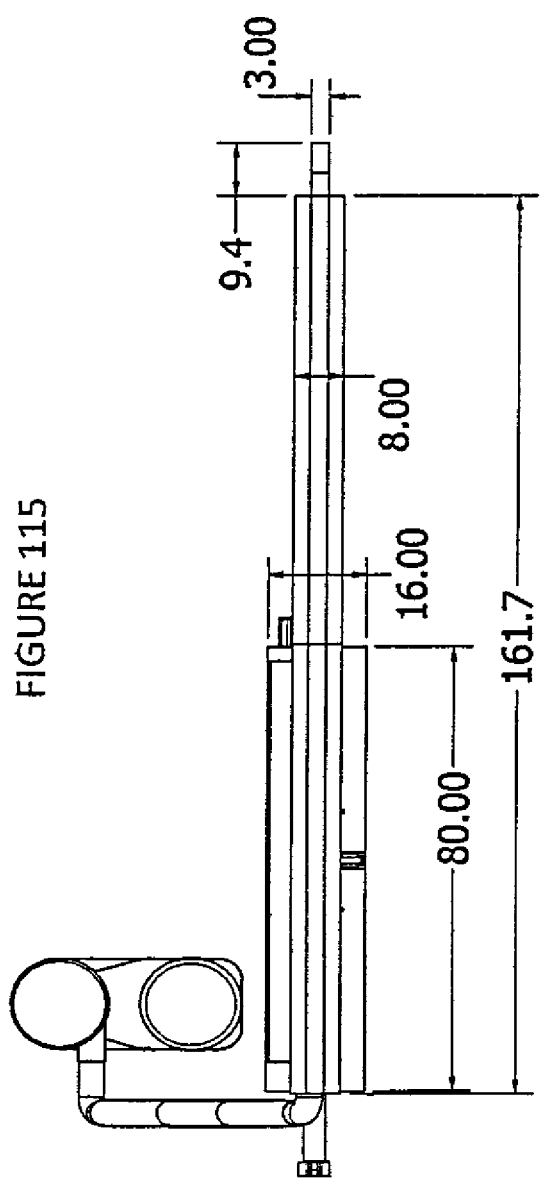
FIG. 115 shows a Mirror blower assembly print—Side View
Figure 116:
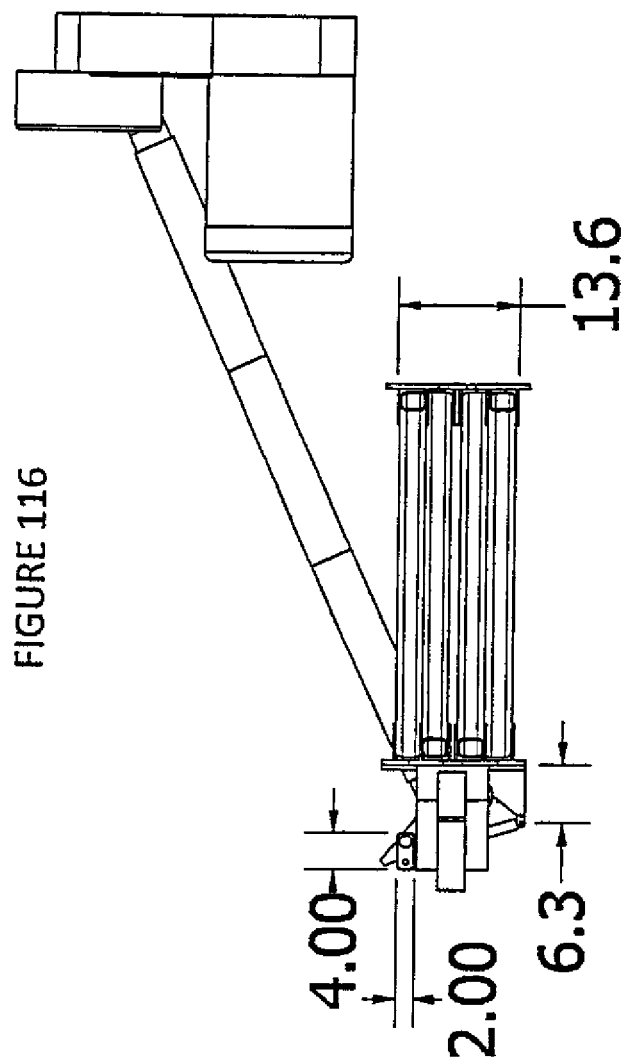
FIG. 116 shows a Mirror blower assembly print—Front View
Figure 117:
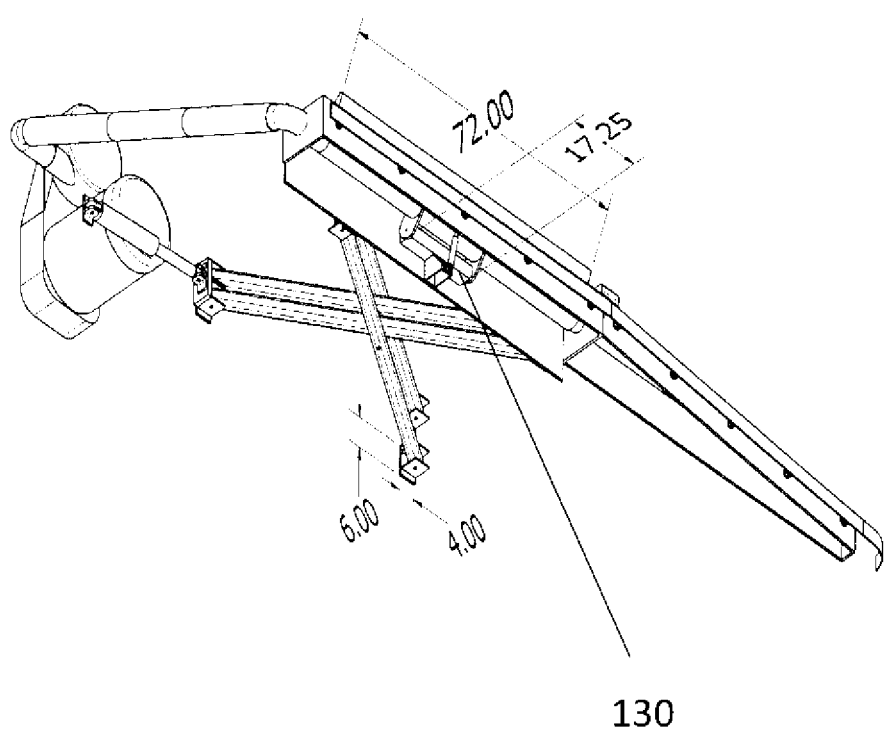
FIG. 117 shows a Mirror blower assembly print—ISO View Bottom

The laser 114 projects a spot onto the grid of the "receiver" slid in to the other end of the longitudinal member, and the adjustment wheels of the holder are adjusted such that the spot is centered about the axis that the laser 114 is mounted within. The receiver 120 is then removed from the end of the longitudinal member and placed into the near end of the longitudinal member of the next frame's associated part. Note that both ends of the receiver 120 have identical mountings, including the flexible "crowders" to facilitate moving from one frame to another. The laser 114 spot deployed onto the grid of the receiver 120 in the second frame thus shows how this frame must be adjusted to come into alignment with the frame that the laser 114 and holder are associated with. FIGS. 110-112 show this, but the frames in FIG. 112 are shown much further apart than they actual are mounted. The torque plate 68 of the left frame would be adjacent to the pylon 142 that has the right frame mounted on it—this distance allows the dotted line indicating the path of the laser 114 to be envisioned.

Figure 106:
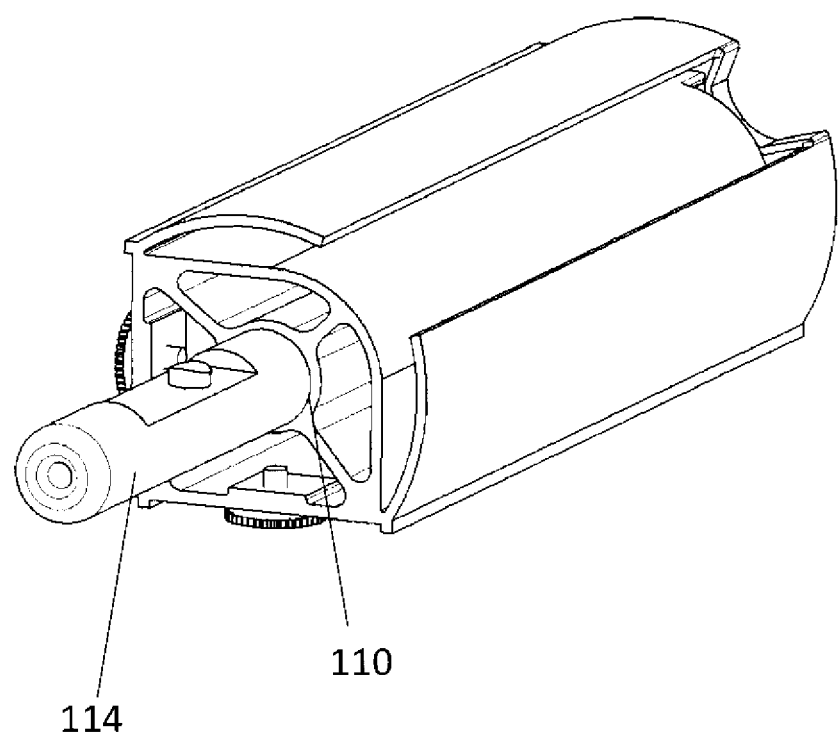
FIG. 106 shows a Frame Laser Alignment Tool Holder—With Laser

The frame laser 114 alignment tool holder, shown in FIGS. 103-106, has a laser 114 such as used in rifle bores inserted into its central "laser holder" 110; FIG. 106 shows the laser 114 inserted into the laser holder 110 of the laser 114 alignment tool holder. Because there are manufacturing tolerances in the solar frame 58 structural tube (chord, beam 46, mirror 122 rail, etc.) inside dimensions, for example, the laser 114 alignment tool holder is designed with flexible friction tabs 112. As the operator inserts the laser 114 alignment tool holder into the structural tube of the frame, the friction tabs 112 are squeezed inwards providing clearance to slide the holder into the tube. When the operator releases this squeezing pressure, the friction tabs 112 expand back outwards from the central laser holder area 110, in effect "crowding" the laser 114 alignment tool holder to the opposite side. Because there are two of these friction tabs 112 for the specific design depicted in the patent application for a rectangular tube, these "crowd" the laser 114 alignment tool against two right-angled walls of the ID of the structural tube. Any variation in ID dimensions occur at the flexible laser holder 110 sides of the tube; this ensures that the laser 114 alignment tool has its central laser holder 110 at a fixed dimension from each of the two right angled ID walls of the structural tube.

Figure 107:
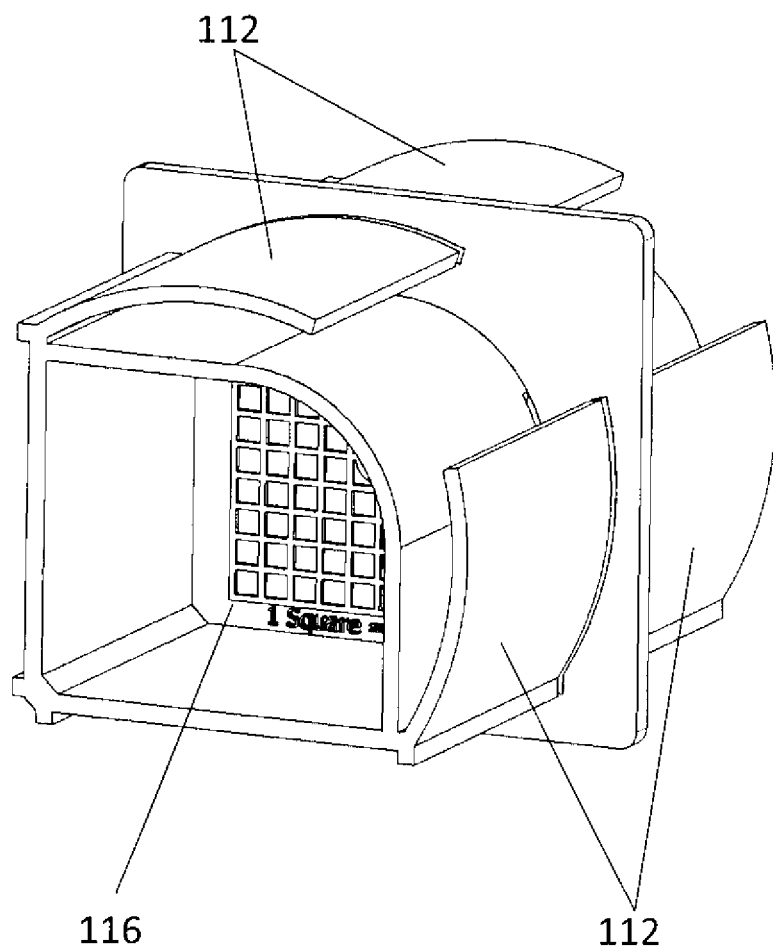
FIG. 107 shows a Frame Laser Alignment Tool Receiver—ISO View
Figure 108:
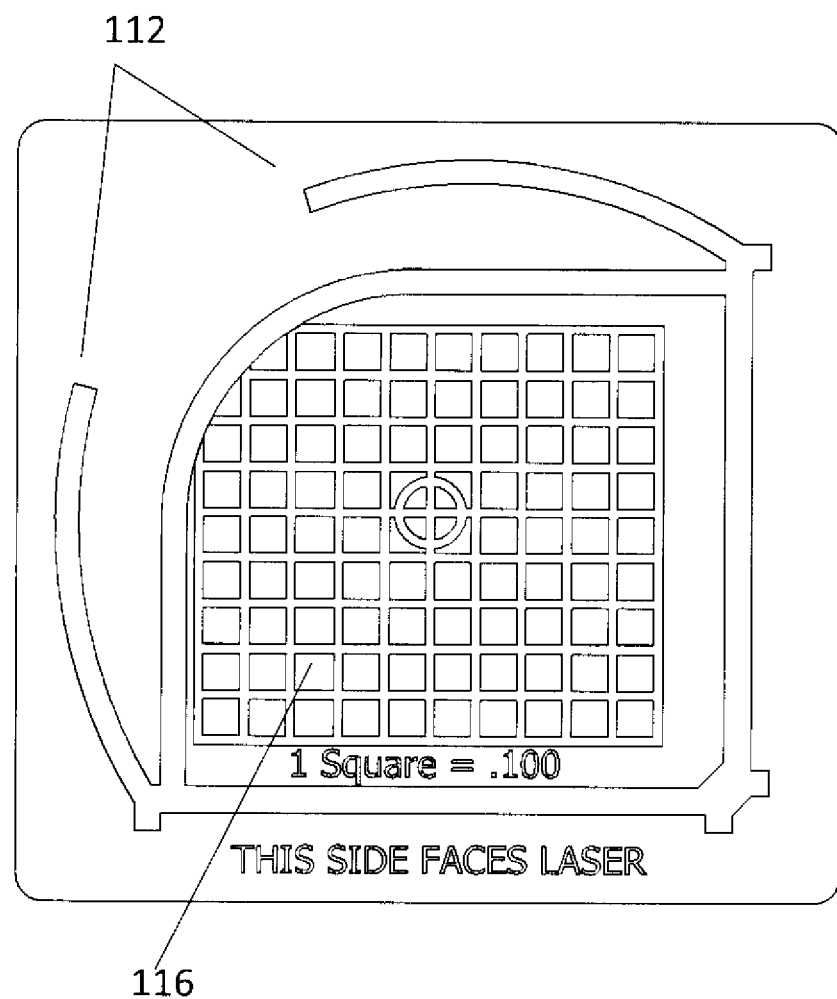
FIG. 108 shows a Frame Laser Alignment Tool Receiver—Front View
Figure 109:
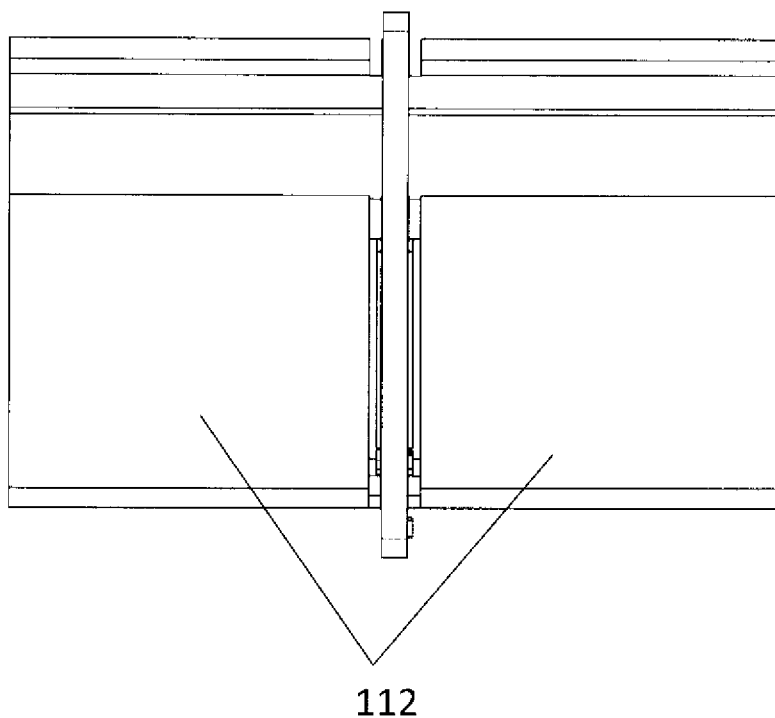
FIG. 109 shows a Frame Laser Alignment Tool Receiver—Side View

The receiver 120, shown in FIGS. 107-109, uses flexible friction tabs (112) in a similar manner to the laser 114 alignment tool holder. Because both the receiver 120 and the laser 114 alignment tool holder are thus "crowded" to the same two right angled adjacent sides of the structural tube ID, variations in the tube ID are negated. For initial laser 114 alignment tool holder calibration, both it and the receiver 120 are placed into opposite ends of the same frame structural tube. The receiver 120 uses an alignment grid 116 so that the laser beam 118 unit inserted in the holder can project a beam 46 onto the receiver 120. Referring back to the laser 114 alignment tool holder, the adjustment knobs 108 allow the angle of the laser 114 alignment tool holder to be adjusted until the laser beam 118 is centered onto the receiver's alignment grid 116. The receiver 120 is then moved to the next frames structural tube (note that because the receiver 120 has two identical ends utilizing friction tabs 112 on either side of a bisecting vertical plate (see FIG. 107), the receiver 120 can be moved longitudinally from one frame's tube to the next frame's tube WITHOUT having to turn it 180° and losing the alignment relationship to the laser 114 alignment tool holder). The adjacent frame can then be adjusted to best align it to the frame containing the laser 114 alignment tool holder with the laser 114 in its bore; the laser beam 118 projected onto the receiver 120 in the end of the adjacent frame can be used to indicate frame-to-frame rotational alignment. All of these concepts can be seen in FIGS. 103-112.

Figure 126:
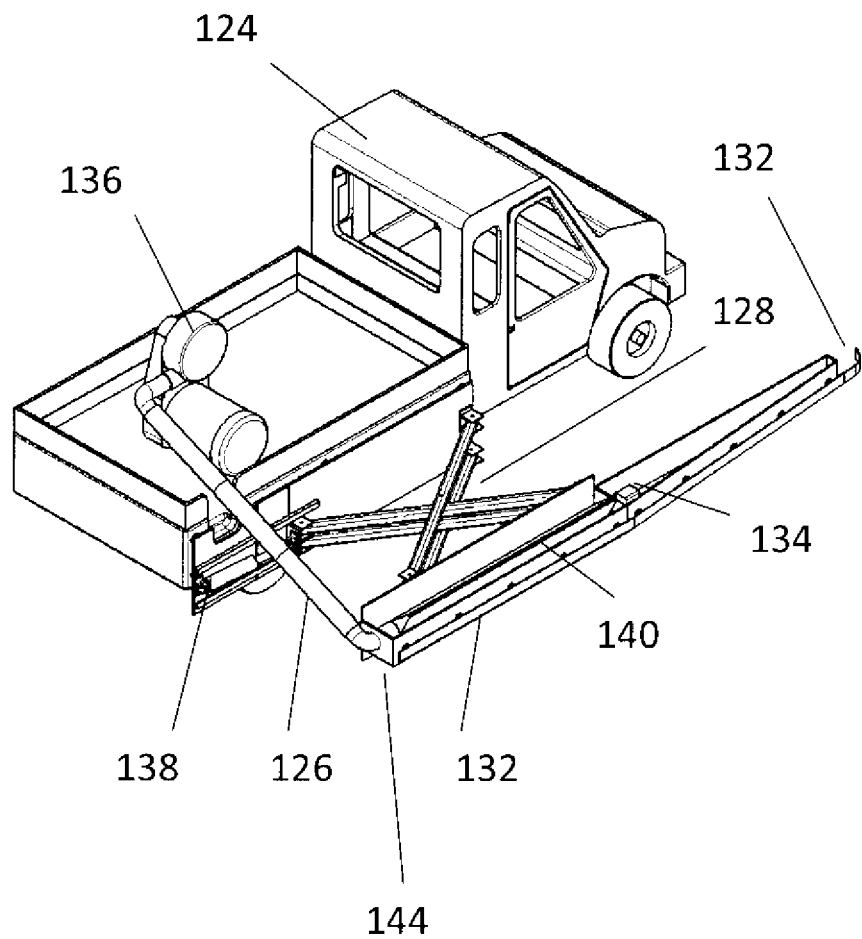
FIG. 126 shows a Mirror dust blower—mounted to side of truck—ISO View from Back
Figure 127:
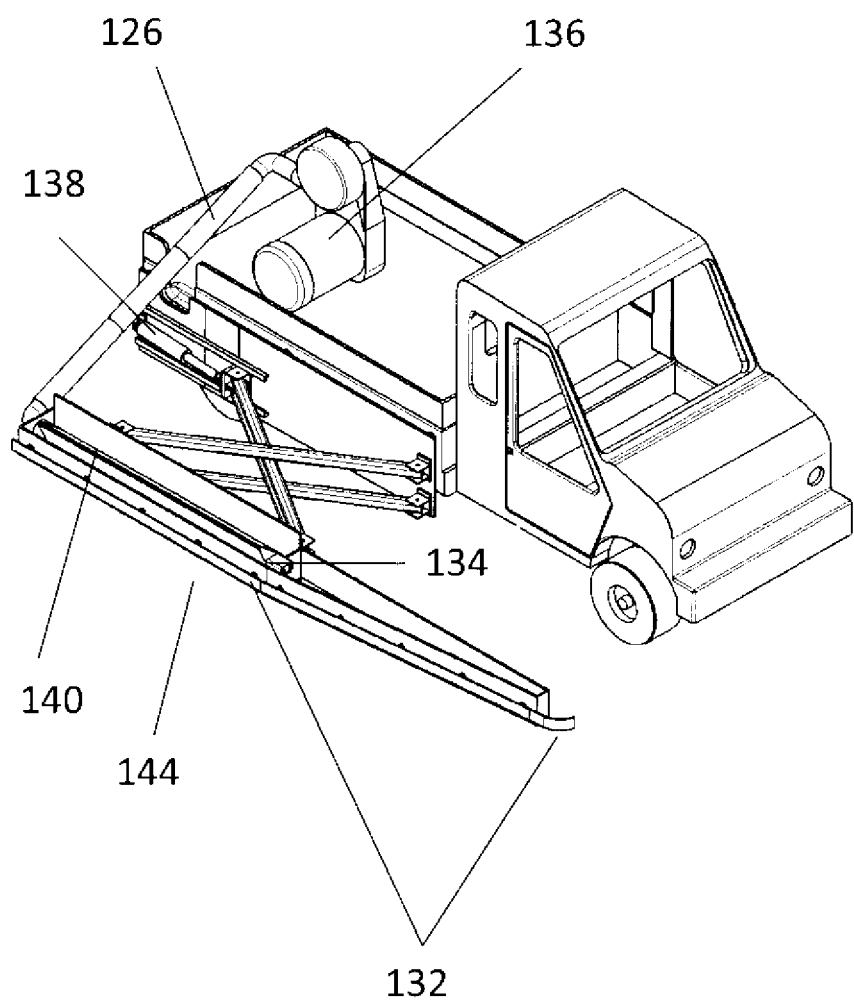
FIG. 127 shows a Mirror dust blower—mounted to side of truck—ISO View from front
Figure 128:
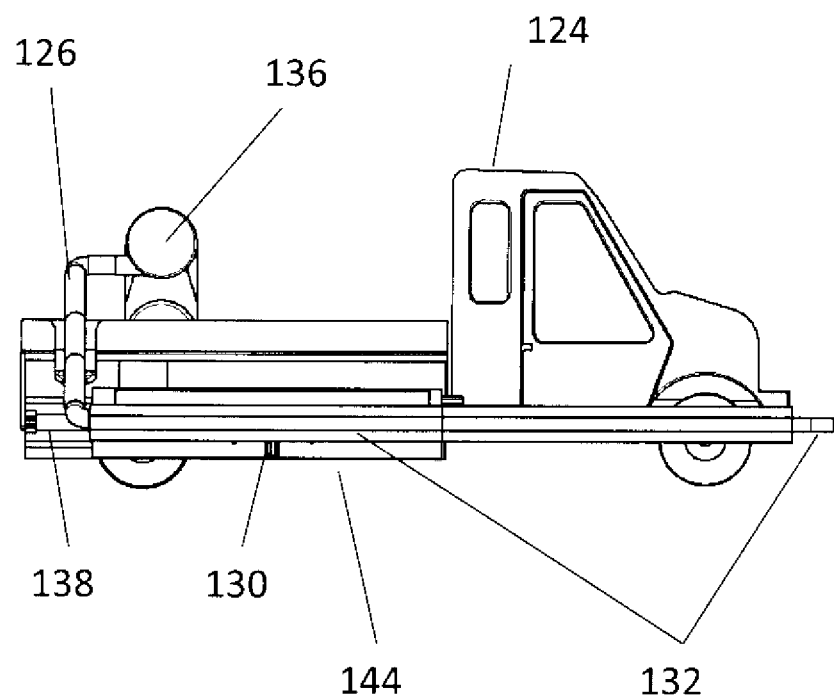
FIG. 128 shows a Mirror dust blower—mounted to side of truck—Side View

6. Mirror 122 cleaning system which avoids water use. The system illustrated in FIGS. 113-131 was originally designed to allow high volume air flow to be applied to the curved parabolic reflectors to remove desert dust or other debris which partially obscures and reduces the efficiency of the light focus onto the system's collector tubes; it can also be adapted to incorporate water or other liquid in addition to, or as a replacement for the anticipated air flow. The system as shown in the figures (perhaps best understood by reviewing the top vie in FIG. 113 and the isometric view mounted on the truck 124 in FIGS. 126 and 127) allows an air compressor, squirrel cage fan or other means to accelerate and provide high volume pressurized air through a tube to a multitude of nozzles (or a long slotted singular nozzle (or a few of these)) and a means to position these nozzle(s) close to the edge of the reflectors safely. The assembly is manipulated toward and away from the side of the truck 124 by a scissors mechanism likely utilizing photo eyes and/or spring or pneumatic (or hydraulic) absorbing means (or polymers providing the same function) such that guides never contact the frame with more than desired force. The portion of the guide which is in front of the air system (again, refer to FIG. 127, for example), is angled inward slightly toward the truck 124 so that the edge of the guide never hits the end of the frame directly, but instead gradually engages with the frame as the truck 124 moves forward.

Figure 129:
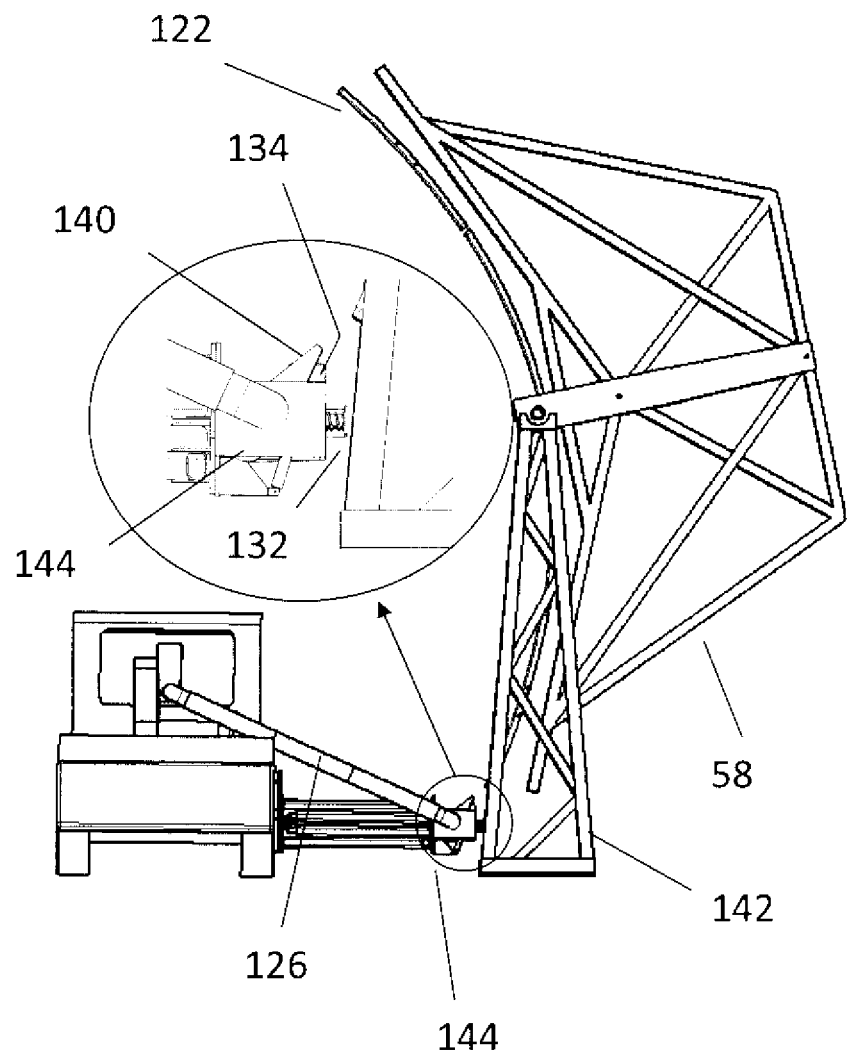
FIG. 129 shows a Mirror dust blower & Solar frame—Back View
Figure 130:
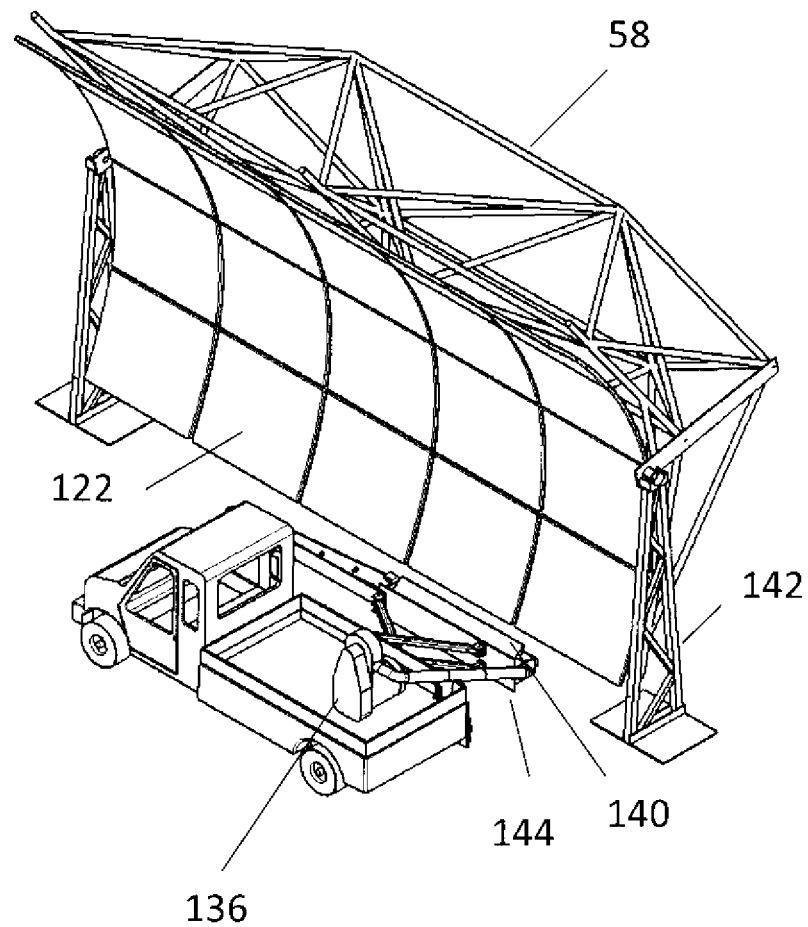
FIG. 130 shows a Mirror dust blower & Solar frame—ISO View 1
Figure 131:
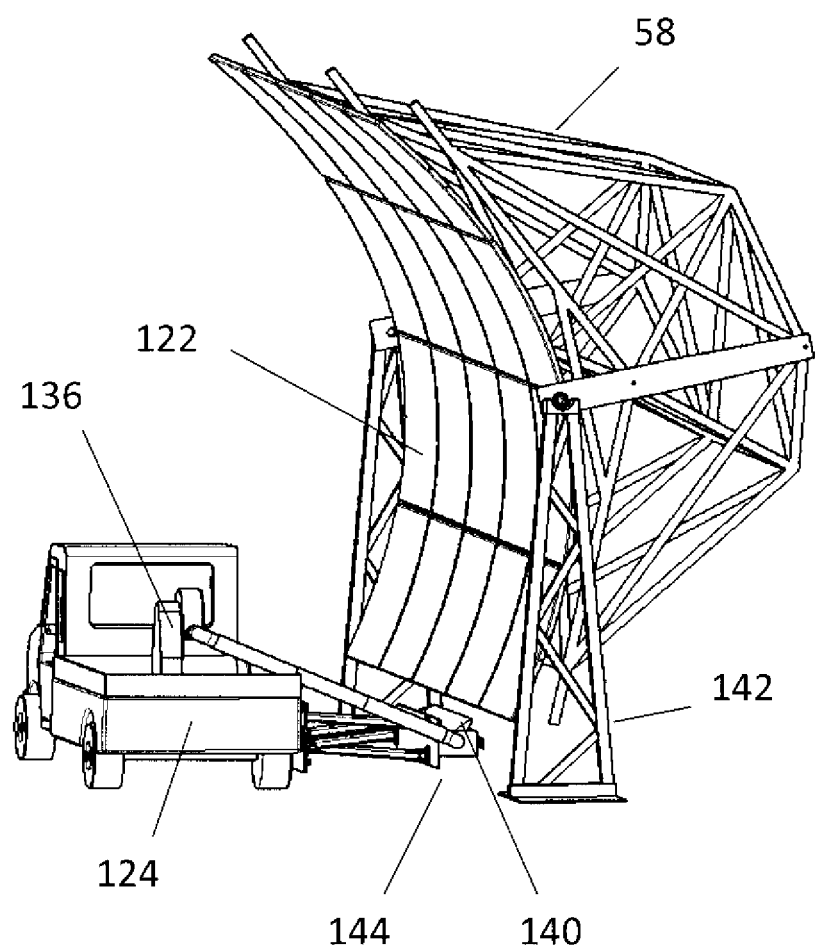
FIG. 131 shows a Mirror dust blower & Solar frame—ISO View 2
Figures 138, 139:
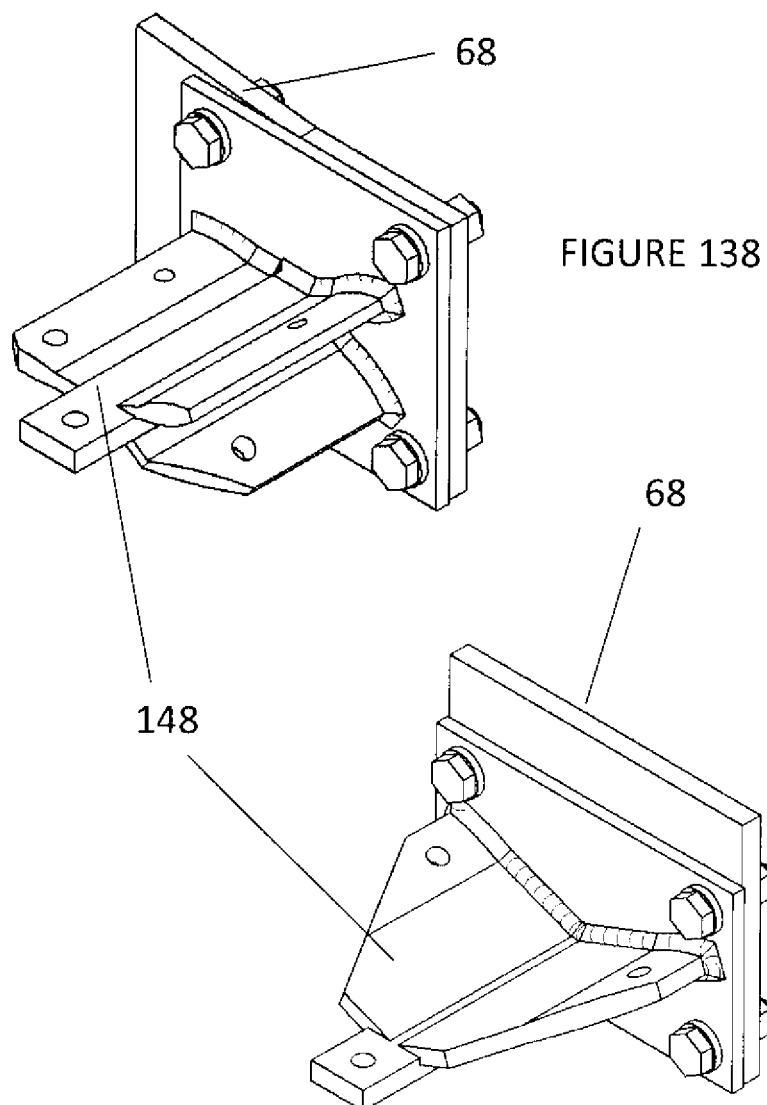
FIG. 138 shows a Solid node torque plate connection (top IS).
FIG. 139 shows a Solid node torque plate connection (bottom center node).
Figure 140:
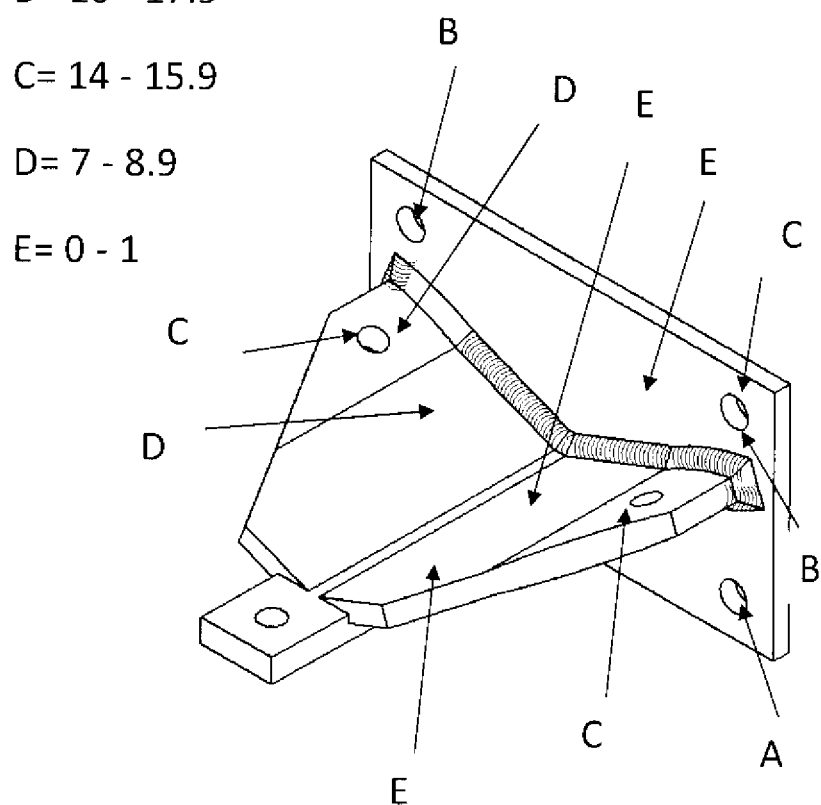
FIG. 140 shows a Bottom center solid node FEA—Von Mises Stress

The system can easily be design with shear pins or other means to ensure that the cleaning mechanism or its mountings fail prior to any frame components in the event that there is a collision between the device and a frame; this design would incorporate easily replaceable parts to minimize repair costs and lost time in the field. FIG. 129 shows how the guiding means are intended to utilize the pylons 142 as "guides"; with the frame tilted properly for the cleaning process, the truck 124 progresses forward as the air stream blows the offending particles along the parabolic reflective shape and off of the assembly (over the truck 124). FIG. 122 shows the front view detail of the blower duct 140 and guides as well as the proximity sensor 134 to avoid collisions with the pylons 142.

FIGS. 113-131 depict a truck 124 mounted mirror 122 cleaning system designed to protect the parabolic frames and mirrors 122 and to properly clean them using high velocity air-vs-water (the system can be adapted to use water as well, but the design was originally created to limit the use of scarce water in arid environments). The truck 124 has mounted to it an air blower and motor 136 which generates high velocity air; this is ducted through the air supply tube 126 to the blower duct 140 which will be adjacent and mostly parallel to the mirror 122 surface, ensuring the delivery of high velocity air onto the parabolic mirrors 122 surface. The intent is to have the truck 124 drive along the longitudinal direction that the parabolic mirror frames are placed along. These frames are mounted to pylons 142 which support and guide the frames as they rotate to follow the sun; the frames are generally connected frame-to-frame in solar collector arrays (SCA) driven by common drive means (generally 4-6 frames on either side of a common drive, with thus 8-12 frames turned by the drive). SCA's are turned in unison by adjacent drive units—the collector tubes which the parabolic mirrors focus sunlight onto are thus basically aligned over the course of perhaps ½ to 1 mile in length. The truck 124 can thus be positioned and can basically drive for ½ to 1 mile in a straight line with the blower ducts 140 providing high velocity air to the mirror 122 surfaces. The blower and motor 136 would have air filters removing any dust to ensure that the high velocity air doesn't include particles which could damage the reflective surfaces. The air supply tube 126 can be telescoping or festooned using flexible tubing to allow for adjustment of the mirror blower assembly 144-vs-the pylons 142 and mirror surface blower assembly 144 is made up of the blower duct 140, guide rails 132, camera and proximity sensor 134 and guide rail springs 146). The high velocity air blows surface sand, dust and debris off of the mirror 122 surface; the blower duct adjustment power cylinder 130 is used to adjust the angle of the high velocity air to the mirror 122 surface. The parabolic mirrors 122 are extremely large/wide and thus the exiting air off of the mirror 122 surface is 18 or more ft. in the air (see FIG. 131).

Figure 123:
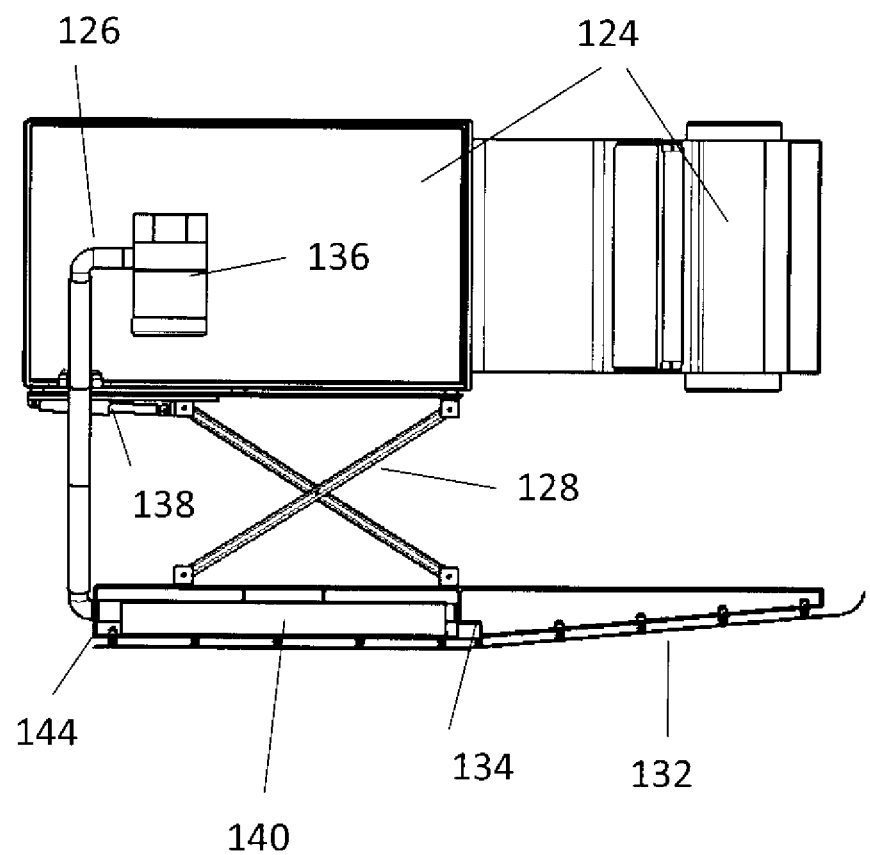
FIG. 123 shows a Mirror dust blower—mounted to side of truck—Top View
Figure 124:
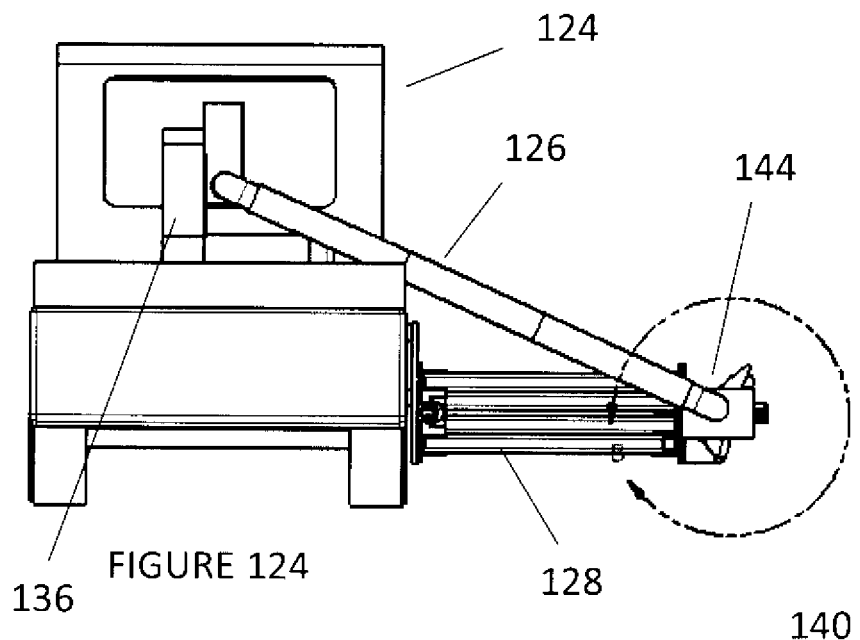
FIG. 124 shows a Mirror dust blower—mounted to side of truck—Back View
Figure 125:
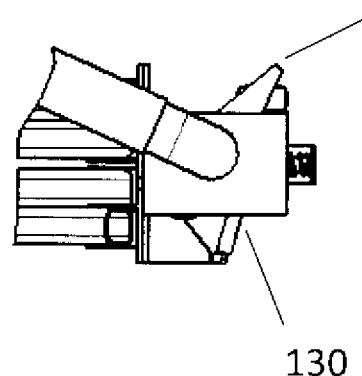
FIG. 125 shows a Mirror dust blower—mounted to side of truck—Detailed head View—Back

The mirror 122 surfaces (can be glass, laminated polymers, polished metal, etc.) must be protected from the blower duct 140 or other components physically touching them. FIG. 118 shows an isometric view of the blower, ducting and blower duct 140 system as well as the scissor support arms 128 and guide rail 132, camera and proximity sensor 134. FIG. 120 shows the guide rail springs 146. The truck 124 driver positions the blower duct 140 parallel and in close proximity to the pylons 142 (see FIG. 129). The camera and proximity sensor 134 monitor the distance between the guide rail 132 and the pylons 142, signaling the scissors support arm powered cylinder 138 to extend or retract the scissors support arms 128 and the mirror blower assembly 144 (attached guide rail 132 and attached blower duct 140, etc.); this occurs continuously to ensure that the spacing between the cleaning system and the pylons 142/frames/mirrors 122 is maintained properly. In addition, the guide rail springs 146 shown in FIG. 120 are an additional safety so that if, for example, the truck 124 were to swerve slightly off of a straight line and impact the pylon 142, the springs would take up the impact; FIG. 123 also shows how the guide rails 132 have its leading ½ angled slightly inward to ensure easier guidance of the system, further reducing the likelihood of any mechanical contact.

The blower assembly may automatically position itself relative to the pylons 142, frames and mirrors 122. There may be an impact avoidance mechanism disposed on the truck 124 to avoid impact by the truck 124 with the pylons 142, frames and mirrors 122 as the truck 124 moves. The Tough Sonic/PC Distance sensor (TSPC-30S1 series) with the Senix VIEW software and an Elite monochrome camera (BE-200C) is one example of an existing product that may be added to the blower assembly and the truck 124 to provide for automatic positioning of the blower assembly and for avoidance of the pylons 142, frames and mirrors 122 as the truck 124 moves. The Elite BS-430AW-KXP sensor system may also be used in conjunction with the Tough Sonic for these purposes.

Figure 141:
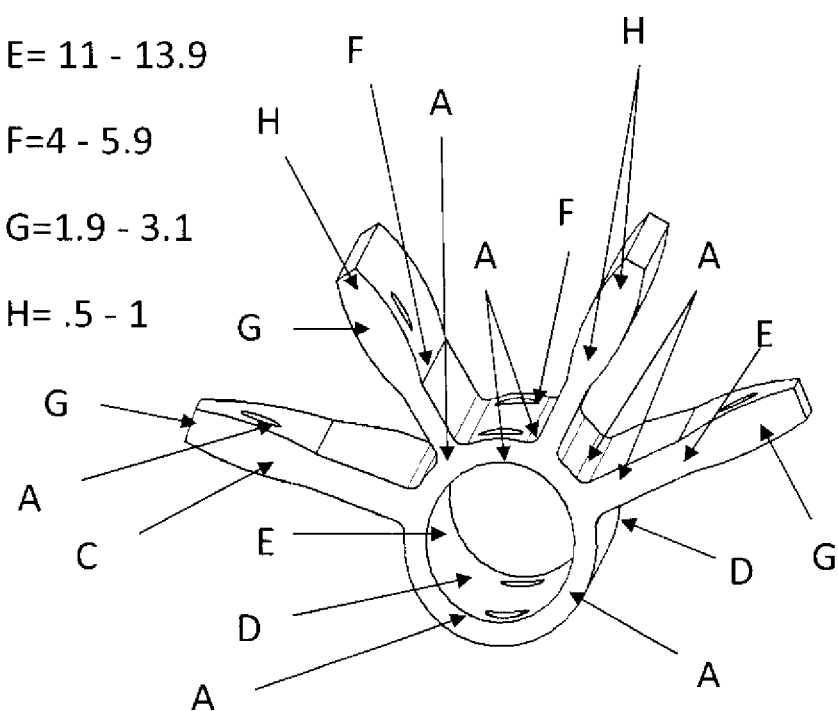
FIG. 141 shows a Bottom center hollow node FEA—Von Mises Stress
Figure 142:
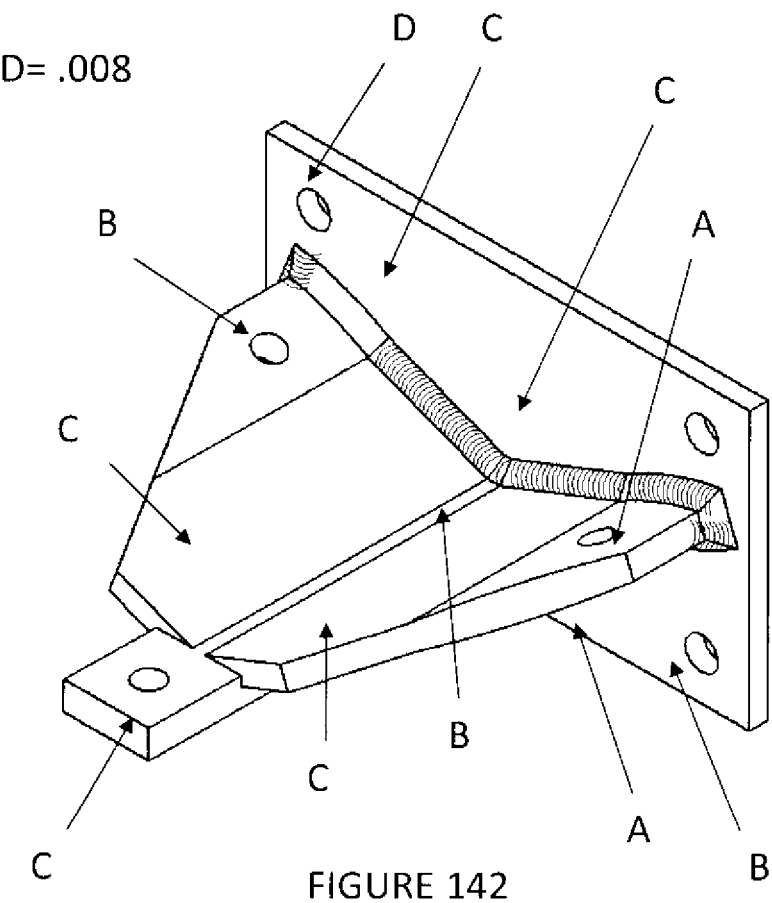
FIG. 142 shows a Bottom center solid node FEA—Displacement
Figure 143:
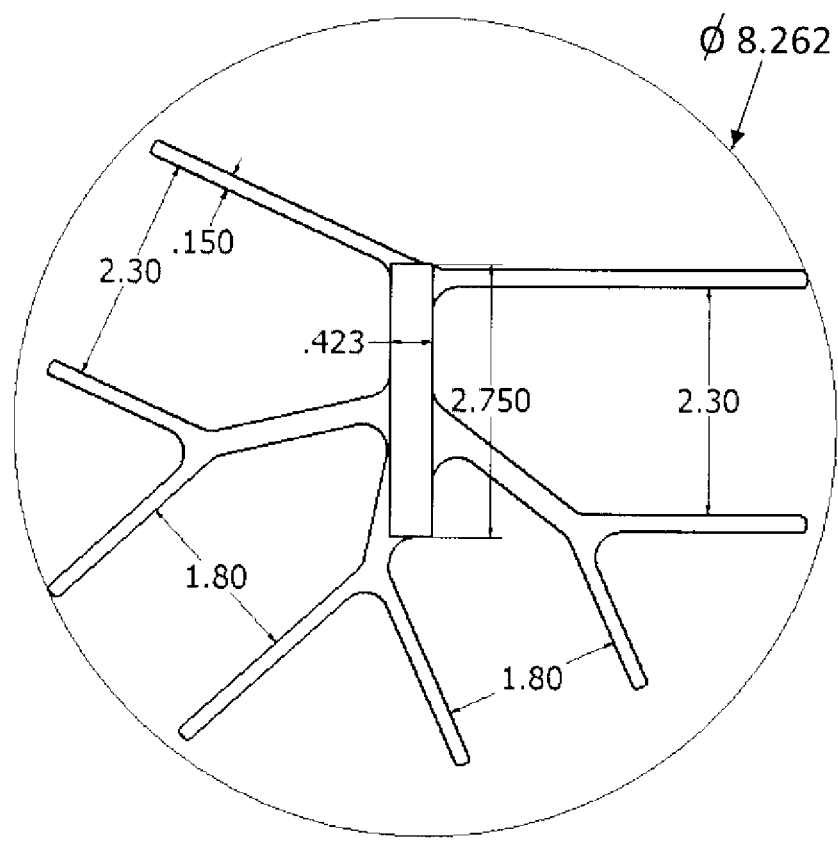
FIG. 143 shows a Double fin solid node print—Front view
Figure 144:
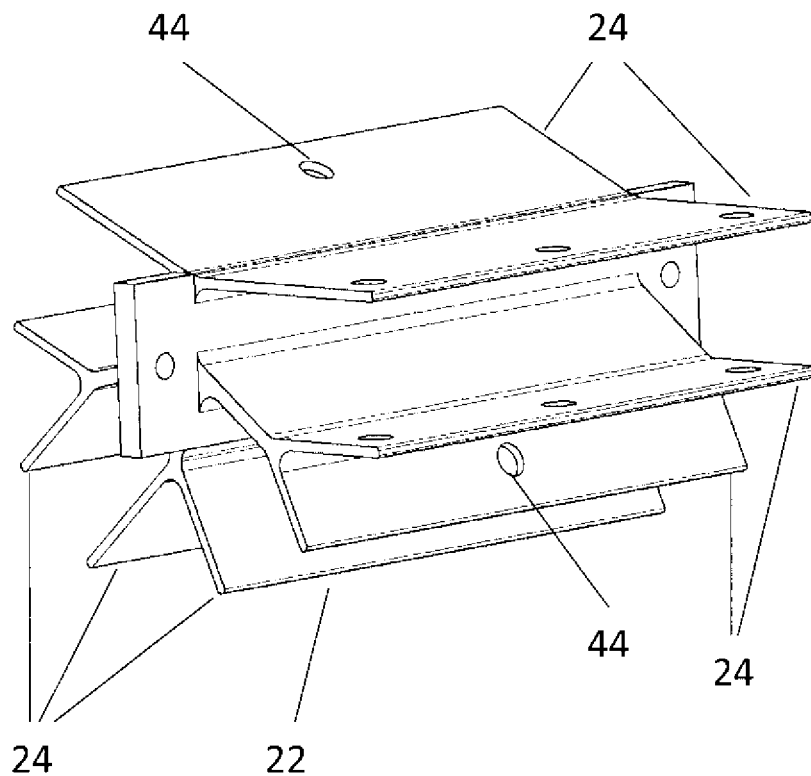
FIG. 144 shows a Double fin solid node—ISO view
Figure 145:
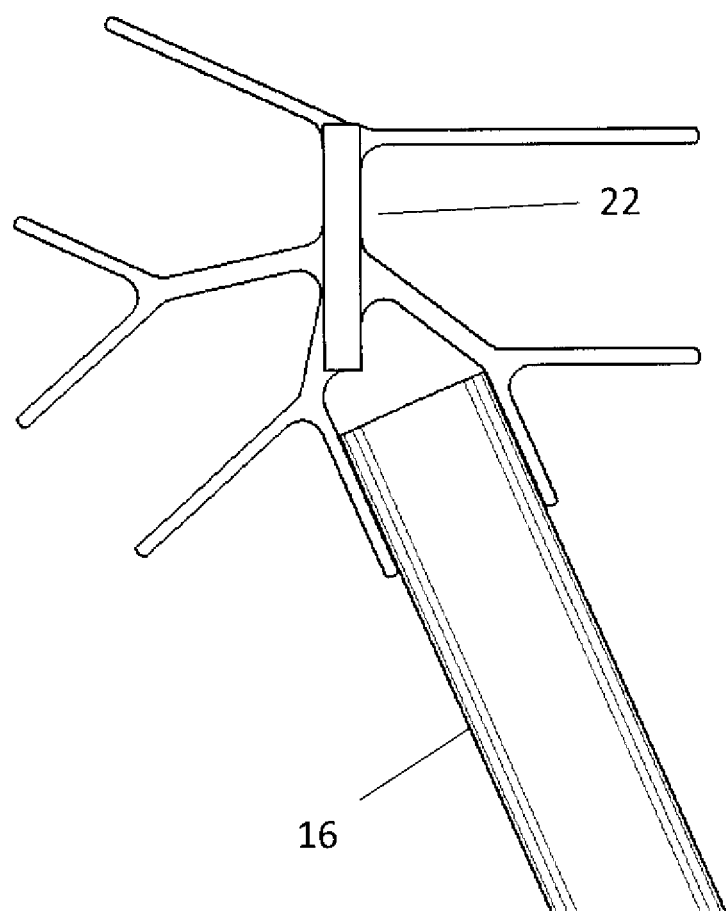
FIG. 145 shows a Double fin solid node with strut—Front view
Figure 146:
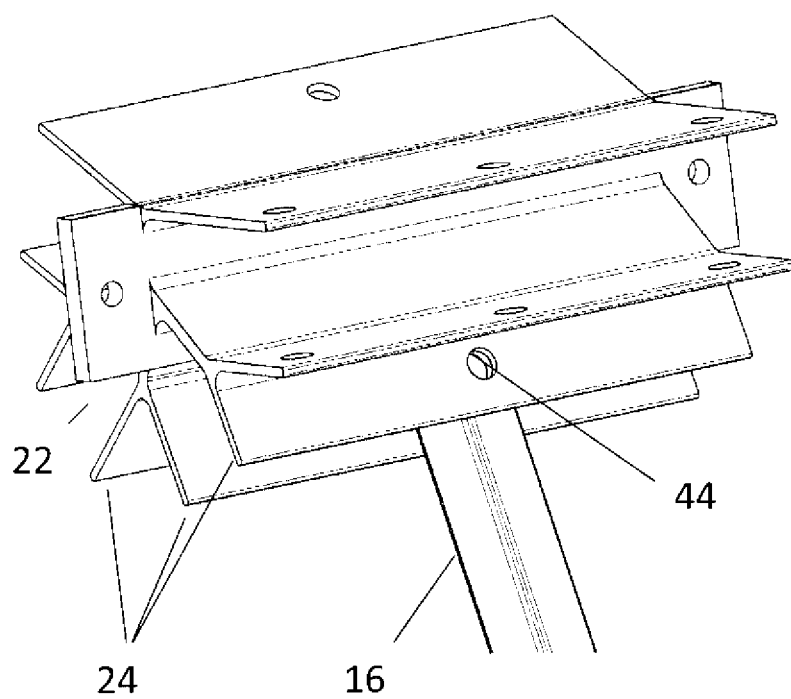
FIG. 146 shows a Double fin solid node with strut—ISO view
Figure 147:
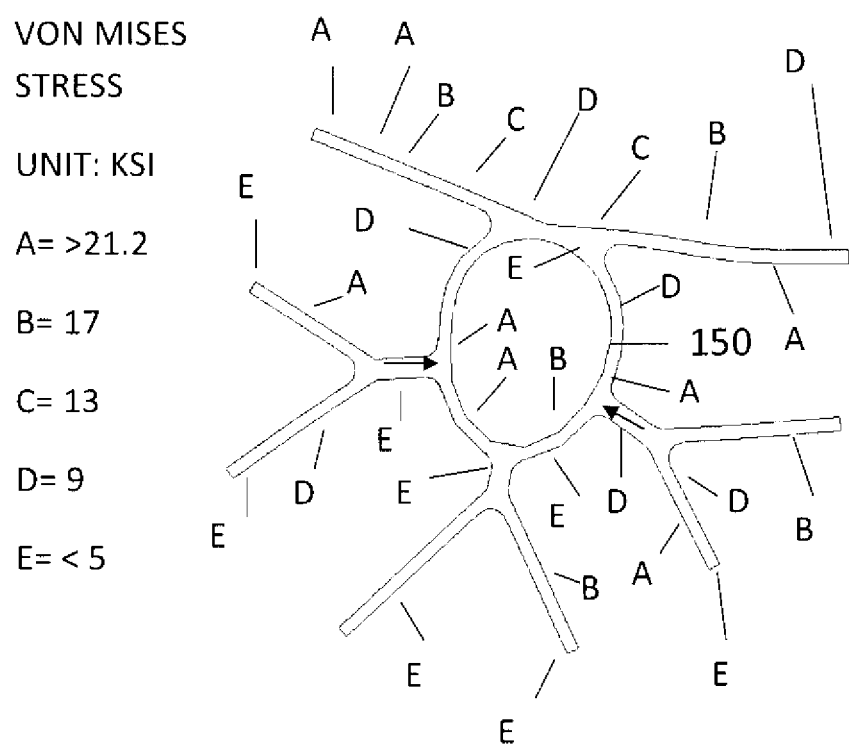
FIG. 147 shows a Double fin hollow node FEA, showing deformed hollow center portion—Von Mises Stress
Figure 148:
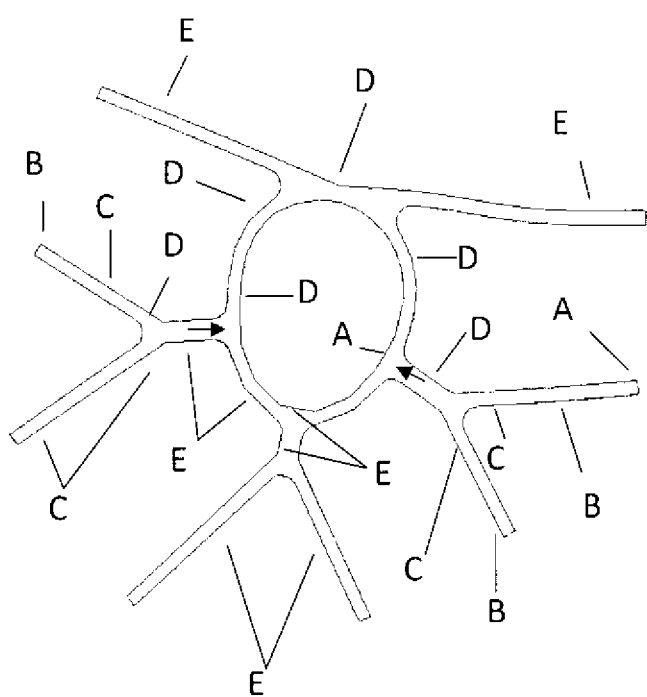
FIG. 148 shows a Double fin hollow node FEA—Displacement
Figure 149:
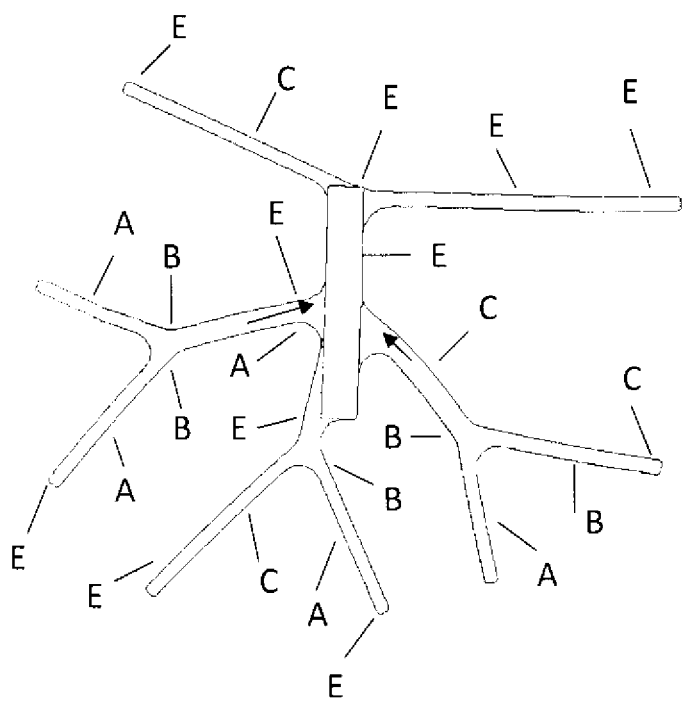
FIG. 149 shows a Double fin solid node FEA—Von Mises Stress
Figure 150:
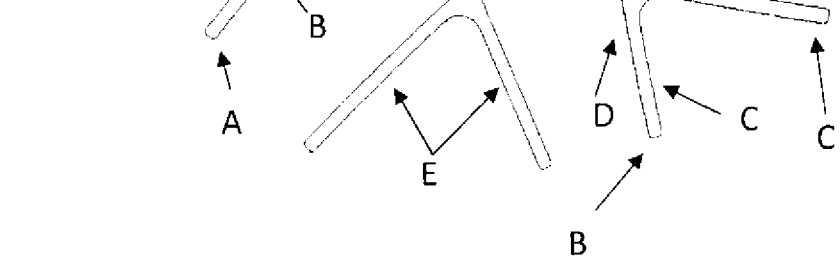
FIG. 150 shows a Double fin solid node FEA—Displacement

7. Torque plate 68 Node Designs. FIGS. 132-142 illustrate node assembly designs to transfer the loads from the frame nodes 22 attached to the ends of the frame and to the torque plates 68. This design minimizes the induced moment in the node 22 due to the forces convergence point being closer to the torque plate 68. This allows for a lighter node 22. In designs where multiple frames are driven by a single drive unit, the frames on either side of the drive unit are subjected to the highest torques and thus the highest loads on these connections. The node 22 assembly shown in FIGS. 133, 134 and 141 is a hollow node which engages with and is fastened to a structural pin extending from the torque adjustable pin plate 94. The assembly shown in FIGS. 135-139 and FIG. 142 is a solid node welded to a back plate (alternatively, it could be inserted into a back plate water jet cut or otherwise processed to accept insertion of the node 22 profile, and then welded onto both sides of the plate if needed. The plate is then bolted onto the torque plate 68.

The "welded node" was designed to bring the point where the struts 16 and chords intersect as close as possible to the plane of the torque plate 68. Because of the width of the chords and struts 16, there will always be a slight offset. This offset creates a moment within the attachment node 22. By using the solid or hollow node welded to the attachment plate which then bolts to the torque plate 68, this offset is minimized, thereby minimizing the weight of the node 22 and attachment plate required. The perimeter weld shown in FIG. 136, for example, provides more structure than a pinned connection which would extend through the torque plate 68 into the ID of the hollow node such as shown in FIG. 133; the wider connection provided by the weld-vs-the pin provides more resistance to twisting the node 22 relative to the plane of the torque plate 68.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A solar trough frame for holding solar mirrors comprising:
    a plurality of chords which include a top layer of only 4 chords substantially in parallel with each other;
    a plurality of struts;
    a plurality of nodes that connect to the struts and chords, at least one of the plurality of nodes has a circle size that allows the node to be extruded on a 10 inch diameter extrusion press, one node of the plurality of nodes supporting a load of at least 1,000 lbs.; and
    a platform supported by the chords and struts on which the solar mirrors are disposed.

2. The frame of claim 1 wherein the four chords of the top layer have axial force limits of a minimum of about 500 lbs.

3. The frame of claim 2 including a torque plate having two connections to the top layer.

4. The frame of claim 3 wherein the four chords of the top layer have axial force limits of a maximum of about 20,674 lbs.

5. The frame of claim 4 wherein at least one of the four chords of the top layer is one continuous piece that extends the frame's entire length.

6. The frame of claim 4 wherein at least one of the four chords of the top layer is formed of segmented chords that together extend the frame's entire length.

* * * * *